US012789788B2

(12) United States Patent
Nakamura et al.

(10) Patent No.: US 12,789,788 B2
(45) Date of Patent: Nov. 10, 2026

(54) INFORMATION PROCESSING DEVICE AND INFORMATION PROCESSING METHOD

(71) Applicant: SONY SEMICONDUCTOR SOLUTIONS CORPORATION, Kanagawa (JP)

(72) Inventors: Yui Nakamura, Kanagawa (JP); Kazuhiro Yamanaka, Kanagawa (JP); Dai Matsunaga, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 178 days.

(21) Appl. No.: 18/709,627

(22) PCT Filed: Oct. 13, 2022

(86) PCT No.: PCT/JP2022/038180

§ 371 (c)(1),
(2) Date: May 13, 2024

(87) PCT Pub. No.: WO2023/090001

PCT Pub. Date: May 25, 2023

(65) Prior Publication Data

US 2025/0002007 A1 Jan. 2, 2025

(30) Foreign Application Priority Data

Nov. 19, 2021 (JP) ................................ 2021-188329

(51) Int. Cl.
*B60W 30/06* (2006.01)
*G06V 10/82* (2022.01)
(Continued)

(52) U.S. Cl.
CPC ............ *B60W 30/06* (2013.01); *G06V 10/82* (2022.01); *G06V 20/586* (2022.01);
(Continued)

(58) Field of Classification Search
CPC ...... B60W 30/06; G06V 10/82; G06V 20/586
See application file for complete search history.

(56) References Cited

U.S. PATENT DOCUMENTS

| | | | | |
|---|---|---|---|---|
| 10,650,681 | B2 * | 5/2020 | Tanigawa ............ | G06V 10/774 |
| 2022/0392127 | A1 * | 12/2022 | Liu ...................... | G06T 7/0012 |

FOREIGN PATENT DOCUMENTS

| | | | | |
|---|---|---|---|---|
| CN | 111797715 A * | 10/2020 | ............ | G06N 3/045 |
| JP | 2016-197314 A | 11/2016 | | |

(Continued)

OTHER PUBLICATIONS

International Search Report and Written Opinion of PCT Application No. PCT/JP2022/038180, issued on Nov. 15, 2022, 13 pages of ISRWO.

(Continued)

*Primary Examiner* — Luke Huynh
(74) *Attorney, Agent, or Firm* — CHIP LAW GROUP

(57) ABSTRACT

Provided is a learning model applied to estimate a parking spot definition rectangle (polygon), a parking spot entrance direction, and a vacancy state of a parking spot. A top surface image generated by combining individual images captured by front, rear, left, and right cameras mounted on a vehicle is analyzed, and analysis processing is performed on a parking spot in the image. A parking spot analysis unit uses a learning model to estimate a vertex of a parking spot definition rectangle (polygon) indicating a parking spot region in the image and an entrance direction of the parking spot. Furthermore, estimation is performed as to whether the parking spot is a vacant parking spot or an occupied parking spot in which a parked vehicle is present.

18 Claims, 42 Drawing Sheets

(51) Int. Cl.
*G06V 20/58* (2022.01)
*G08G 1/14* (2006.01)

(52) U.S. Cl.
CPC ... *B60W 2420/403* (2013.01); *B60W 2556/40* (2020.02); *G08G 1/14* (2013.01)

(56) References Cited

FOREIGN PATENT DOCUMENTS

| | | | | | |
|---|---|---|---|---|---|
| JP | 2018-041176 | A | | 3/2018 | |
| JP | 2020-123343 | A | | 8/2020 | |
| JP | 2021-062739 | A | | 4/2021 | |
| JP | 2021-099698 | A | | 7/2021 | |
| KR | 10-2260556 | B1 | | 6/2021 | |
| WO | WO-2006064544 | A1 | * | 6/2006 | ......... B62D 15/0285 |

OTHER PUBLICATIONS

Zhang, et al., "Vision-Based Parking-Slot Detection: A DCNN-Based Approach and a Large-Scale Benchmark Dataset", IEEE Transactions on Image Processing, vol. 27, Issue 11, Nov. 2018, pp. 5350-5364.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/038180 filed on Oct. 13, 2022, which claims priority benefit of Japanese Patent Application No. JP 2021-188329 filed in the Japan Patent Office on Nov. 19, 2021. Each of the above-referenced applications is hereby incorporated herein by reference in its entirety.

TECHNICAL FIELD

The present disclosure relates to an information processing device, an information processing method, and a program. Specifically, the present disclosure relates to an information processing device, an information processing method, and a program that enable, for example, processing of identifying parking availability of each of a plurality of parking spots in a parking lot, an entrance direction of each parking spot, and the like, and generating display data based on an identification result to display the display data on a display unit, and performing automated parking based on the identification result.

BACKGROUND ART

For example, in many parking lots in shopping centers, amusement parks, sightseeing spots, other places in a town, or the like, a large number of vehicles can park in many cases.

A user who is a driver of the vehicle searches the parking lot for a vacant space where the driver can park the vehicle and parks the vehicle. In this case, the user travels the vehicle in the parking lot, visually checks around, and searches for a vacant space.

Such processing for checking a parkable space needs time, and furthermore, there is a problem in that, if the vehicle travels in the narrow parking lot, a contact accident with another vehicle or person is likely to occur.

As one technique for solving this problem, for example, there is a technique of analyzing an image captured by a camera provided in a vehicle (automobile), detecting a parkable parking spot, and displaying detection information on a display unit in the vehicle.

In a configuration in which parking spot analysis processing of a vacant parking spot or the like based on an image captured by the camera is performed, there is a configuration in which a top surface image (overhead view image) viewed from above the vehicle is generated and used.

The top surface image (overhead view image) can be generated by, for example, composite processing using images captured by multiple cameras that individually capture front, rear, left, and right directions of the vehicle.

However, in such a composite image, it may be difficult to determine a subject object due to distortion or the like generated at the time of image composition. As a result, even if the top surface image as the composite image is analyzed, it may not be possible to accurately identify an occupied parking spot in which a parked vehicle is present and a vacant parking spot in which no parked vehicle is present.

Furthermore, recently, technology development related to automated driving and driving support has been actively conducted. For example, advanced driver assistance system (ADAS), autonomous driving (AD) technology, and the like are used.

However, even in a case where automated parking using automated driving or driving support is performed, it is necessary to perform processing of detecting a parkable parking spot from a parking lot and processing of detecting an entrance for each parking spot, and the processing of these are performed using, for example, an image captured by a camera provided in a vehicle (automobile).

Therefore, for example, in a case where an image in which it is difficult to determine a subject object as described above is used, there is a problem that it is difficult to accurately identify the occupied parking spot and the vacant parking spot, and smooth automated parking becomes impossible.

Note that, as a related art that discloses a configuration for detecting a parkable region on the basis of an image captured by a camera, there is, for example, Patent Document 1 (Japanese Patent Application Laid-Open No. 2020-123343).

This Patent Document 1 discloses technology of detecting two diagonal feature points of a parking spot from an image captured by a camera provided in a vehicle, estimating a center position of the parking spot by using a line segment connecting the two detected diagonal feature points, and estimating a region of the parking spot on the basis of the estimated center point position of the parking spot.

However, this related art is based on the premise that two diagonal feature points of one parking spot are detected from an image captured by the camera, and there is a problem that analysis cannot be performed in a case where the two diagonal feature points of the parking spot cannot be detected.

CITATION LIST

Patent Document

Patent Document 1: Japanese Patent Application Laid-Open No. 2020-123343

SUMMARY OF THE INVENTION

Problems to be Solved by the Invention

The present disclosure is to solve the above-described problems, for example, and an object thereof is to provide an information processing device, an information processing method, and a program capable of estimating a range or a state (vacant/occupied) of each parking spot even in a state where it is difficult to directly identify a region or a state (vacant/occupied) of a parking spot from an image captured by a camera.

Specifically, an object is to provide an information processing device, an information processing method, and a program capable of processing of identifying parking availability of each of a plurality of parking slots in a parking lot, an entrance direction of each parking spot, and the like by using a learning model generated in advance, and generating display data based on an identification result to display the display data on a display unit, and performing automated parking based on the identification result.

Solutions to Problems

A first aspect of the present disclosure is
an information processing device including:
a parking spot analysis unit configured to execute analysis processing on a parking spot included in an image, in which
the parking spot analysis unit
estimates a parking spot definition rectangle indicating a parking spot region in the image, by using a learning model generated in advance.
Moreover, a second aspect of the present disclosure is
an information processing method executed in an information processing device, in which
the information processing device includes a parking spot analysis unit configured to execute analysis processing on a parking spot included in an image, and
the parking spot analysis unit
estimates a parking spot definition rectangle indicating a parking spot region in the image, by using a learning model generated in advance.
Moreover, a third aspect of the present disclosure is
a program for executing information processing in an information processing device, in which
the information processing device includes a parking spot analysis unit configured to execute analysis processing on a parking spot included in an image, and
the program causes the parking spot analysis unit to
estimate a parking spot definition rectangle indicating a parking spot region in the image, by using a learning model generated in advance.

Note that the program of the present disclosure is, for example, a program that can be provided by a storage medium or a communication medium that provides the program in a computer-readable format, to an information processing device, an image processing device, or a computer system capable of executing the program codes. By providing such a program in a computer-readable format, processing corresponding to the program is implemented on the information processing device or the computer system.

Other purposes, features, and advantages of the present disclosure would be obvious by the detailed description based on the embodiments of the present invention as described later and the attached drawings. Note that a system described herein is a logical set configuration of a plurality of devices, and is not limited to a system in which devices with respective configurations are in the same housing.

According to a configuration of an embodiment of the present disclosure, a configuration is realized in which a learning model is applied to estimate a parking spot definition rectangle (polygon), a parking spot entrance direction, and a vacancy state of a parking spot.

Specifically, for example, a top surface image generated by combining individual images captured by front, rear, left, and right cameras mounted on a vehicle is analyzed, and analysis processing is performed on a parking spot in the image. The parking spot analysis unit uses a learning model to estimate a vertex of a parking spot definition rectangle (polygon) indicating a parking spot region in the image and an entrance direction of the parking spot. Furthermore, estimation is performed as to whether the parking spot is a vacant parking spot or an occupied parking spot in which a parked vehicle is present. The parking spot analysis unit uses CenterNet as a learning model to execute, for example, estimation processing on a spot center and a vertex of a parking spot definition rectangle (polygon).

With this configuration, a configuration is realized in which a learning model is applied to estimate a parking spot definition rectangle (polygon), a parking spot entrance direction, and a vacancy state of a parking spot.

Note that the effects described herein are merely examples and are not limited, and additional effects may also be provided.

MODE FOR CARRYING OUT THE INVENTION

Figure 1:
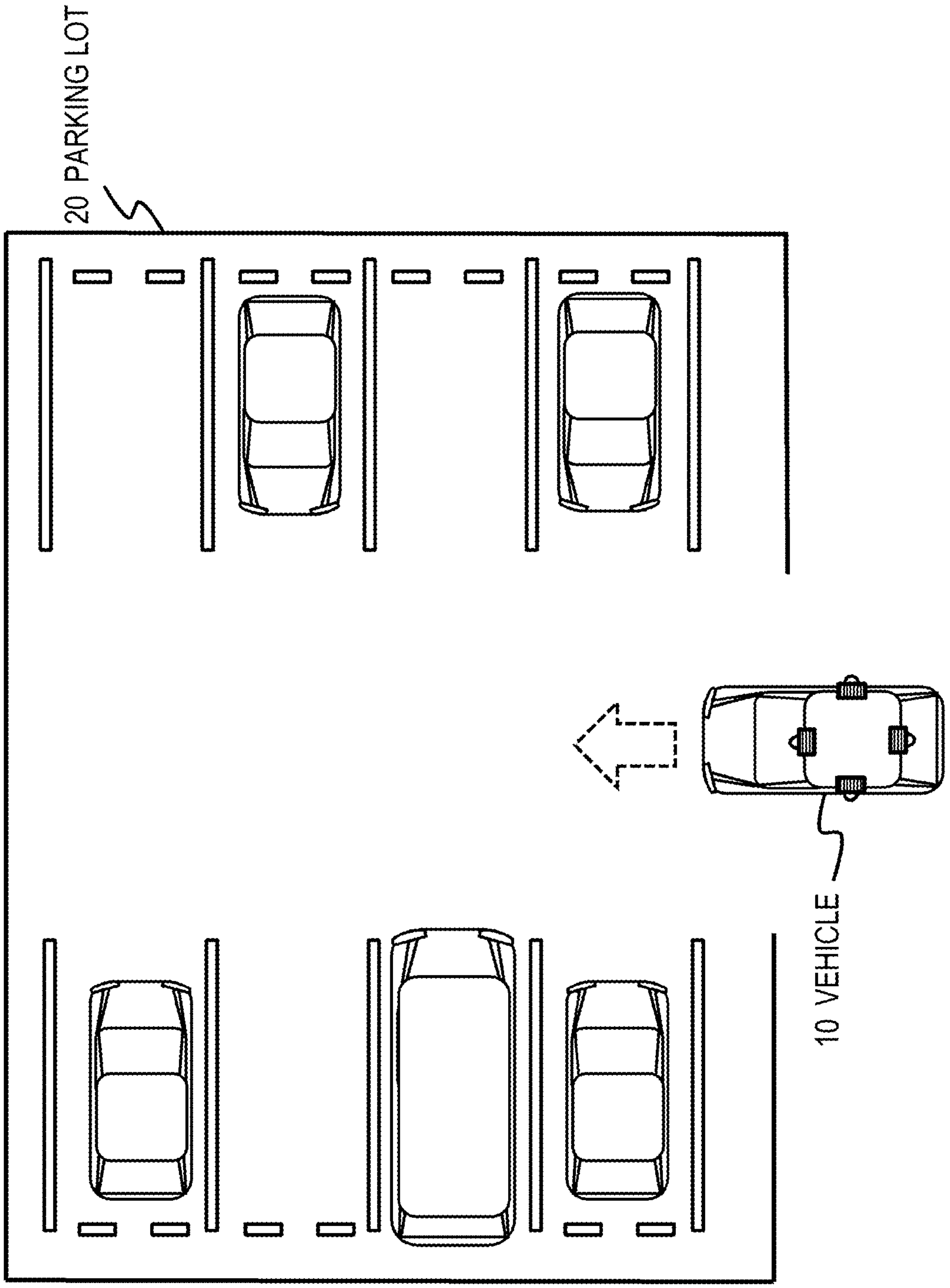
FIG. 1 is a view for explaining an example of a configuration of a parking lot and a vehicle to be parked.

Hereinafter, an information processing device, an information processing method, and a program according to the present disclosure will be described in detail with reference to the drawings. Note that the description will be made according to the following items.

1. Regarding outline of processing executed by information processing device according to present disclosure
2. Regarding outline of learning model generation processing and parking spot analysis processing applied with learning model, executed by information processing device according to the present disclosure
3. Regarding configuration of parking spot analysis unit of information processing device of present disclosure and details of parking spot analysis processing executed by parking spot analysis unit
4. Regarding other embodiments
5. Regarding configuration example of information processing device according to present disclosure
6. Regarding hardware configuration example of information processing device according to present disclosure
7. Regarding configuration example of vehicle
8. Conclusion of configuration of present disclosure

1. Regarding Outline of Processing Executed by Information Processing Device According to Present Disclosure First, an outline of processing executed by an information processing device according to the present disclosure will be described.

The information processing device according to the present disclosure is, for example, a device mounted on a vehicle, and analyzes an image captured by a camera provided in the vehicle or a composite image thereof by using a learning model generated in advance, to detect a parking spot in a parking lot. Furthermore, it is identified whether the detected parking spot is a vacant parking spot which is vacant or an occupied parking spot in which there is already a parked vehicle, and an entrance direction of each parking spot is identified.

Moreover, in an embodiment of the information processing device according to the present disclosure, processing of generating display data based on identification results of these and displaying the display data on a display unit is performed, and automated parking processing and the like based on the identification results are performed.

With reference to FIG. 1 and subsequent figures, an outline of processing executed by the information processing device according to the present disclosure will be described.

FIG. 1 illustrates a vehicle 10 and a parking lot 20. The vehicle 10 enters the parking lot 20 from an entrance of the parking lot 20, and selects and parks in one of vacant parking spots in which no parked vehicle is present.

The vehicle 10 may be a general manual driving vehicle driven by a driver, an automated driving vehicle, or a vehicle having a driving support function.

The automated driving vehicle or the vehicle having the driving support function is, for example, a vehicle equipped with an advanced driver assistance system (ADAS) or an autonomous driving (AD) technology. These vehicles can perform automated parking using automated driving and driving support.

The vehicle 10 illustrated in FIG. 1 includes cameras that individually capture images in front, rear, left, and right directions of the vehicle 10.

Figure 2:
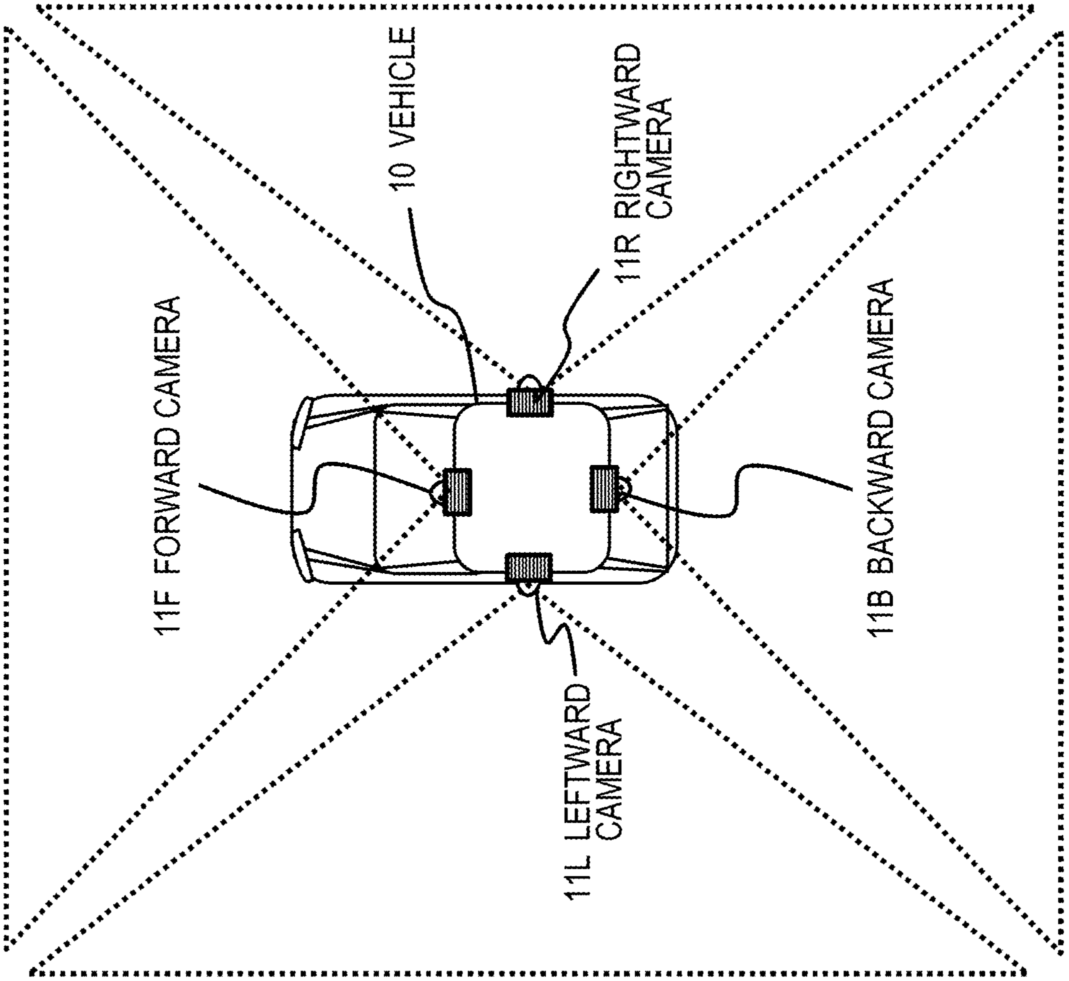
FIG. 2 is a view for explaining a configuration example of the vehicle.

With reference to FIG. 2, a configuration example of the camera mounted on the vehicle 10 will be described.

As illustrated in FIG. 2, the vehicle 10 includes the following four cameras.

(a) A forward camera 11F that captures an image on the front side of the vehicle 10

(b) A backward camera 11B that captures an image on the rear side of the vehicle 10

(c) A leftward camera 11L that captures an image on the left side of the vehicle 10

(d) A rightward camera 11R that captures an image on the right side of the vehicle 10

It is possible to generate an image observed from above the vehicle 10, that is, a top surface image (overhead view image) by combining four images individually captured by the cameras that capture images in four directions of front, rear, left, and right of the vehicle 10.

Figure 3:
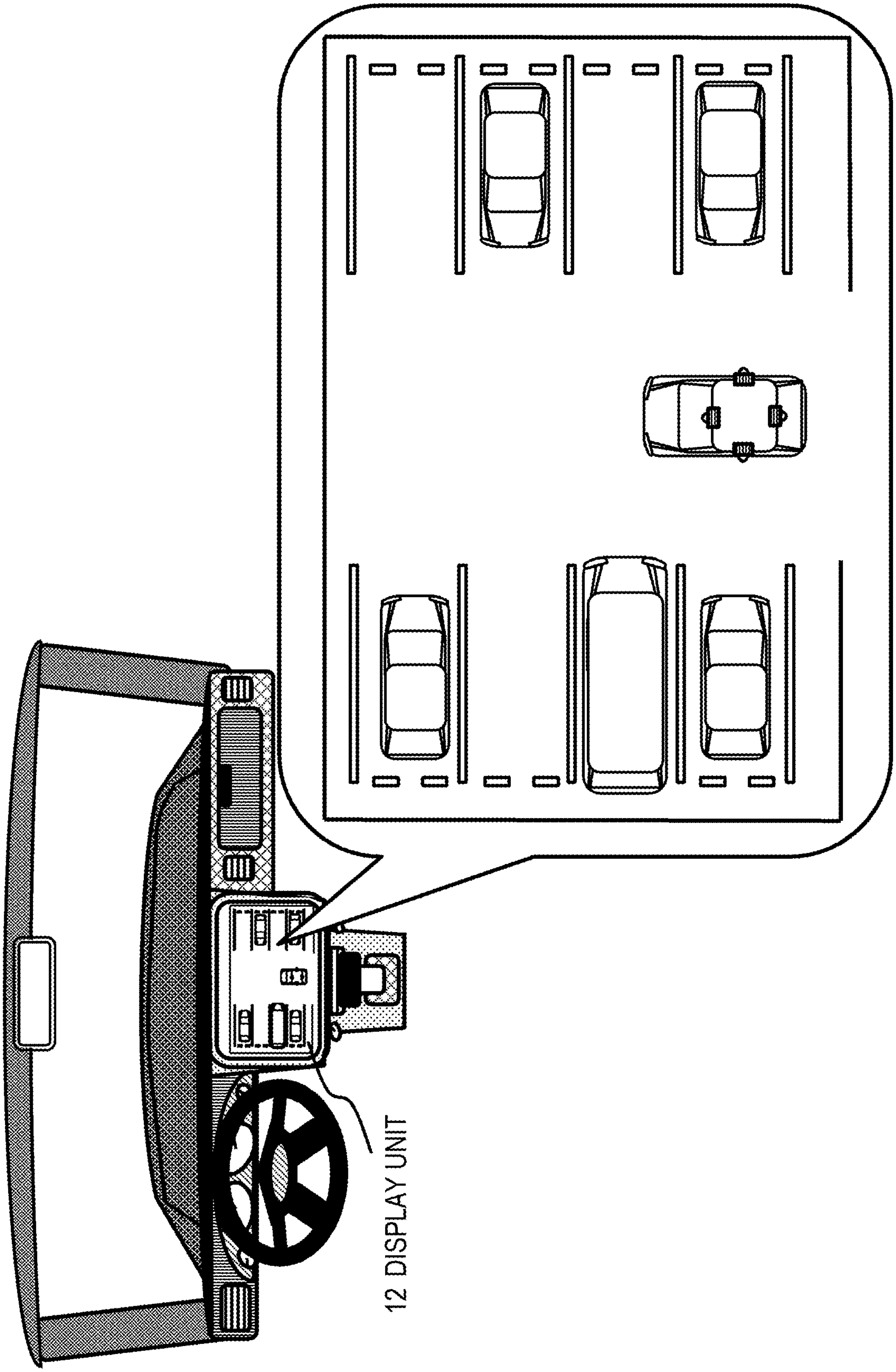
FIG. 3 is a view for explaining an example of display data output to a display unit of the vehicle.

FIG. 3 illustrates an example in which a top surface image generated by composite processing of each of the cameras is displayed on a display unit 12 of the vehicle 10.

The display data displayed on the display unit 12 illustrated in FIG. 3 is an example of a top surface image (overhead view image) generated by combining four images captured by the cameras 11F, 11L, 11B, and 11R that capture images in four directions of front, rear, left, and right of the vehicle 10 described with reference to FIG. 2.

The example of the display data illustrated in FIG. 3 is an example of a schematic top surface image, and an object such as a parked vehicle can be clearly observed. However, this is merely an ideal top surface image drawn schematically, and in practice, a sharp and clear top surface image as illustrated in FIG. 3 is hardly generated.

As described above with reference to FIG. 2, the top surface image to be displayed on the display unit 12 of the vehicle 10 is generated by combining four images individually captured by the cameras that capture images in four directions of front, rear, left, and right of the vehicle 10. In this image composite processing, various image corrections such as joining processing, enlargement/reduction processing, and overhead view transformation processing of each of the four images are required. Various distortions and image deformations occur in the process of these image corrections.

As a result, an object displayed on the top surface image displayed on the display unit 12 of the vehicle 10 may be displayed as an image having distortion and a shape different from a shape of an actual object. Specifically, vehicles, parking spot lines, and the like in the parking lot are displayed in shapes different from actual shapes.

Figure 4:
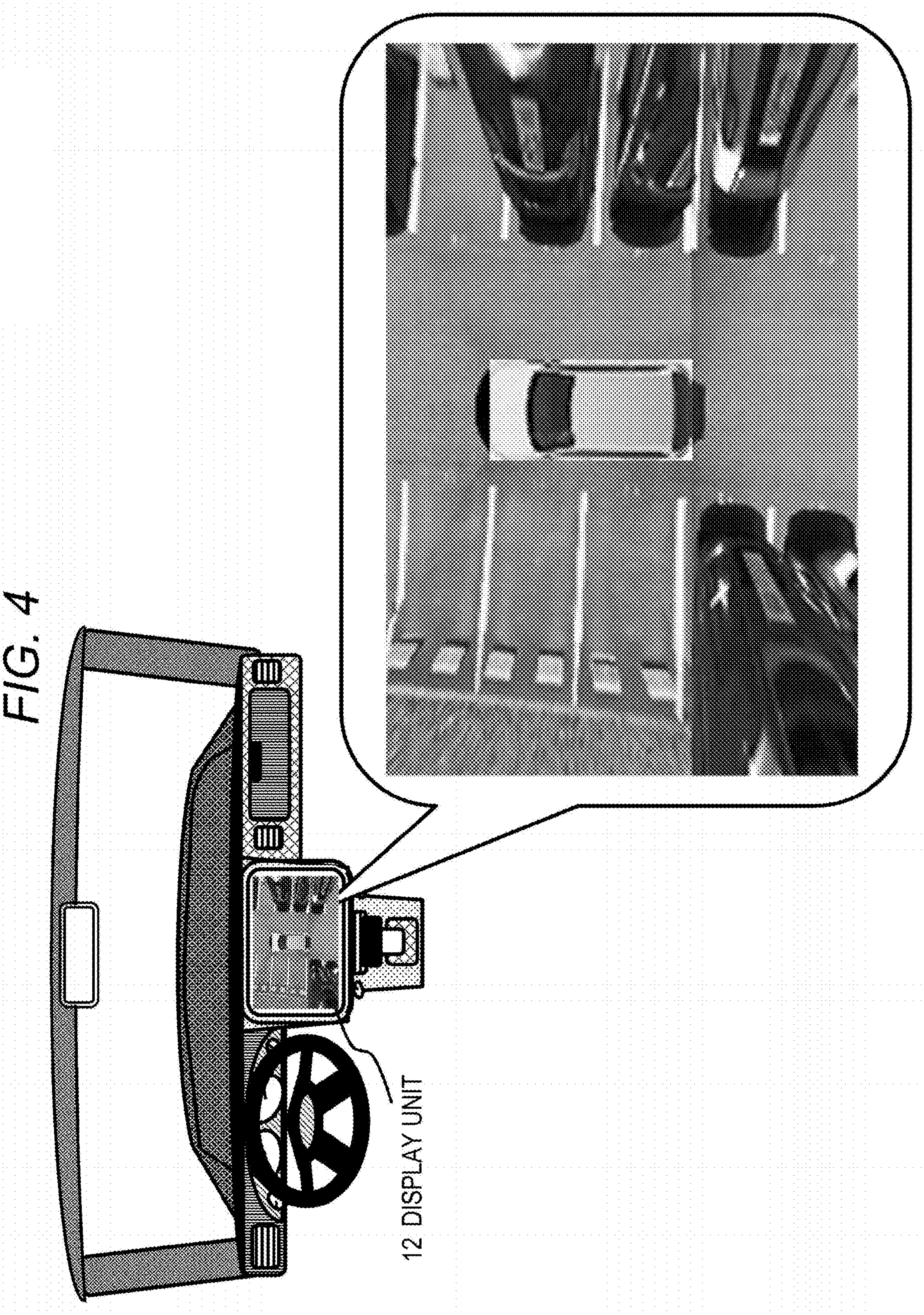
FIG. 4 is a view for explaining an example of display data output to the display unit of the vehicle.

FIG. 4 illustrates an actual example of a composite image generated by combining actual four images individually captured by the cameras that capture images in four directions of front, rear, left, and right of the vehicle 10.

Data displayed on the display unit 12 illustrated in FIG. 4 is an image of a parking lot. A white vehicle in a center is an own vehicle, and this own vehicle image is an image pasted on the composite image.

Among parking spots around the own vehicle, a white line indicating a parking spot is clearly displayed in a part of a parking spot on the left side of the own vehicle, but an object estimated as a parked vehicle is deformed and displayed in a parking spot on the right side of the own vehicle and in a parking lot on the left rear side of the own vehicle.

For example, in a case where such an image is displayed on the display unit 12 of the vehicle 10, it is difficult for the driver to accurately identify whether or not an object displayed in the parking spot is a parked vehicle, and it is also difficult for the driver to clearly identify a boundary of each parking spot, and a vacant state, an occupied state, and the like of each parking spot.

As a result, in many cases, the driver gives up checking from the display image, and performs processing of checking the front of the vehicle while driving and searching for an available parking spot again.

Furthermore, in a case where the vehicle is an automated driving vehicle and is a vehicle capable of performing automated parking processing, an image with many deformations as illustrated in FIG. 4 is input to an automated driving control unit, and the automated driving control unit detects a vacant parking spot on the basis of the input image and performs automated parking.

However, it is also difficult for the automated driving control unit to identify whether or not a displayed object in the parking spot is a parked vehicle from the input image, and it is also difficult to clearly identify a boundary of each parking spot, and a vacancy state, an occupied state, and the like of each parking spot. As a result, automated parking cannot be performed in some cases.

Note that, in the image illustrated in FIG. 4, there is also a problem that a depth side of the parking spot on the right side of the own vehicle is cut, and a depth and an entrance direction of the parking spot cannot be determined.

In some the parking lots, a parking direction may be defined. However, it is impossible to determine a front-rear direction of a parked vehicle from the image as illustrated in FIG. 4, and a situation may occur in which parking is performed with the parking direction erroneously determined.

Figure 5:
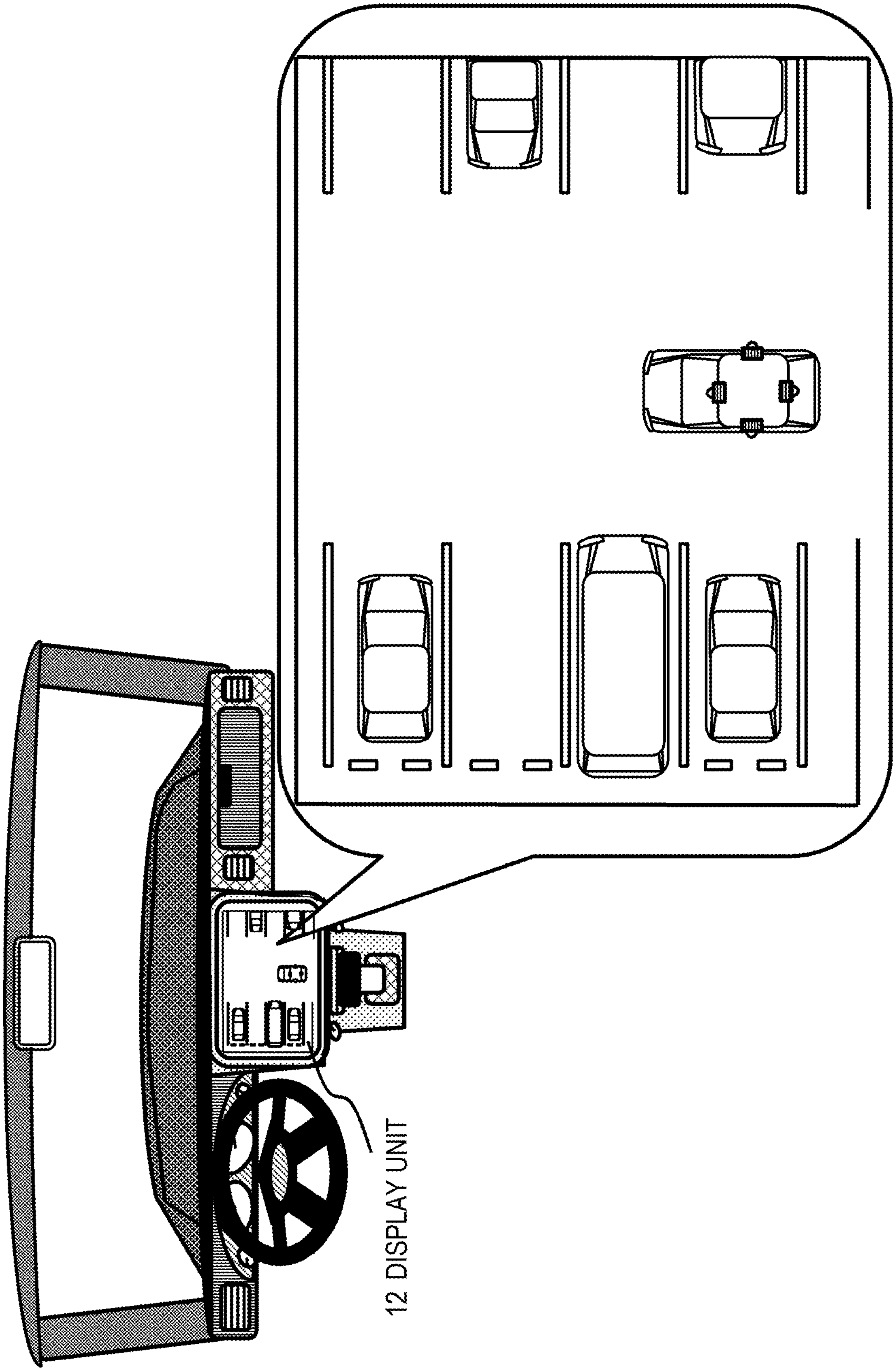
FIG. 5 is a view for explaining an example of display data output to the display unit of the vehicle.

Note that an example of a composite image that does not include the entire parking spot is, for example, an image as illustrated in FIG. 5.

The information processing device according to the present disclosure, that is, the information processing device mounted on a vehicle is to solve such a problem, for example.

The information processing device according to the present disclosure performs parking spot detection in a parking lot by performing image analysis using a learning model generated in advance. Moreover, it is identified whether a detected parking spot is a vacant parking spot that is vacant or an occupied parking spot that already has a parked vehicle, and an entrance direction of each parking spot is identified.

Moreover, processing of generating display data based on identification results of these and displaying the display data on the display unit is performed, and automated parking processing and the like based on the identification results are performed.

Figure 6:
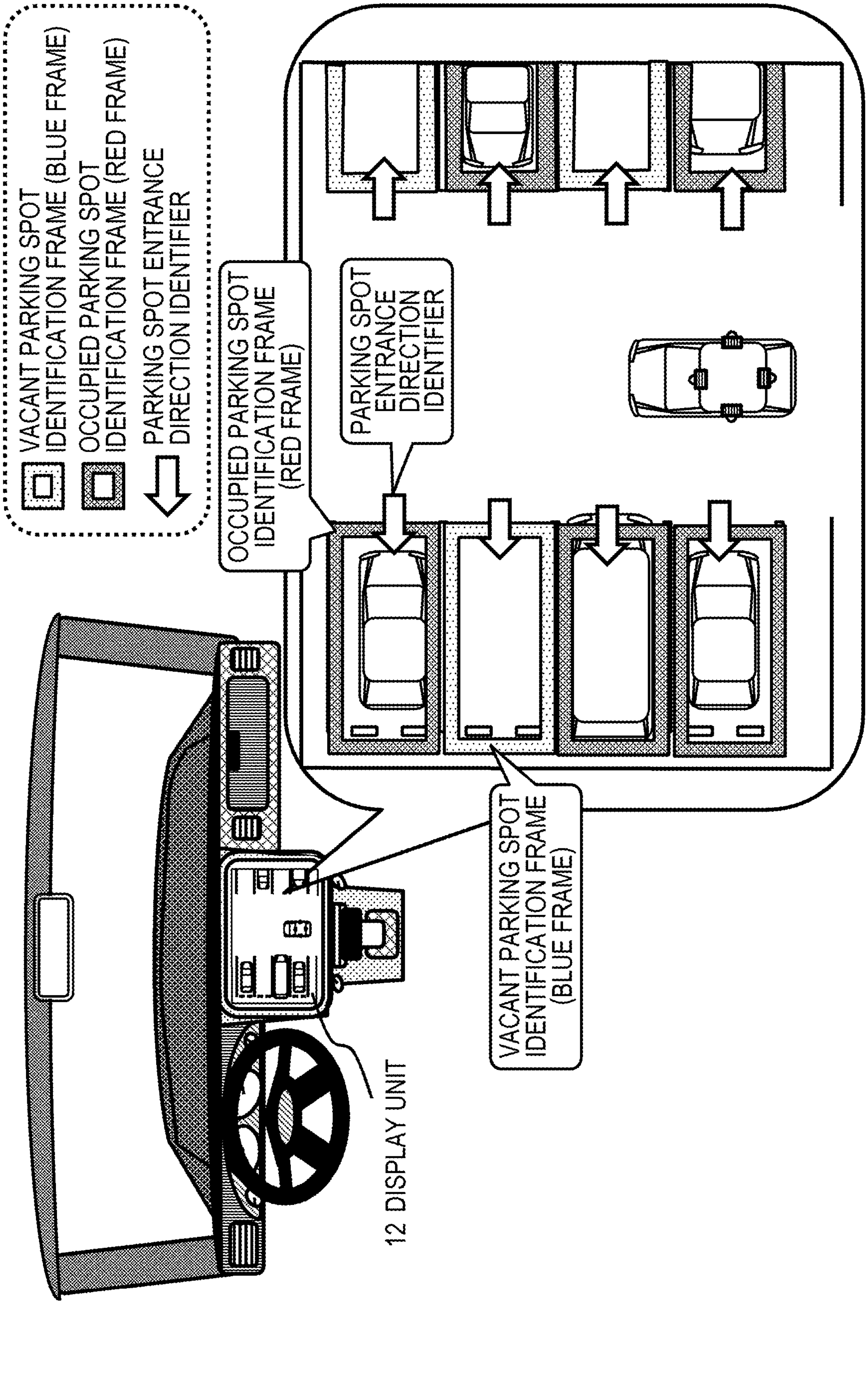
FIG. 6 is a view for explaining a specific example of display data generated by an information processing device according to the present disclosure.

With reference to FIG. 6, an example of display data generated by the information processing device according to the present disclosure will be described.

The display data of the display unit 12 illustrated in FIG. 6 is an example of display data generated by the information processing device according to the present disclosure.

The display data illustrated in FIG. 6 is a schematic view of a top surface image of a parking lot similar to that described above with reference to FIG. 5. That is, it is a schematic view of a top surface image generated by combining images obtained by the cameras of four directions mounted in the vehicle 10.

The information processing device according to the present disclosure superimposes and displays a parking spot identification frame on the top surface image.

The parking spot identification frame to be superimposed and displayed has a rectangular (polygon) shape including four vertexes that define a region of each parking spot.

Moreover, a vacant parking spot identification frame indicating a vacant parking spot in which no parked vehicle is present and an occupied parking spot identification frame indicating an occupied parking spot in which a parked vehicle is present are displayed in different display modes.

Specifically, for example, the vacant parking spot identification frame and the occupied parking spot identification frame are displayed as frames of different colors such as a "blue frame" and a "red frame", respectively.

Note that the color setting is an example, and various other color combinations are possible.

Moreover, the information processing device according to the present disclosure superimposes and displays a parking spot entrance direction identifier indicating an entrance direction (vehicle entry direction) of each parking spot on the top surface image of the parking lot.

The example illustrated in the figure is an example in which an "arrow" is used as the parking spot entrance direction identifier.

Note that, as the parking spot entrance direction identifier, various different identifiers can be used in addition to the "arrow".

For example, one edge on an entrance side of the parking spot identification frame is displayed as a different color (for example, white). Alternatively, various display modes are possible, such as displaying two vertexes on the entrance side of the parking spot identification frame with a different color (for example, white).

Figure 7:
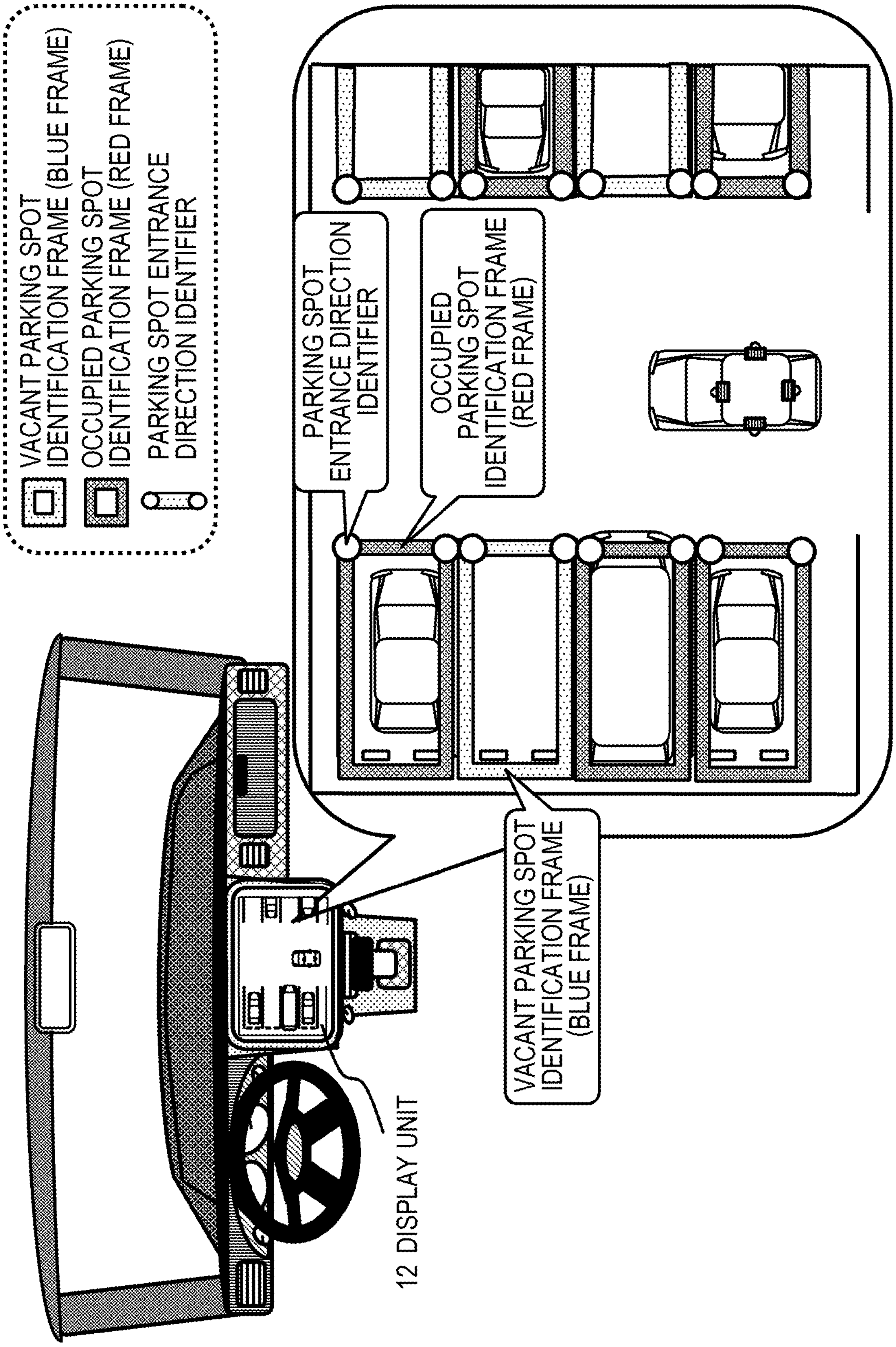
FIG. 7 is a view for explaining a specific example of display data generated by the information processing device according to the present disclosure.

The display data illustrated in FIG. 7 is an example of display data displaying the parking spot entrance direction identifier in which two vertexes on the entrance side of the parking spot identification frame has a different color (white).

Figure 8:
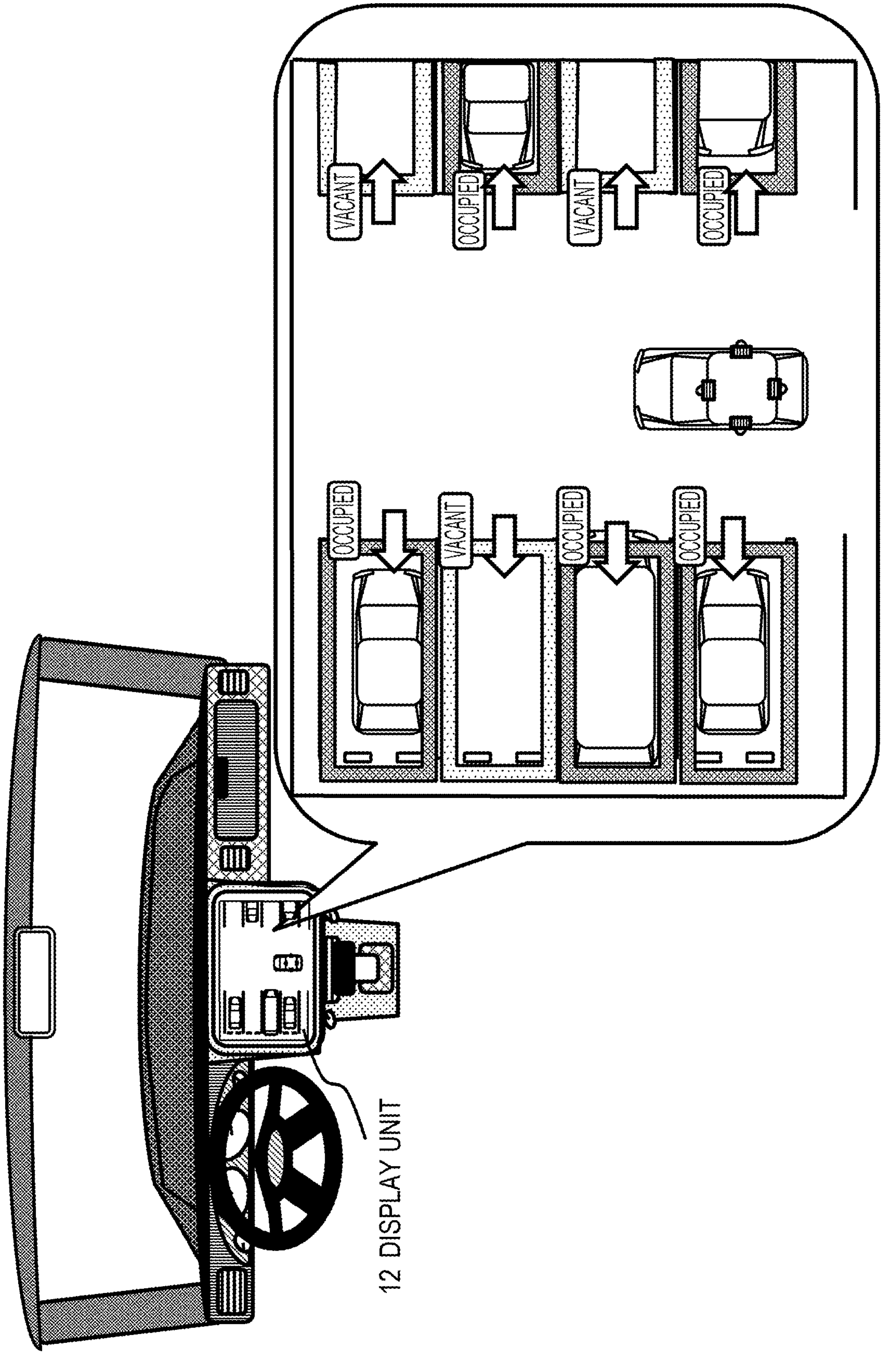
FIG. 8 is a view for explaining a specific example of display data generated by the information processing device according to the present disclosure.

Moreover, as illustrated in FIG. 8, an identification tag (state (vacant/occupied) identification tag) indicating whether the parking lot is vacant or occupied may be displayed in each parking spot. As illustrated in FIG. 8, two types of tags are displayed, which are:

an identification tag "vacant" for a vacant parking spot for which a vacant parking spot identification frame is displayed; and an identification tag "occupied" for an occupied parking spot having a parked vehicle for which an occupied parking spot identification frame is displayed.

In this manner, the identification tag (state (vacant/occupied) identification tag) indicating whether the parking lot is vacant or occupied may be displayed in each parking spot.

As described with reference to FIGS. 6 to 8, the information processing device according to the present disclosure superimposes and displays the following identification data on the top surface image of the parking lot displayed on the display unit 12. Namely, (1) a vacant parking spot identification frame;

(2) an occupied parking spot identification frame;

(3) a parking spot entrance direction identifier; and (4) a parking spot state (vacant/occupied) identification tag, these pieces of identification data are superimposed and displayed on the top surface image of the parking lot.

For example, in a case of a manual driving vehicle, the driver can reliably and easily determine a vacant or occupied state and an entrance direction of each parking frame, on the basis of the above-described identification data displayed on the display unit.

Furthermore, in a case of an automated driving vehicle, an image (top surface image) to which the identification data described above is added is input to the automated driving control unit. The automated driving control unit can reliably and easily determine a vacant or occupied state and an entrance direction of each parking frame on the basis of these pieces of identification data, and can perform automated parking processing accompanied by highly accurate position control for the vacant parking spot.

Note that examples of the display data illustrated in FIGS. 6 to 8 are schematic views in which the top surface image is not distorted.

As described above with reference to FIG. 4, the top surface image generated using live-action images obtained by the four cameras is the top surface image (composite image) having large distortion.

Figure 9:
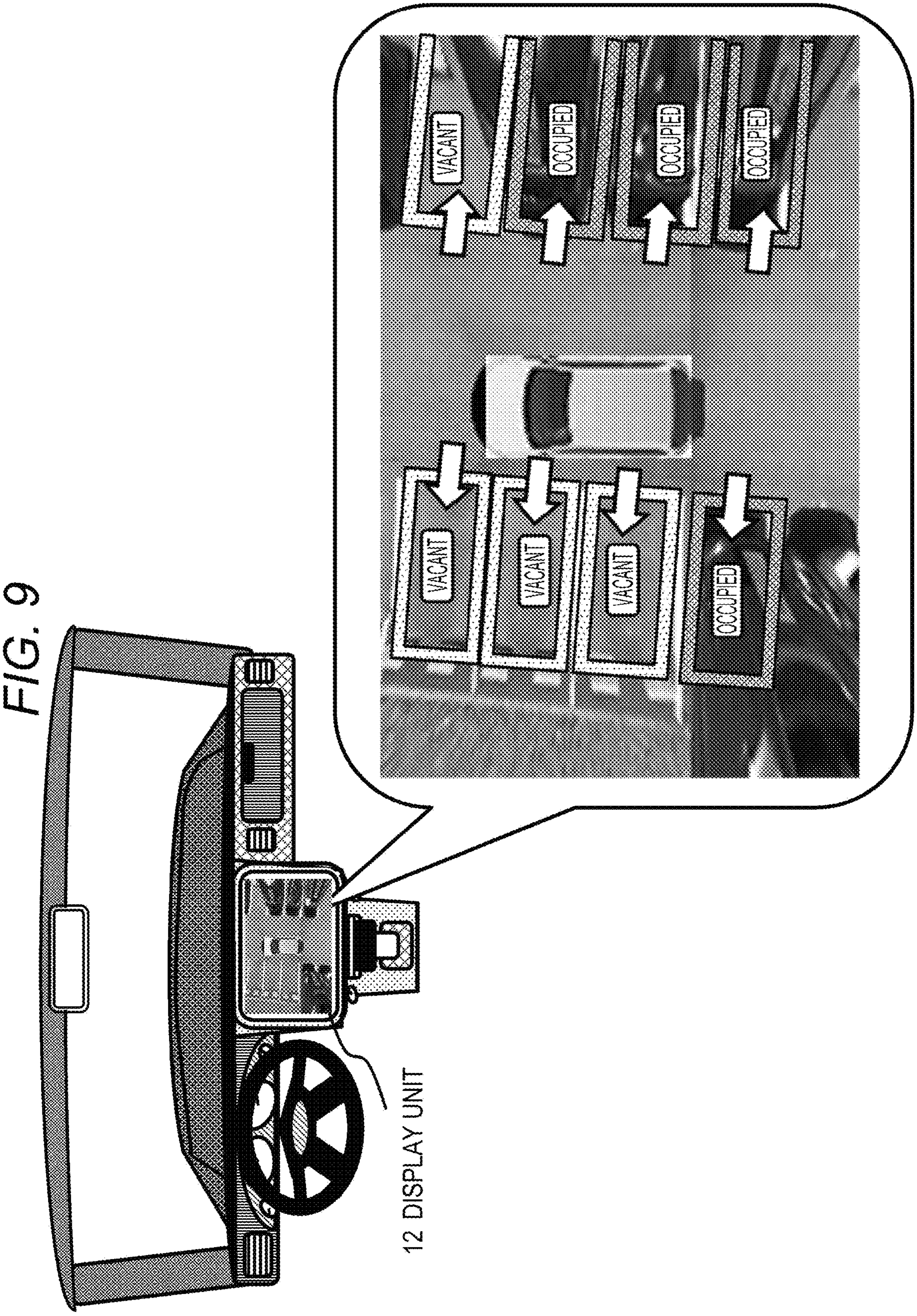
FIG. 9 is a view for explaining a specific example of display data generated by the information processing device according to the present disclosure.

FIG. 9 illustrates an example of display data in which the identification data described above is superimposed on the top surface image having such large distortion.

As illustrated in FIG. 9, an object such as a parked vehicle included in the top surface image (composite image) of the parking lot has a shape different from an actual vehicle shape and is greatly deformed and displayed. On this image having large distortion, the following identification data is superimposed and displayed, namely:

(1) the vacant parking spot identification frame;

(2) the occupied parking spot identification frame;

(3) the parking spot entrance direction identifier; and (4) the parking spot state (vacant/occupied) identification tag.

By superimposing and displaying these pieces of identification data, it is possible to easily and reliably identify a region of each parking spot, a state (vacant/occupied) of each parking spot, and an entrance direction of each parking spot.

By generating such identification data and displaying the identification data on the display unit or supplying the identification data to the automated driving control unit, safe and reliable parking processing can be performed in both the manual driving vehicle and the automated driving vehicle.

2. Regarding Outline of Learning Model Generation Processing and Parking Spot Analysis Processing Applied with Learning Model, Executed by Information Processing Device of the Present Disclosure Next, a description will be given to an outline of learning model generation processing and parking spot analysis processing applied with a learning model, executed by the information processing device of the present disclosure.

As described above, the information processing device of the present disclosure is a device mounted on a vehicle, and analyzes an image captured by a camera provided in the vehicle or a composite image thereof by using a learning model generated in advance, to execute analysis processing on a parking spot in a parking lot.

Specifically, by using the learning model generated in advance, whether the parking spot is a vacant parking spot or an occupied parking spot in which a parked vehicle is present is identified, and an entrance direction of each parking spot is further identified.

Moreover, processing of generating display data based on identification results of these and displaying the display data on the display unit is performed, and automated parking processing and the like based on the identification results are performed.

Figure 10:
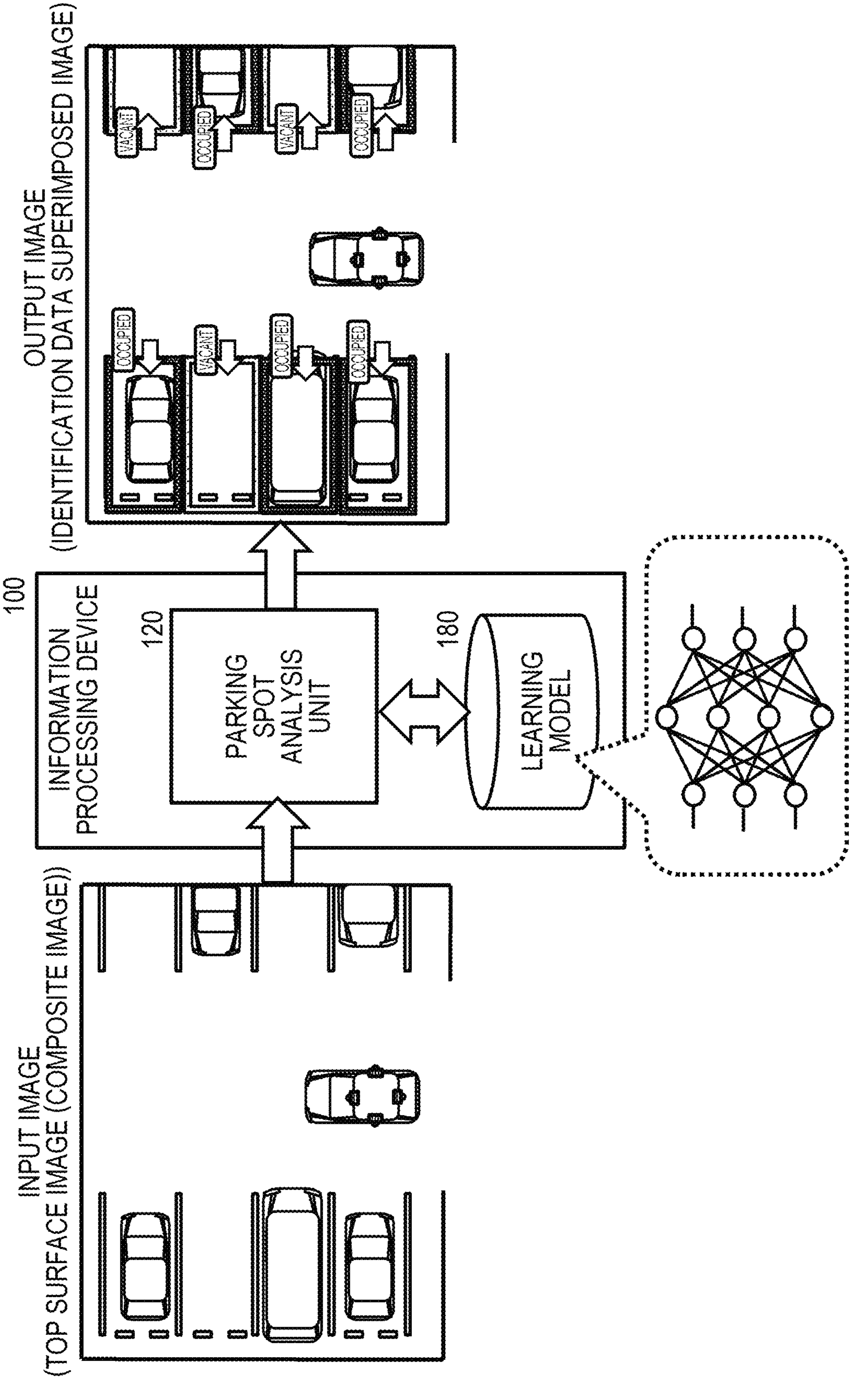
FIG. 10 is a diagram for explaining an outline of a configuration of the information processing device according to the present disclosure and processing to be executed.

With reference to FIG. 10 and subsequent figures, a description will be given to the parking spot analysis processing applied with the learning model and executed by the information processing device according to the present disclosure.

FIG. 10 is a diagram for explaining an outline of the parking spot analysis processing applied with a learning model and executed by the information processing device according to the present disclosure.

As illustrated in FIG. 10, an information processing device 100 of the present disclosure includes a parking spot analysis unit 120. The parking spot analysis unit 120 is input with a top surface image (composite image) as illustrated on the left side of FIG. 10, and generates an output image on which identification data is superimposed as illustrated on the right side.

The top surface image (composite image) is a composite image generated using images captured by multiple cameras that capture the front, rear, left, and right of the vehicle 10, and corresponds to an image observed from above the vehicle 10.

Note that the top surface image (composite image) illustrated on the left side of FIG. 10 is a diagram schematically illustrating an object such as a parked vehicle as a subject in a non-deformed form, but an actual input image is an image in which a large number of object deformations caused by the image composite processing are observed as described above with reference to FIG. 4.

Furthermore, the identification data to be superimposed on the output image on the right side of FIG. 10 is, for example, each piece of the following data described above with reference to FIGS. 6 to 9.

(1) The vacant parking spot identification frame (2) The occupied parking spot identification frame (3) The parking spot entrance direction identifier (4) The parking spot state (vacant/occupied) identification tag Note that the output image on which the identification data is superimposed illustrated on the right side of FIG. 10 is output to the display unit of the vehicle and displayed on the display unit, for example. Alternatively, the output image is output to the automated driving control unit and used for automated driving control, for example, automated parking processing.

As illustrated in FIG. 10, the parking spot analysis unit 120 of the information processing device 100 is input with the top surface image illustrated on the left side of FIG. 10, and executes analysis processing on a parking spot in the top surface image by using a learning model 180.

Figure 11:
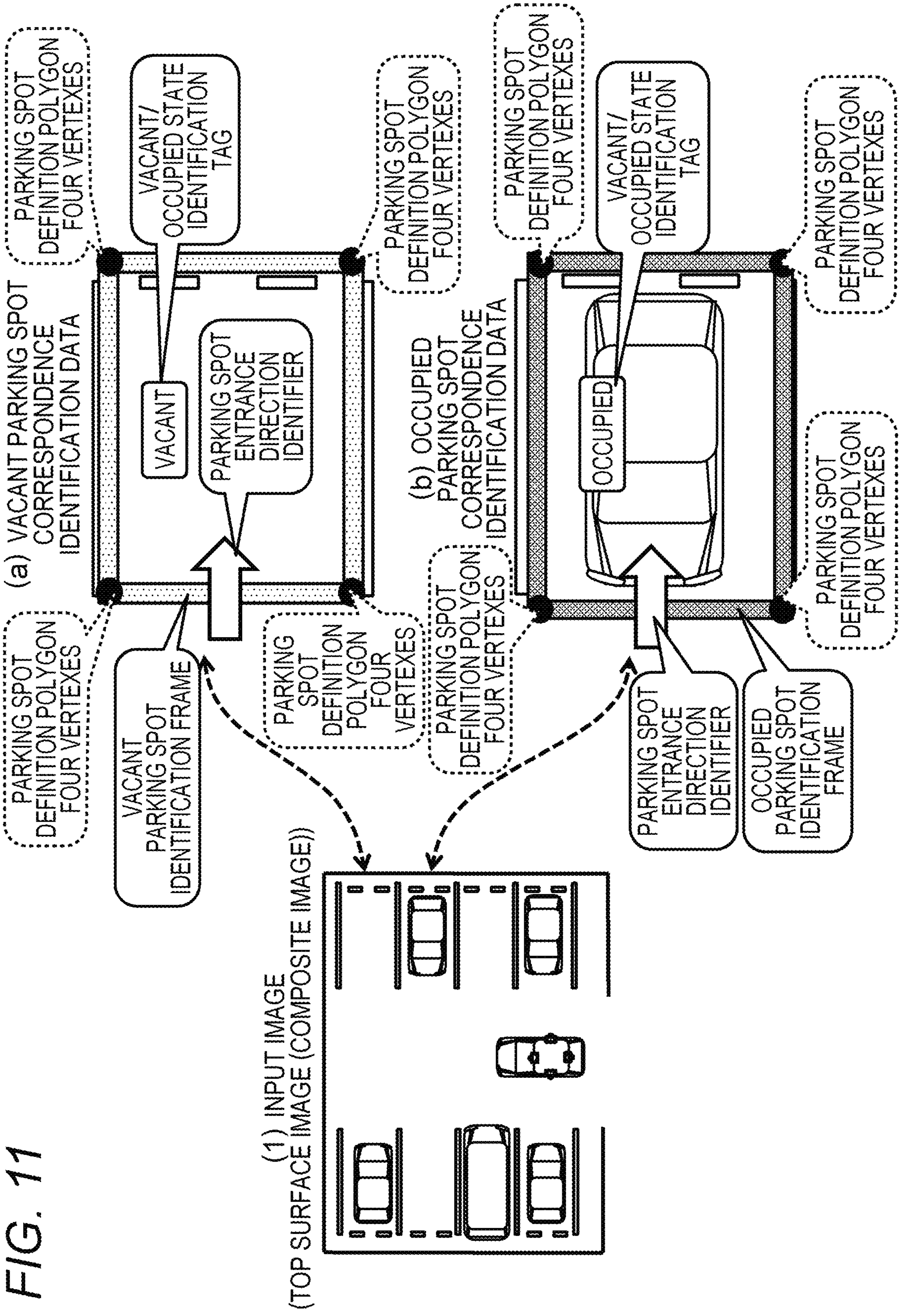
FIG. 11 is a diagram for explaining a specific example of parking spot correspondence identification data generated by parking spot analysis processing executed by the information processing device according to the present disclosure.

With reference to FIG. 11, a description will be given to a specific example of the parking spot correspondence identification data generated by the parking spot analysis processing executed by the parking spot analysis unit 120 of the information processing device 100 of the present disclosure.

FIG. 11 illustrates each of the following diagrams:

(1) An input image (top surface image (composite image))

(a) Vacant parking spot correspondence identification data (b) Occupied parking spot correspondence identification data "(1) The input image (top surface image (composite image))" is an image similar to the input image on the left side of FIG. 10, and is a top surface image to be an analysis target of the parking spot analysis unit 120 of the information processing device 100 according to the present disclosure.

The parking spot analysis unit 120 of the information processing device 100 of the present disclosure analyzes this input image, and generates the following identification data illustrated on the right side of FIG. 11 for each parking spot in the input image.

(a) The vacant parking spot correspondence identification data (b) The occupied parking spot correspondence identification data These are the identification data illustrated in the individual figures.

"(a) The vacant parking spot correspondence identification data" in FIG. 11 indicates the following identification data:

a vacant parking spot identification frame;

a parking spot entrance direction identifier; and a parking spot state (vacant/occupied) identification tag.

Furthermore, "(b) the occupied parking spot correspondence identification data" of FIG. 11 indicates the following identification data:

an occupied parking spot identification frame;

a parking spot entrance direction identifier; and a state (vacant/occupied) identification tag.

Note that "parking spot definition polygon four vertexes" illustrated in each of FIGS. 11 (*a*) and 11 (*b*) are four vertexes constituting a rectangle (polygon) that defines a region of each parking spot.

By connecting the four vertexes of the polygon, it is possible to draw the vacant parking spot identification frame and the occupied parking spot identification frame.

That is, the parking spot analysis unit 120 of the information processing device 100 of the present disclosure calculates positions (coordinates) of four vertexes constituting the rectangle (polygon) that defines a region of each parking spot, and draws the vacant parking spot identification frame and the occupied parking spot identification frame.

The parking spot analysis unit 120 of the information processing device 100 of the present disclosure is input with a top surface image (composite image) as illustrated on the left side of FIG. 11, executes analysis processing on a parking spot in the image, and generates the following identification data.

(1) The vacant parking spot identification frame (2) The occupied parking spot identification frame (3) The parking spot entrance direction identifier (4) The parking spot state (vacant/occupied) identification tag In order to generate these pieces of identification data, the learning model 180 generated in advance is used.

Figure 12:
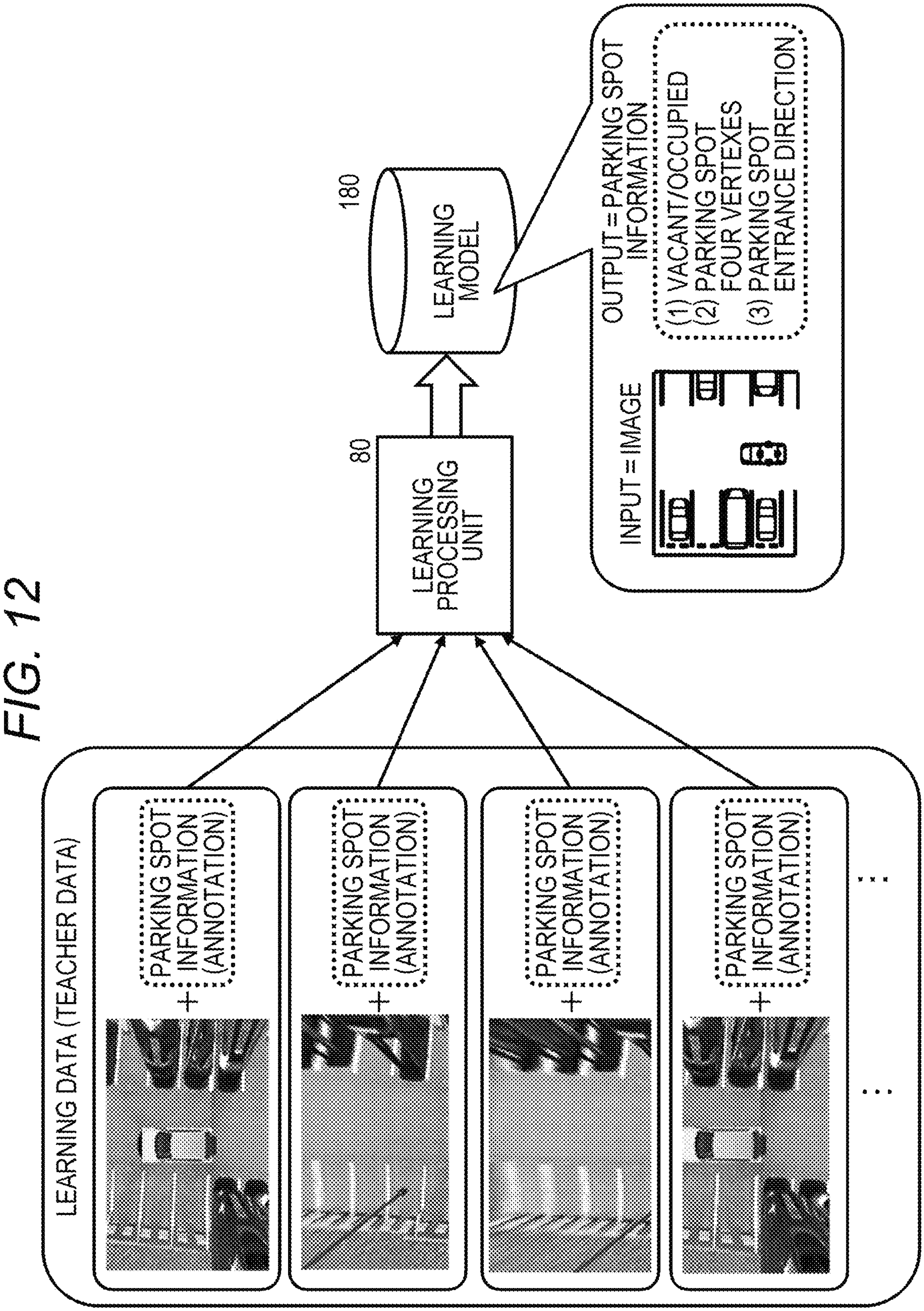
FIG. 12 is a diagram for explaining an outline of learning model generation processing.

With reference to FIG. 12, an outline of generation processing for the learning model 180 will be described.

FIG. 12 illustrates a learning processing unit 80 configured to execute the learning processing.

The learning processing unit 80 is input with a large number of pieces of learning data (teacher data) as illustrated on the left side of FIG. 12, executes the learning processing, and generates the learning model 180.

As the learning data (teacher data), for example, specifically, teacher data including set data in which various top surface images (composite images) of a parking lot and parking spot information corresponding to each of parking spots in the images are added as annotations (metadata) is used.

That is, the learning processing unit 80 is input with a large number of top surface images (composite images) of the parking lot to which parking spot information analyzed in advance has been added as annotations, and executes the learning processing using these as teacher data.

The learning model 180 generated by the learning processing is, for example, the learning model 180 that is input with a top surface image of a parking lot and outputs parking spot information as an output.

Note that the number of learning models is not limited to one, and multiple learning models in units of processing can be generated and used. For example, a learning model corresponding to processing as described below can be generated and used.

(a) A learning model that is input with an image and outputs a feature amount (b) A learning model that is input with an image or an image feature amount and outputs state information (vacant/occupied) of a parking spot (c) A learning model that is input with an image or an image feature amount and outputs a configuration of a parking spot (a center, a parking spot definition rectangle (polygon) vertex position, a parking spot entrance direction, and the like)

The parking spot analysis unit 120 of the information processing device 100 of the present disclosure generates, for example, the following parking spot information by using the generated learning model 180.

(1) State (vacant/occupied) information regarding whether the parking spot is vacant or occupied (2) Parking spot region information (a rectangle (polygon) defining a parking spot and polygon four vertexes constituting the polygon)

(3) An entrance direction of a parking spot

The learning processing unit 80 illustrated in FIG. 12 executes the learning processing in which a large number of parking lot images are input, and generates one or more learning models that output parking spot information thereof or various parameters necessary for acquiring the parking spot information thereof.

The learning data (teacher data) input to the learning processing unit 80 includes an image and an annotation (metadata) that is additional data corresponding to the image. The annotation is parking spot information analyzed in advance.

Figure 13:
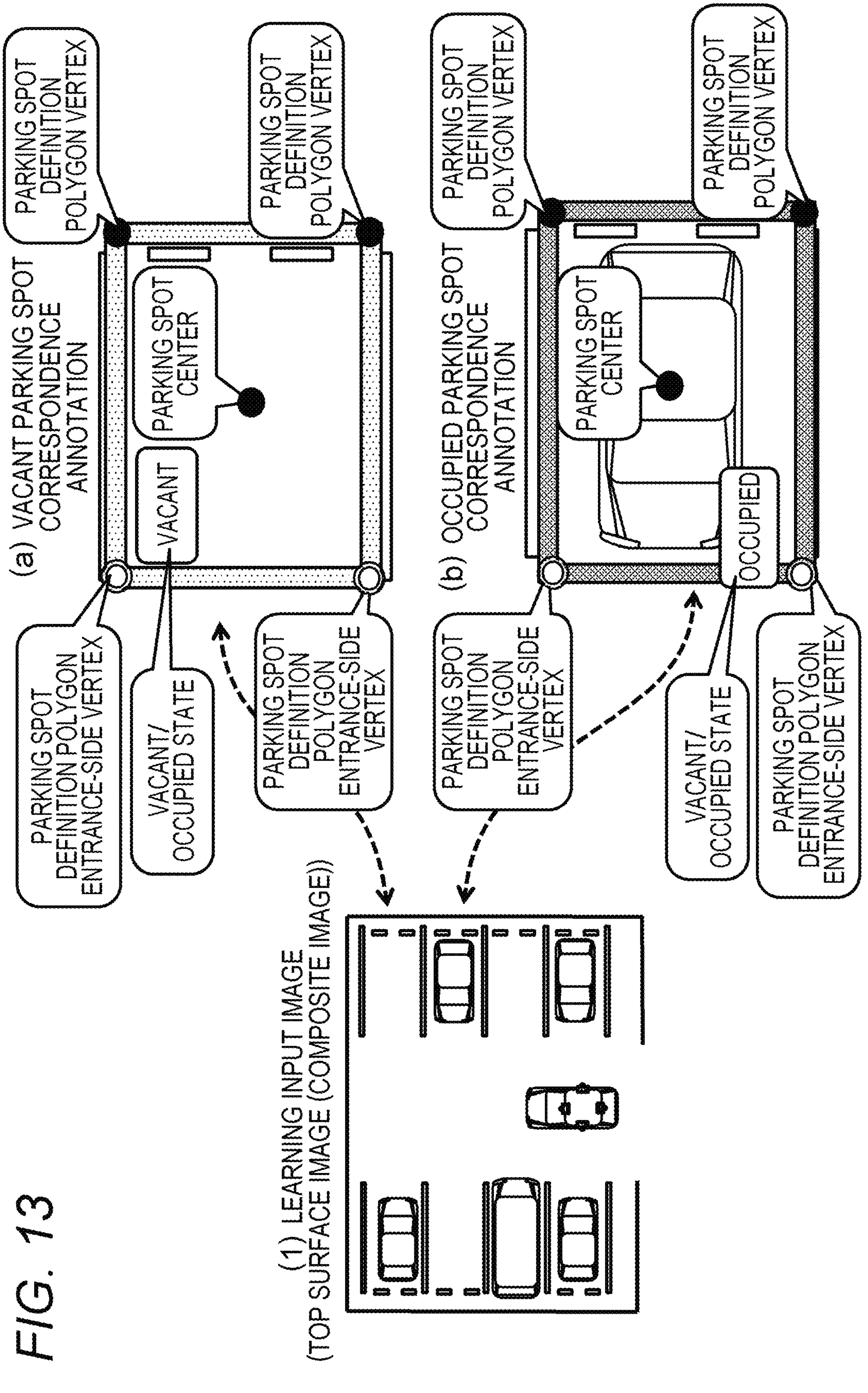
FIG. 13 is a diagram for explaining an example of an annotation input together with an image that is data of learning processing in a learning processing unit.

With reference to FIG. 13, an example of the annotation input together with the image to the learning processing unit 80 will be described.

FIG. 13 illustrates each of the following diagrams.

(1) A learning input image (top surface image (composite image))

(a) A vacant parking spot correspondence annotation (b) An occupied parking spot correspondence annotation As illustrated in FIGS. 13 (*a*) and 13 (*b*), the annotation to be input to the learning processing unit 80 together with the learning input image (top surface image (composite image)) is, for example, parking spot information as follows.

(1) A parking spot center (2) A parking spot definition polygon vertex (four vertexes)

(3) A parking spot definition polygon entrance-side vertex (two vertexes)

(4) A parking spot state (vacant/occupied)

The learning data (teacher data) includes these annotations, that is, metadata analyzed in advance, and is input to the learning processing unit 80 together with the image.

Note that the top surface image (composite image) input to the learning processing unit 80 also includes an image in which the entire parking spot is not captured in the image. For example, in the parking lot image illustrated in the learning data illustrated on the left side of FIG. 12, only half of the parking spots on the right side of the parking lot is captured.

Also for such an image, the region of each parking spot is examined in advance, each of the vertex coordinates of polygon defining the parking spot is obtained, teacher data associated with each image is generated as an annotation, and the learning processing is executed.

Figure 14:
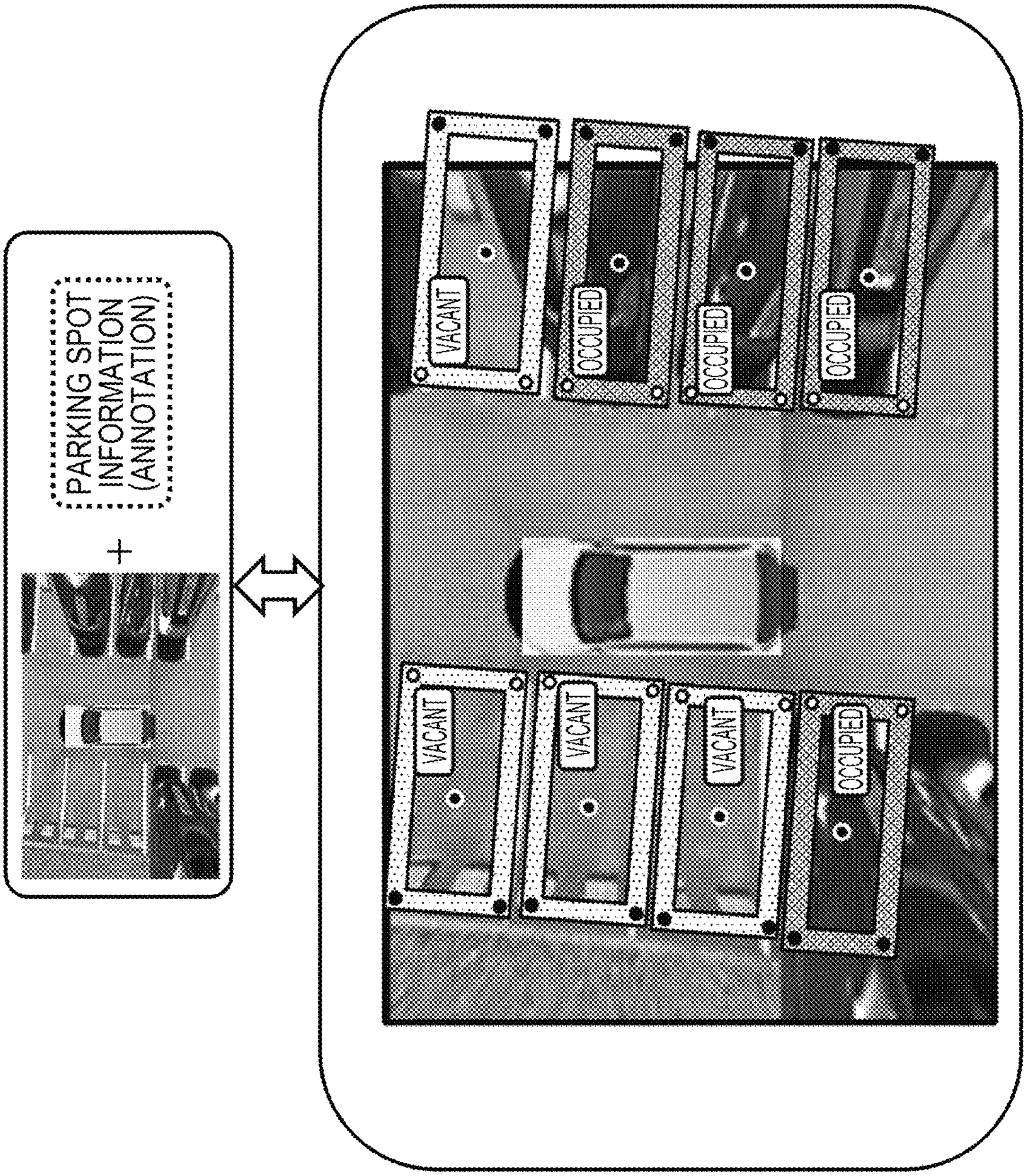
FIG. 14 is a view for explaining an example of an image that is data of the learning processing in the learning processing unit.

For example, in the top surface image illustrated in FIG. 14, a part of the rear side of a parking spot on the right side of the vehicle is out of the image. Also for such a parking spot, the region of each parking spot is examined in advance, each of the vertex coordinates of polygon that defines the parking lot is obtained, teacher data in which the vertex coordinates are set as an annotation corresponding to the parking lot is generated, and the learning processing is executed.

By executing the parking spot analysis using the learning model 180 generated by performing such learning processing, it becomes possible to perform processing of estimating the rectangle (polygon) defining the region of the parking spot even in a case where only a part of the parking spot is captured in the top surface image of the parking lot to be an analysis target.

3. Regarding Configuration of Parking Spot Analysis Unit of Information Processing Device of Present Disclosure and Details of Parking Spot Analysis Processing Executed by Parking Spot Analysis Unit Next, a description will be given to a configuration of the parking spot analysis unit of the information processing device of the present disclosure and details of the parking spot analysis processing executed by the parking spot analysis unit.

Figure 15:
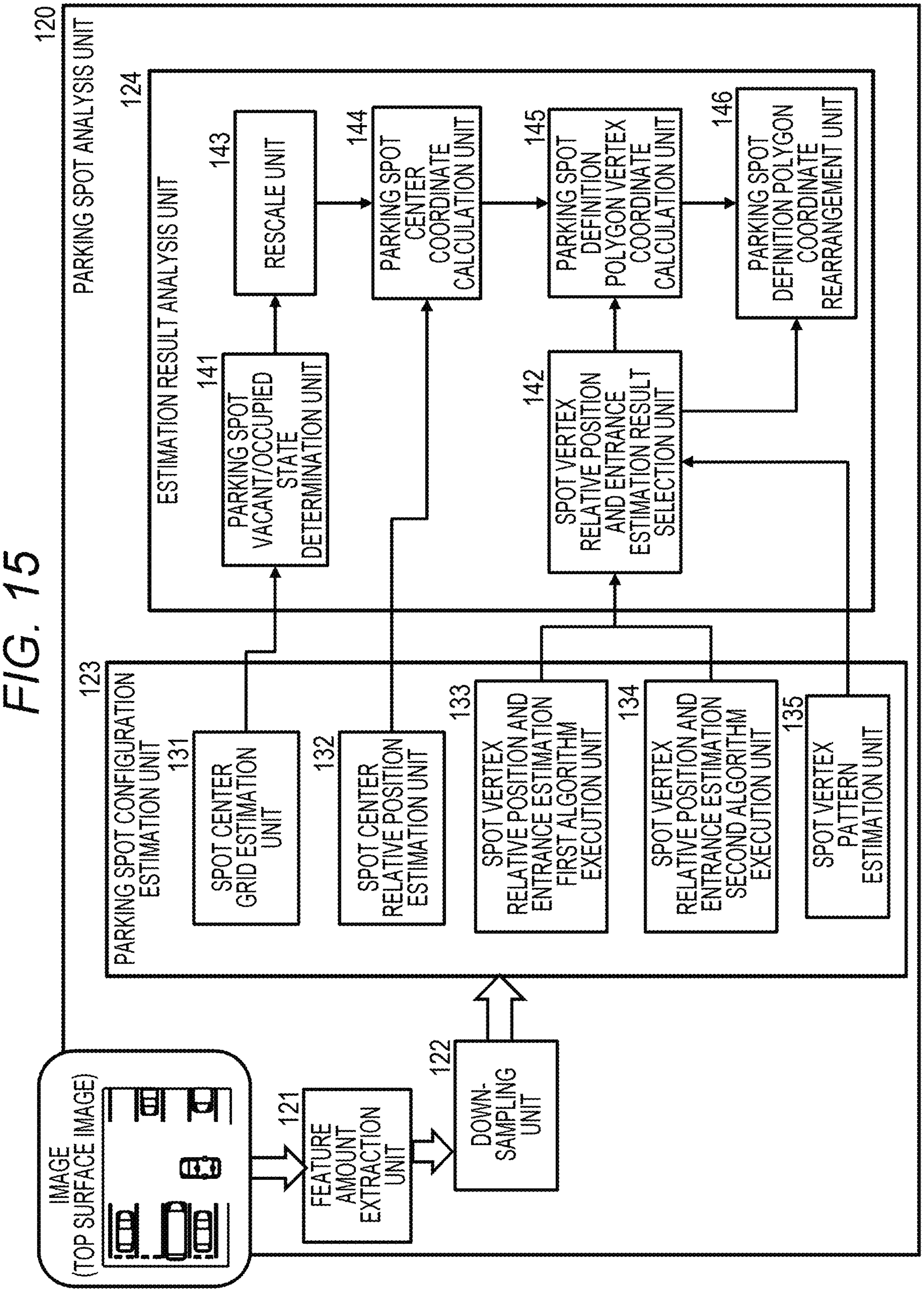
FIG. 15 is a diagram for explaining a configuration example of a parking spot analysis unit of the information processing device according to the present disclosure.

FIG. 15 is a diagram illustrating a configuration example of the parking spot analysis unit 120 of the information processing device 100 of the present disclosure.

The parking spot analysis unit 120 of the information processing device 100 of the present disclosure is input with, for example, a top surface image generated by combining images captured by four cameras that capture images in four directions of front, rear, left, and right of the vehicle, analyzes a parking spot included in the input top surface image, and generates parking spot information corresponding to each parking spot as an analysis result.

The generated parking spot information corresponding to each parking spot includes, for example, the following identification data, namely:

(1) the vacant parking spot identification frame;

(2) the occupied parking spot identification frame;

(3) the parking spot entrance direction identifier; and (4) the parking spot state (vacant/occupied) identification tag.

As illustrated in FIG. 15, the parking spot analysis unit 120 includes a feature amount extraction unit 121, a down-sampling unit 122, a parking spot configuration estimation unit 123, and an estimation result analysis unit 124.

The parking spot configuration estimation unit 123 includes a spot center grid estimation unit 131, a spot center relative position estimation unit 132, a spot vertex relative position and entrance estimation first algorithm execution unit 133, a spot vertex relative position and entrance estimation second algorithm execution unit 134, and a spot vertex pattern estimation unit 135.

Furthermore, the estimation result analysis unit 124 includes a parking spot state (vacant/occupied) determination unit 141, a spot vertex relative position and entrance estimation result selection unit 142, a rescale unit 143, a parking spot center coordinate calculation unit 144, a parking spot definition polygon vertex coordinate calculation unit 145, and a parking spot definition polygon coordinate rearrangement unit 146.

Hereinafter, processing executed by each component of the parking spot analysis unit 120 will be sequentially described.

The feature amount extraction unit 121 extracts a feature amount from a top surface image that is an input image.

The feature amount extraction unit 121 executes feature amount extraction processing, by using one learning model generated by the learning processing unit 80 described above with reference to FIG. 12.

That is, the feature amount extraction processing using a learning model for performing the feature amount extraction processing from an image is executed.

Specifically, for example, feature amount extraction using Resnet-18, which is a learning model configured by an 18-layer convolutional neural network (CNN), is executed.

By using the Resnet-18 (CNN) generated by the learning processing using a large number of parking lot images including a vacant parking spot having no parked vehicle and an occupied parking spot having a parked vehicle, it becomes possible to extract various feature amounts that can be used to identify whether each of the parking spots included in the input image is a vacant parking spot or an occupied parking spot.

Note that the feature amount extraction unit 121 is not limited to the Resnet-18 (CNN), and configurations using various other feature amount extraction means and feature amount extraction learning models can be used.

The feature amount extracted from the image by the feature amount extraction unit 121 includes a feature amount that can be used for region determination of the parking spot in the image, state (vacant/occupied) determination of each parking spot, and entrance direction determination processing of each parking spot.

The parking lot image contains, as subjects, various objects such as a white line defining a parking spot or a vehicle stop block, a wall and a pillar of the parking lot, and a vehicle parked in the parking spot, and feature amounts corresponding to these various objects are extracted.

The feature amount data extracted from the image by the feature amount extraction unit 121 is input to the parking spot configuration estimation unit 123 together with image data via the down-sampling unit 122.

The down-sampling unit 122 executes down-sampling processing on the input image (top surface image) and the feature amount data extracted from the input image (top surface image) by the feature amount extraction unit 121. Note that the down-sampling processing is performed to reduce a processing load in the parking spot configuration estimation unit 123, and is not essential.

The parking spot configuration estimation unit 123 is input with the input image (top surface image) and the feature amount data extracted from the image by the feature amount extraction unit 121, and executes analysis processing on a configuration, a state (vacant/occupied), and the like of the parking spot included in the input image.

The learning model 180 generated by the learning processing unit 80 described above with reference to FIG. 12 is also used for the parking spot analysis processing in the parking spot configuration estimation unit 123.

The learning model used by the parking spot configuration estimation unit 123 is, for example, learning models as follows:

(1) a learning model that is input with an image or an image feature amount and outputs state information (vacant/occupied) of a parking spot; and (2) a learning model that is input with an image or an image feature amount and outputs a configuration of a parking spot (a center, a parking spot definition rectangle (polygon) vertex position, a parking spot entrance direction, and the like).

As described above, the parking spot configuration estimation unit 123 includes the spot center grid estimation unit 131, the spot center relative position estimation unit 132, the spot vertex relative position and entrance estimation first algorithm execution unit 133, the spot vertex relative position and entrance estimation second algorithm execution unit 134, and the spot vertex pattern estimation unit 135.

Hereinafter, details of processing executed by each of these components will be sequentially described.

(A. Regarding Processing Executed by Spot Center Grid Estimation Unit)

Processing executed by the spot center grid estimation unit 131 will be described with reference to FIG. 16 and subsequent figures.

Figure 16:
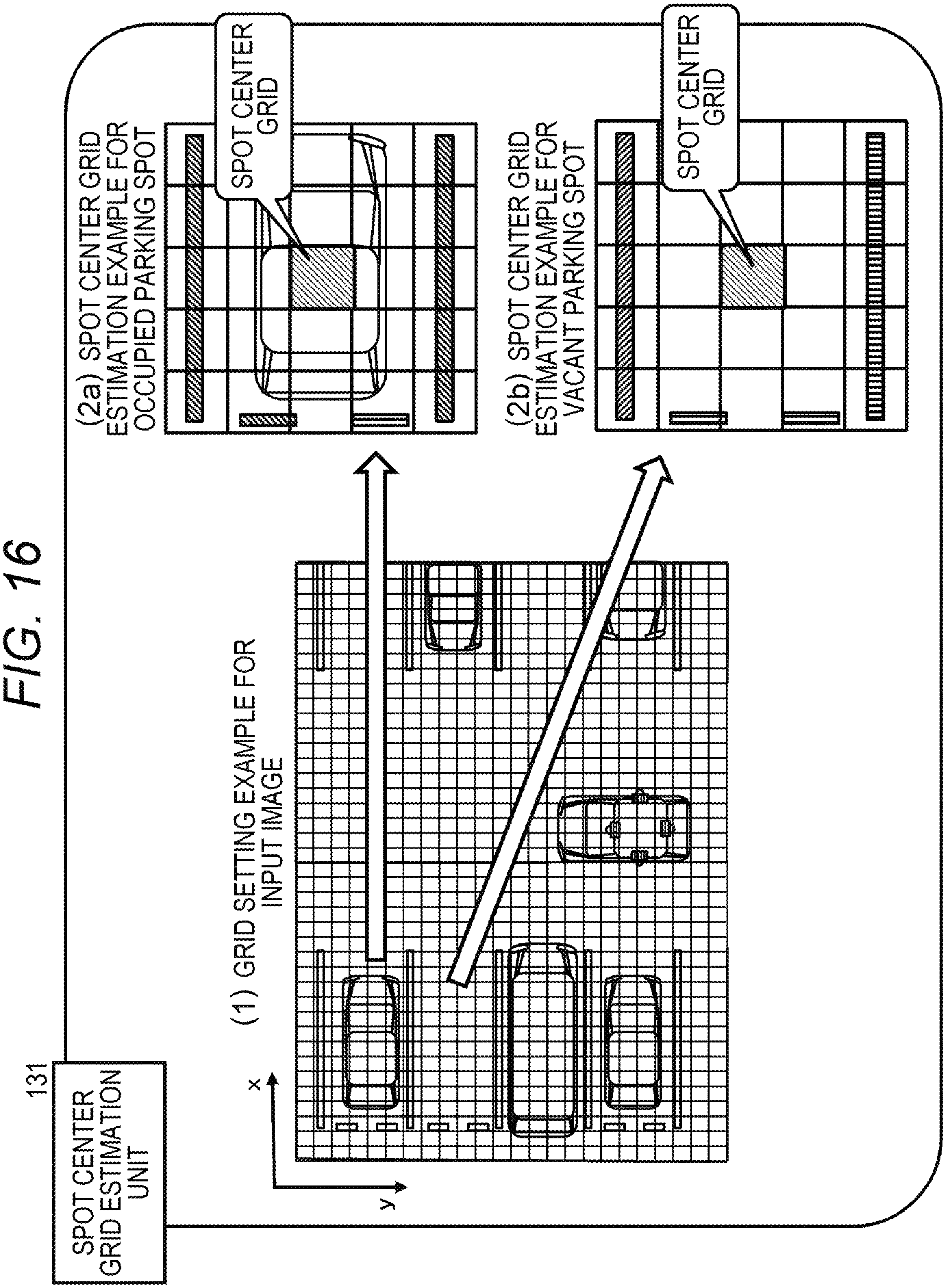
FIG. 16 is a diagram for explaining a specific example of processing executed by a spot center grid estimation unit of the information processing device according to the present disclosure.

FIG. 16 is a diagram for explaining an outline of processing executed by the spot center grid estimation unit 131.

FIG. 16 illustrates each of the following diagrams:

(1) A grid setting example for an input image (2a) A spot center grid estimation example of an occupied parking spot (2b) A spot center grid estimation example of a vacant parking spot "(1) The grid setting example for an input image" illustrated in FIG. 16 is an example in which a grid on a lattice is set for the input image. This grid is a grid set to analyze an approximate position in the image, and is set to perform efficient position analysis processing. Various settings can be made as the grid setting. For example, as illustrated in FIG. 16, in a setting in which an upper left end of the input image (top surface image) is an origin, a horizontal (right) direction is an x axis, and a vertical (lower) direction is a y axis, grids are set by lines parallel to the x axis and the y axis.

The feature amount extracted by the feature amount extraction unit 121 described above can be analyzed as a feature amount on a grid basis in the spot center grid estimation unit 131, and the spot center grid estimation unit 131 can perform estimation processing on a center grid of each parking spot on the basis of the feature amount on a grid basis.

As illustrated on the right side of FIG. 16, (2a) the spot center grid estimation example of an occupied parking spot; and (2b) the spot center grid estimation example of a vacant parking spot, these spot center grid estimation examples are center grids of individual parking spots estimated by analyzing feature amounts on a grid basis in the spot center grid estimation unit 131.

Figure 17:
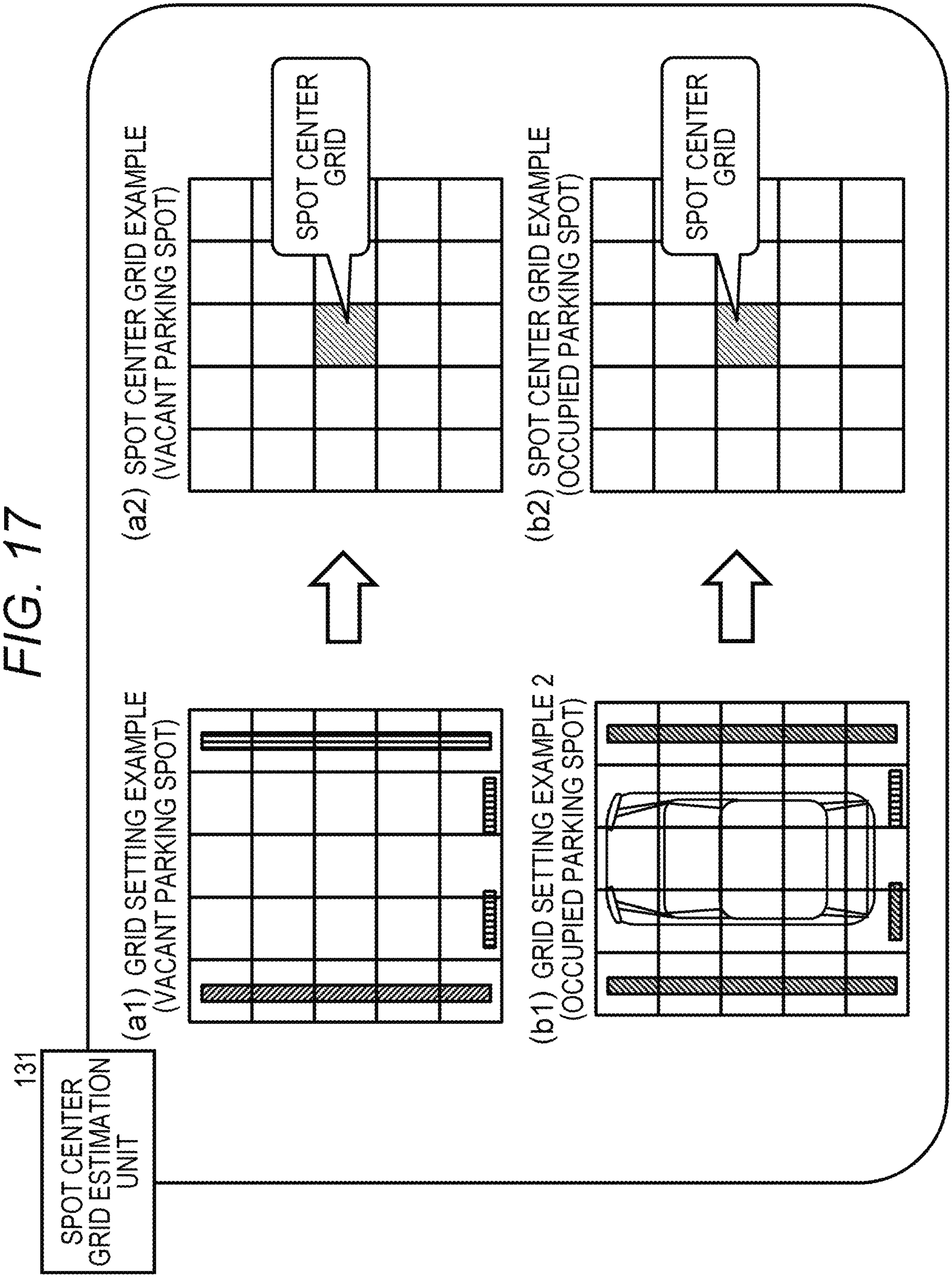
FIG. 17 is a diagram for explaining a specific example of processing executed by the spot center grid estimation unit of the information processing device according to the present disclosure.

FIG. 17 illustrates an example of a vacant parking spot and an occupied parking spot in which the grids are set, and spot center grids estimated from these parking spots subjected to the grid setting.

Data (a1) and (b1) illustrated on the left side of FIG. 17 are examples of two types of grid-set parking spots included in the input image, that is, a vacant parking spot and an occupied parking spot.

Data (a2) and (b2) illustrated on the right side of FIG. 17 are examples of the spot center grids estimated from the parking spots subjected to the grid setting, namely, (a2) a spot center grid estimation example for a vacant parking spot and (b2) a spot center grid estimation example for an occupied parking spot.

As described above, spot center grid estimation processing in the spot center grid estimation unit 131 uses the learning model 180 generated by the learning processing unit 80 described above with reference to FIG. 12.

Specifically, for example, processing using a learning model called "CenterNet" is possible.

The "CenterNet" is a learning model that enables estimation of a region of the entire object by analyzing center positions of various objects and calculating an offset from the center position to an end point of the object.

As an object region estimation technique, a technique using "bounding box" has been often used so far.

The "CenterNet" is a technique capable of performing region estimation of an object more efficiently than the "bounding box".

Figure 18:
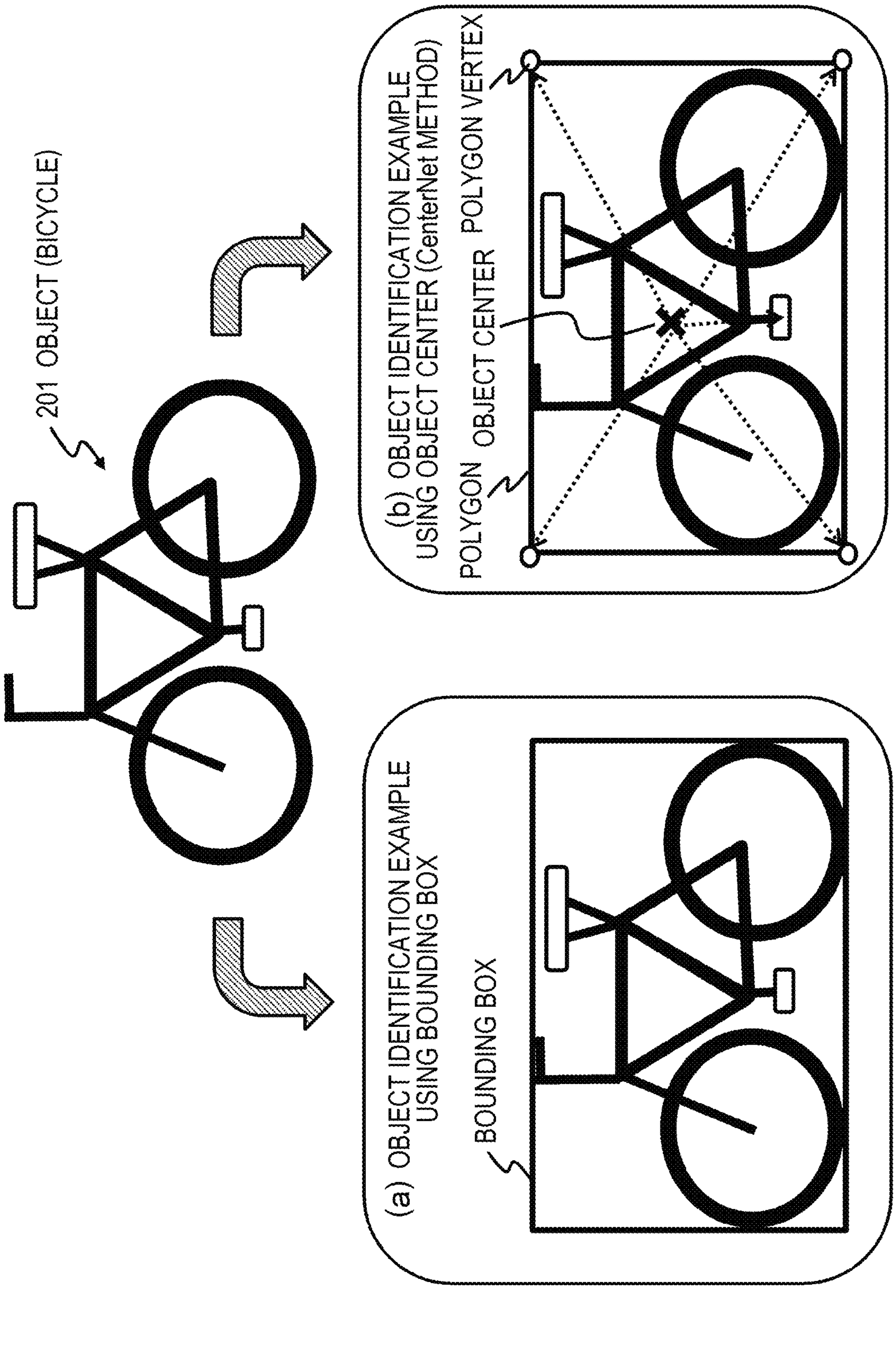
FIG. 18 is a diagram for explaining an outline of an object region estimation technique using “bounding box” and an object region estimation technique using “CenterNet”.

With reference to FIG. 18, an outline of an object region estimation technique using the "bounding box" and an object region estimation technique using the "CenterNet" will be described.

FIG. 18 illustrates a bicycle as an example of the object. In a case where an object (bicycle) 201 is included as a subject in a part of an analysis target image, the object region estimation technique using the "bounding box" has been often used as processing for estimating a range of the object (bicycle) 201.

The "bounding box" is a technique of estimating a quadrangle surrounding the object (bicycle) 201.

However, in order to determine the "bounding box" which is the quadrangle surrounding the object, there is a problem that it is necessary to perform processing of selecting the most probable bounding box from a large number of bounding boxes set on the basis of an object existence probability or the like according to a shape and a state of the object, and the processing efficiency is poor.

On the other hand, the object region estimation technique using the "CenterNet" is to estimate a center position of the object, and thereafter, processing is performed in which the quadrangle (polygon) surrounding the object is estimated by estimating a relative position of vertexes of a rectangle (polygon) that defines the object region from the estimated object center.

The object region estimation technique using the "CenterNet" can estimate the quadrangle (polygon) surrounding the object more efficiently than the "bounding box".

Note that, in the "CenterNet", an object center identification heat map is generated in order to estimate an object center position.

An example of generation processing for the object center identification heat map will be described with reference to FIG. 19.

The object center identification heat map is input to, for example, a convolutional neural network (CNN) for object center detection, which is a learning model in which an object image is generated in advance.

The object center detection convolutional neural network (CNN) is a CNN (learning model) generated by learning processing of a large number of images of objects in the same category, that is, a large number of various bicycles in the example illustrated in the figure.

Figure 19:
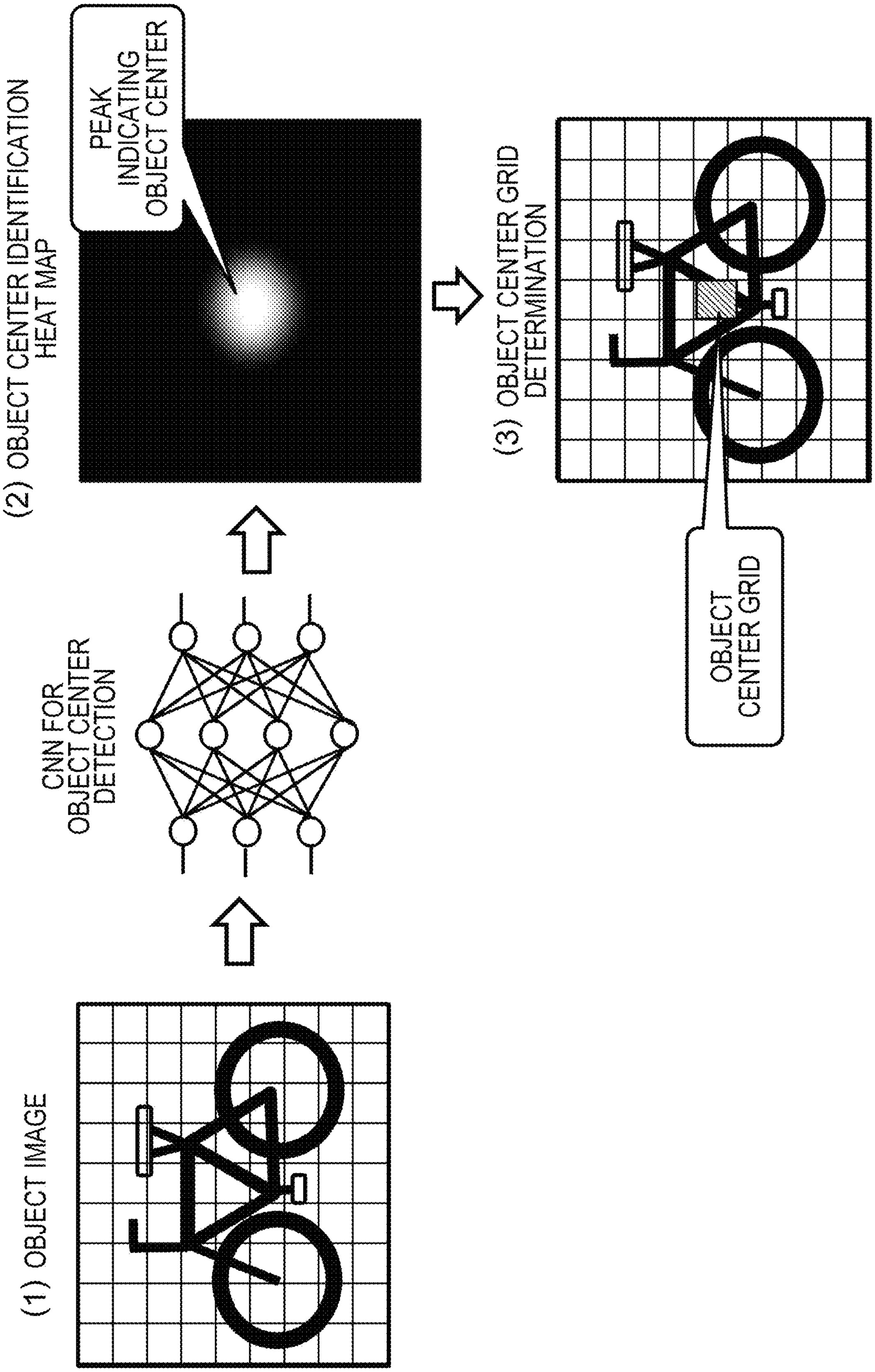
FIG. 19 is a diagram for explaining an example of generation processing for an object center identification heat map.

An image to be an object center analysis target, that is, (1) an object image illustrated in FIG. 19 is supplied to the CNN for object center detection, and processing (convolution processing) is performed, so that the object center identification heat map illustrated in FIG. 19 (2), that is, an object identification heat map having a peak value at a position estimated as the object center is generated.

Note that, in (2) the object center identification heat map illustrated in the figure, a bright portion corresponds to the peak region, and is a region having a high probability of being the object center.

A position of an object center grid can be determined as illustrated in FIG. 19 (3), on the basis of the peak position of the object center identification heat map.

Note that, in the processing of the present disclosure, the analysis target object is a parking spot, and the object center estimated by the spot center grid estimation unit 131 is a parking spot center.

Figure 20:
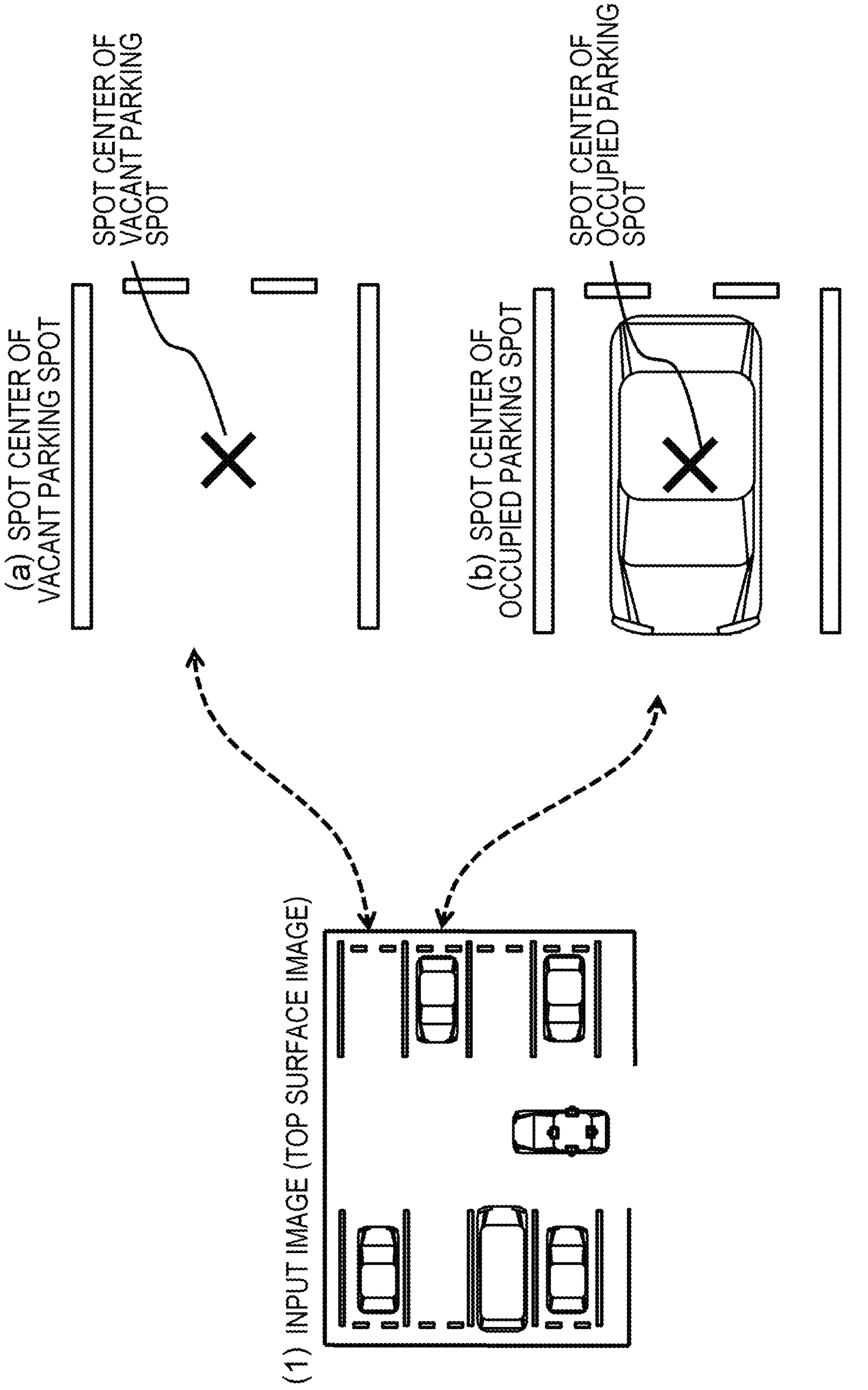
FIG. 20 is a diagram for explaining a specific example of spot center estimation processing for each parking spot included in an input image (top surface image), executed by the information processing device according to the present disclosure.

That is, as illustrated in FIG. 20, the spot center grid estimation unit 131 performs processing of estimating a spot center for each parking spot included in (1) the input image (top surface image).

FIG. 20 (*a*) illustrates an estimation example of a spot center of a vacant parking spot, and FIG. 20 (*b*) illustrates an estimation example of a center of an occupied parking spot.

Figure 21:
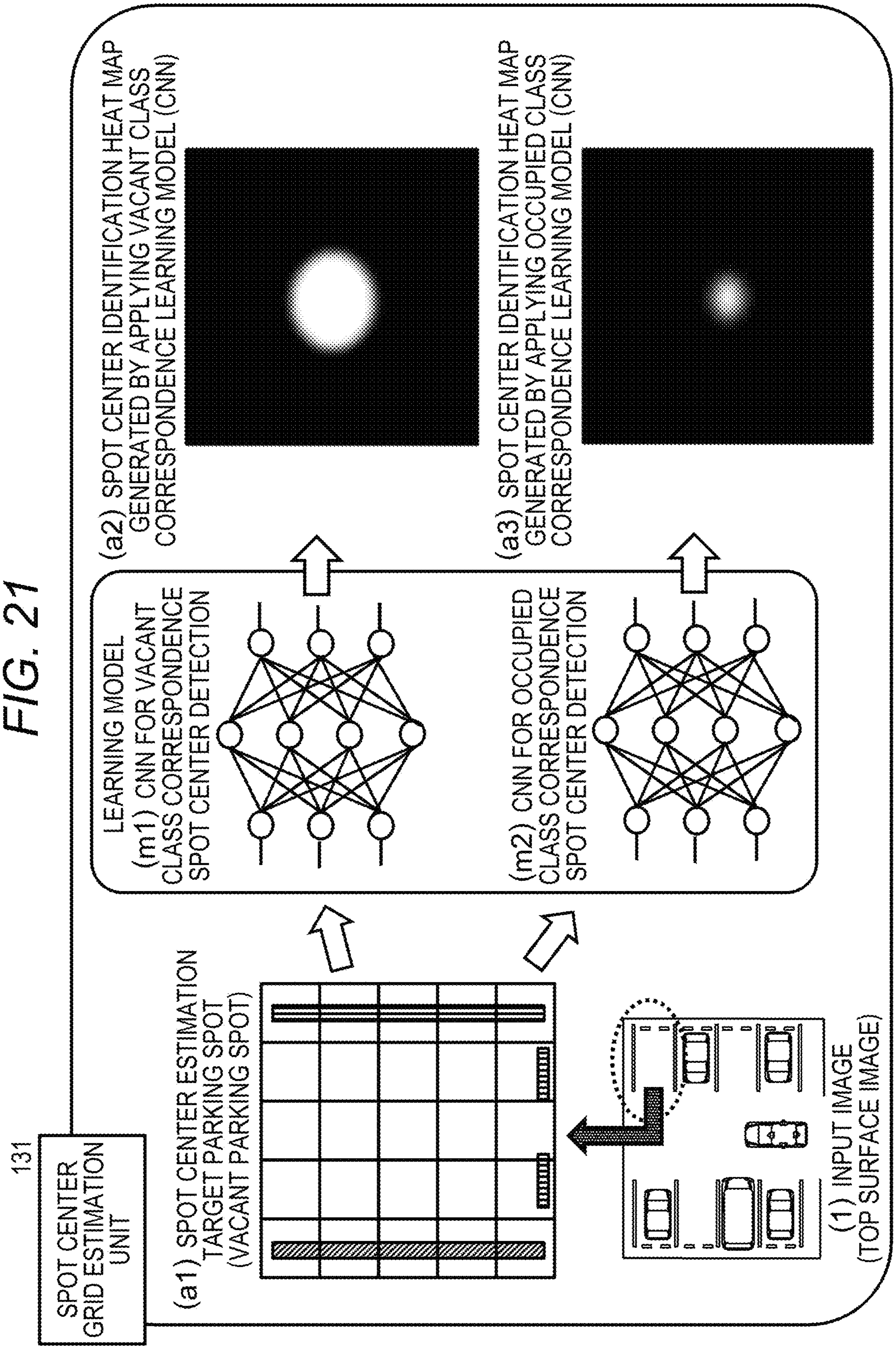
FIG. 21 is a diagram for explaining a specific example of center grid estimation processing for a parking spot by the spot center grid estimation unit.

With reference to FIG. 21 and subsequent figures, a specific example of center grid estimation processing on the parking spot by the spot center grid estimation unit 131 will be described.

FIG. 21 is a diagram for explaining a spot center grid estimation processing example for a vacant parking spot in which no parked vehicle is present.

A spot center grid is estimated for one vacant parking spot in (1) an input image (top surface image) illustrated in the lower left of FIG. 21.

A spot center grid is estimated for (a1) a spot center estimation target parking spot (vacant parking spot) illustrated on the left of FIG. 21.

The spot center grid estimation unit 131 inputs, to the learning model (CNN), image data of (a1) the spot center estimation target parking spot (vacant parking spot) illustrated on the left in FIG. 21, or feature amount data on a grid basis acquired from the image data.

Note that the learning model (CNN) used here is two learning models (CNN) as illustrated in the figure. Namely, to the following two learning models (CNN), which are:

(m1) a CNN for vacant class correspondence spot center detection, and (m2) a CNN for occupied class correspondence spot center detection, image data of (a1) the spot center estimation target parking spot (vacant parking spot) illustrated on the left of FIG. 21 or feature amount data on a grid basis acquired from the image data is input.

Here, "(m1) the CNN for vacant class correspondence spot center detection" is a learning model (CNN) generated by learning processing using, as teacher data, a large number of images of various vacant parking spots, that is, a large number of images of vacant parking spots (with annotations for spot centers) in which no vehicle is parked. That is, it is a convolutional neural network (CNN) for vacant parking spot center detection for estimating a spot center in a vacant parking spot.

Whereas, "(m2) the CNN for occupied class correspondence spot center detection" is a learning model (CNN) generated by learning processing using, as teacher data, a large number of images of various occupied parking spots, that is, a large number of images of occupied parking spots (with annotations of spot centers) in which various vehicles are parked. That is, it is a convolutional neural network (CNN) for occupied parking spot center detection for estimating a spot center in an occupied parking spot.

Two heat maps illustrated at the right end of FIG. 21 are heat maps obtained by supplying image data of (a1) the spot center estimation target parking spot (vacant parking spot) illustrated on the left of FIG. 21 or feature amount data on a grid basis acquired from the image data, to two learning models (CNN):

(m1) the CNN for vacant class correspondence spot center detection; and (m2) the CNN for occupied class correspondence spot center detection.

Namely, two heat maps of:

(a2) a spot center identification heat map generated by applying the vacant class correspondence learning model (CNN); and (a3) a spot center identification heat map generated by applying the occupied class correspondence learning model (CNN)

are generated.

In the two heat maps illustrated in the figure, a peak (output value) illustrated in the center portion of "(a2) the spot center identification heat map generated by applying the vacant class correspondence learning model (CNN)" on the upper side is larger than a peak (output value) shown at a center portion of "(a3) the spot center identification heat map generated by applying the occupied class correspondence learning model (CNN)" on the lower side.

This is due to similarity between an object (vacant parking spot) as a spot center determination target and an object class of the used learning model (CNN).

That is, in the processing example illustrated in FIG. 21, (a1) the spot center estimation target parking spot (vacant parking spot) illustrated on the left in FIG. 21, which is the spot center estimation target image, is a vacant parking spot.

In this case, "(m1) the CNN for vacant class correspondence spot center detection" which is the learning model (CNN) generated on the basis of images of vacant parking spots has higher object similarity with (a1) the spot center estimation target parking spot (vacant parking spot).

Whereas, "(m2) the CNN for occupied class correspondence spot center detection" which is the learning model (CNN) generated on the basis of images of occupied parking spots has lower object similarity with (a1) the spot center estimation target parking spot (vacant parking spot), so that a heat map with a small peak is generated.

These two spot center identification heat maps having the different peaks are input to the parking spot state (vacant/occupied) determination unit 141 of the estimation result analysis unit 124 of the parking spot analysis unit 120 illustrated in FIG. 15 described above.

The parking spot state (vacant/occupied) determination unit 141 determines that the learning model (CNN) on a side that has output the spot center identification heat map having a large peak is close to a state of the parking spot as a parking spot state (vacant/occupied) determination target.

For example, in the example illustrated in FIG. 21, the learning model (CNN) on the side that has output the spot center identification heat map having a large peak is (m1) the CNN for vacant class correspondence spot center detection.

In this case, the parking lot as a parking spot state (vacant/occupied) determination target is determined to be a vacant parking spot in which no parked vehicle is present.

Note that this processing will be described again later.

As described with reference to FIG. 21, the spot center grid estimation unit 131 supplies "(a1) the spot center estimation target parking spot (vacant parking spot)" illustrated in FIG. 21 (a1) as a learning model of two different classes, namely, two learning models (CNN) of:

(m1) the CNN for vacant class correspondence spot center detection; and (m2) the CNN for occupied class correspondence spot center detection, to generate two spot center identification heat maps.

Figure 22:
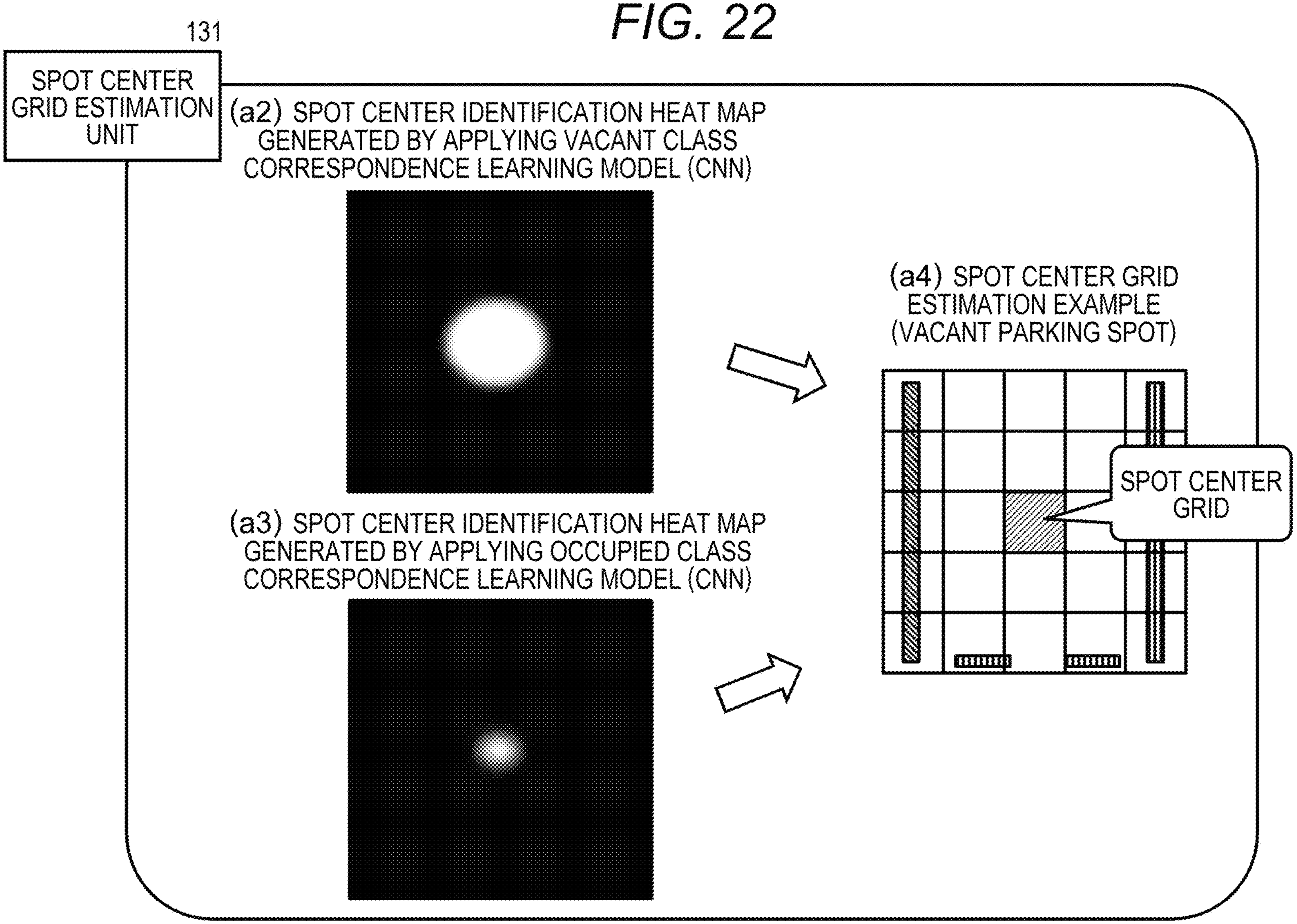
FIG. 22 is a diagram for explaining a specific example of the center grid estimation processing for a parking spot by the spot center grid estimation unit.

Moreover, as illustrated in FIG. 22, the spot center grid estimation unit 131 estimates a spot center grid of "(a1) the spot center estimation target parking spot (vacant parking spot)" on the basis of peak positions of the generated two spot center identification heat maps.

As illustrated FIG. 22 (a4) a spot center grid estimation example, a grid position corresponding to peak positions of two spot center identification heat maps is estimated as a spot center grid.

The spot center grid estimation processing example described with reference to FIGS. 21 and 22 is a processing example in a case where the parking spot set as the spot center grid estimation target is a "vacant parking spot" in which no parked vehicle is present.

Next, with reference to FIGS. 23 and 24, a spot center grid estimation processing example in a case of an "occupied parking spot" in which a parked vehicle is present will be described.

Figure 23:
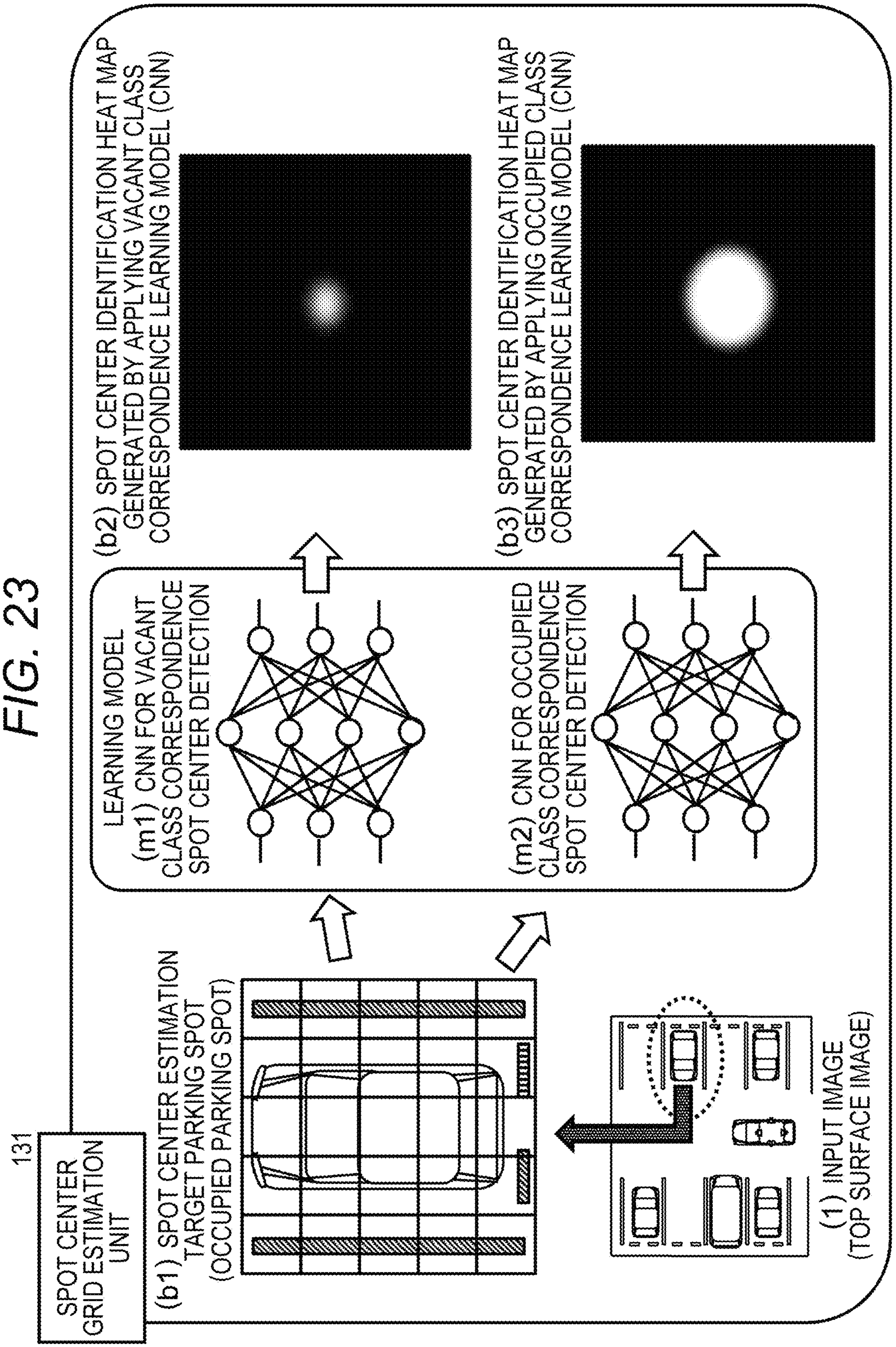
FIG. 23 is a diagram for explaining a specific example of the center grid estimation processing for a parking spot by the spot center grid estimation unit.

FIG. 23 is a diagram for explaining a spot center grid estimation processing example for an occupied parking spot in which a parked vehicle is present.

A spot center grid is estimated for one occupied parking spot in (1) an input image (top surface image) illustrated in the lower left of FIG. 23.

A spot center grid is estimated for (b1) a spot center estimation target parking spot (occupied parking spot) illustrated on the left of FIG. 23.

The spot center grid estimation unit 131 inputs, to the learning model, image data of (b1) the spot center estimation target parking spot (occupied parking spot) illustrated on the left in FIG. 23, or feature amount data on a grid basis acquired from the image data.

The learning model used here is two learning models (CNN) similarly to that described above with reference to FIG. 21. Namely, to the following two learning models (CNN), which are (m1) the CNN for vacant class correspondence spot center detection, and (m2) the CNN for occupied class correspondence spot center detection, image data of (b1) the spot center estimation target parking spot (occupied parking spot) illustrated on the left of FIG. 23 or feature amount data on a grid basis acquired from the image data is input.

As described above, "(m1) the CNN for vacant class correspondence spot center detection" is a learning model (CNN) generated by learning processing using, as teacher data, a large number of images of various vacant parking spots, that is, a large number of images of vacant parking spots (with annotations for spot centers) in which no vehicle is parked. That is, it is a convolutional neural network (CNN) for vacant parking spot center detection for estimating a spot center in a vacant parking spot.

Whereas, "(m2) the CNN for occupied class correspondence spot center detection" is a learning model (CNN) generated by learning processing using, as teacher data, a large number of images of various occupied parking spots, that is, a large number of images of occupied parking spots (with annotations of spot centers) in which various vehicles are parked. That is, it is a convolutional neural network (CNN) for occupied parking spot center detection for estimating a spot center in an occupied parking spot.

Two heat maps illustrated at the right end of FIG. 23 are heat maps obtained by supplying image data of (b1) the spot center estimation target parking spot (occupied parking spot) illustrated on the left of FIG. 23 or feature amount data on a grid basis acquired from the image data, to two learning models (CNN), which are:

(m1) the CNN for vacant class correspondence spot center detection; and (m2) the CNN for occupied class correspondence spot center detection.

Namely, two heat maps of:

(b2) a spot center identification heat map generated by applying the vacant class correspondence learning model (CNN); and (b3) a spot center identification heat map generated by applying the occupied class correspondence learning model (CNN)

are generated.

In the two heat maps illustrated in the figure, a peak (output value) illustrated in a center portion of "(b2) the spot center identification heat map generated by applying the vacant class correspondence learning model (CNN)" on the upper side is smaller than a peak (output value) shown at a center portion of "(b3) the spot center identification heat map generated by applying the occupied class correspondence learning model (CNN)" on the lower side.

This is due to similarity between an object (occupied parking spot) as a spot center determination target and an object class of the used learning model (CNN).

That is, in the processing example illustrated in FIG. 23, (b1) the spot center estimation target parking spot (occupied parking spot) illustrated on the left of FIG. 23, which is the spot center estimation target image, is an occupied parking spot in which a parked vehicle is present.

In this case, "(m2) the CNN for occupied class correspondence spot center detection" which is the learning model (CNN) generated on the basis of images of occupied parking spots has higher object similarity with (b1) the spot center estimation target parking spot (occupied parking spot).

Whereas, "(m1) the CNN for vacant class correspondence spot center detection" which is the learning model (CNN) generated on the basis of images of vacant parking spots has lower object similarity with (b1) the spot center estimation target parking spot (occupied parking spot), so that a heat map with a small peak is generated.

These two spot center identification heat maps having the different peaks are input to the parking spot state (vacant/occupied) determination unit 141 of the estimation result analysis unit 124 of the parking spot analysis unit 120 illustrated in FIG. 15 described above.

The parking spot state (vacant/occupied) determination unit 141 determines that the learning model (CNN) on a side that has output the spot center identification heat map having a large peak is close to a state of the parking spot as a parking spot state (vacant/occupied) determination target.

For example, in the example illustrated in FIG. 23, the learning model (CNN) on the side that has output the spot center identification heat map having a large peak is (m2) the CNN for occupied class correspondence spot center detection.

In this case, the parking lot as a parking spot state (vacant/occupied) determination target is determined to be an occupied parking spot in which a parked vehicle is present.

Note that this processing will be described again later.

As described with reference to FIG. 23, the spot center grid estimation unit 131 supplies "(b1) the spot center estimation target parking spot (occupied parking spot)" illustrated in FIG. 23 (b1) to a learning model of two different classes, namely, two learning models (CNN) of:

(m1) the CNN for vacant class correspondence spot center detection; and (m2) the CNN for occupied class correspondence spot center detection, to generate two spot center identification heat maps.

Figure 24:
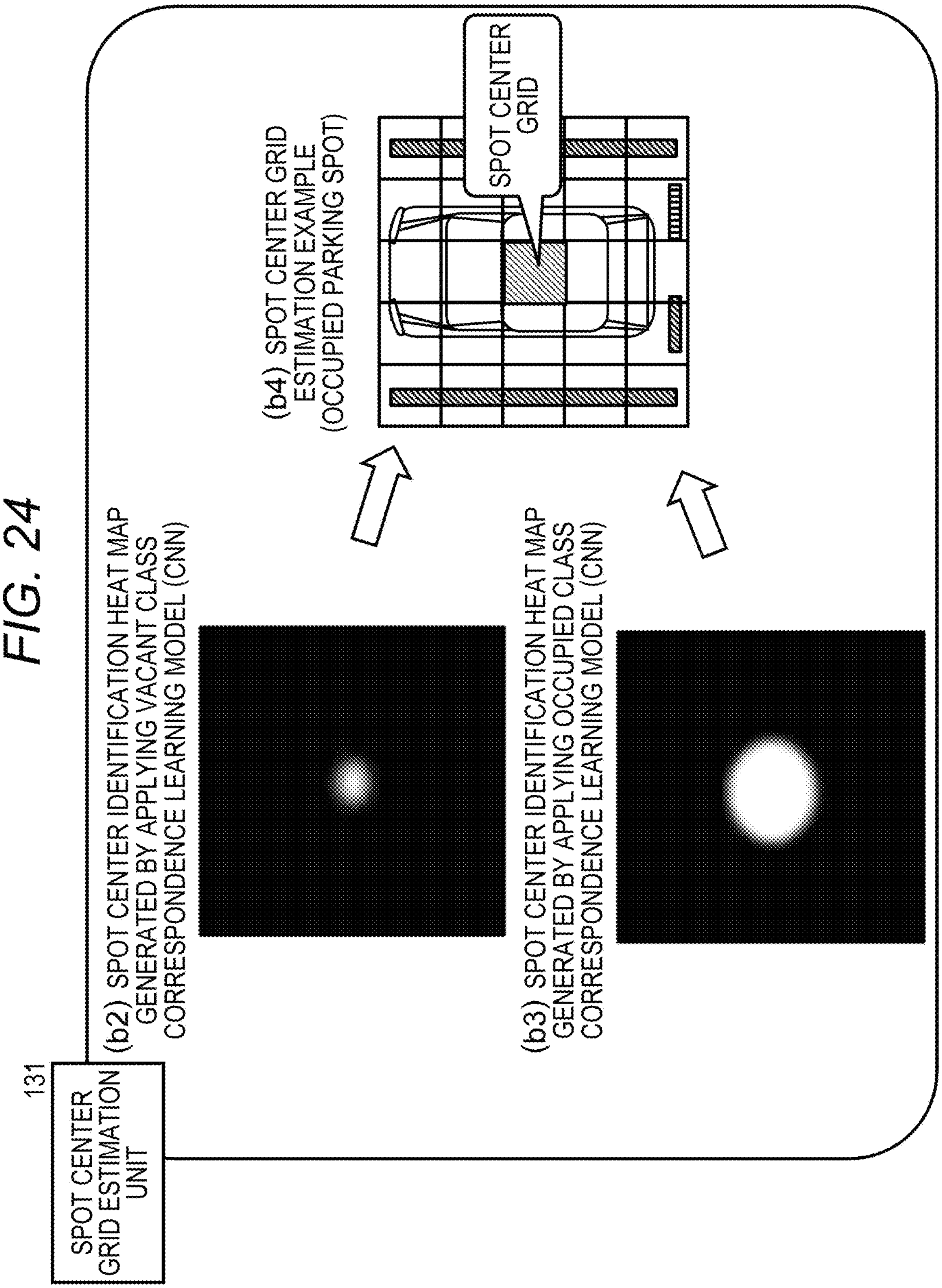
FIG. 24 is a diagram for explaining a specific example of the center grid estimation processing for a parking spot by the spot center grid estimation unit.

Moreover, as illustrated in FIG. 24, the spot center grid estimation unit 131 estimates a spot center grid of "(b1) the spot center estimation target parking spot (occupied parking spot)" on the basis of peak positions of the generated two spot center identification heat maps.

As illustrated FIG. 24 (b4) a spot center grid estimation example, a grid position corresponding to peak positions of two spot center identification heat maps is estimated as a spot center grid.

(B. Regarding Processing Executed by Spot Center Relative Position Estimation Unit)

Next, processing executed by the spot center relative position estimation unit 132 in the parking spot configuration estimation unit 123 of the parking spot analysis unit 120 illustrated in FIG. 15 will be described.

Processing executed by the spot center relative position estimation unit 132 will be described with reference to FIG. 25.

As described above with reference to FIGS. 16 to 24, the spot center grid estimation unit 131 generates the spot center identification heat map, and performs processing of selecting a grid corresponding to a peak position of the generated heat map as a spot center.

However, the spot center grid estimation unit 131 merely estimates one grid including the center position of the parking spot. That is, an actual center position of the parking spot does not necessarily coincide with a center of the spot center grid.

The spot center relative position estimation unit 132 estimates the actual center position of the parking spot.

Figure 25:
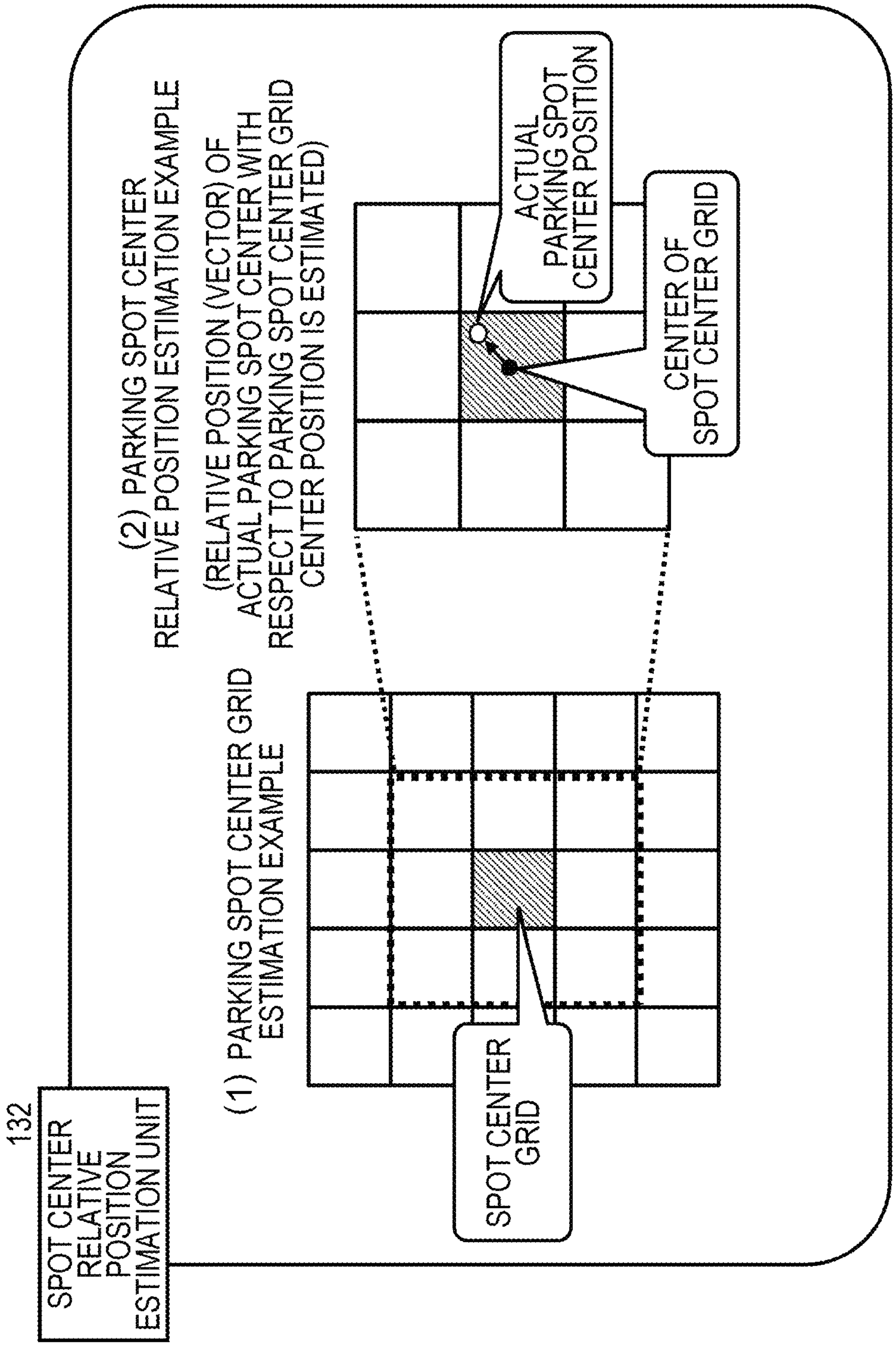
FIG. 25 is a diagram for explaining processing executed by a spot center relative position estimation unit.

Specifically, as illustrated in FIG. 25, a relative position (vector) is calculated between a center of a spot center grid estimated by the spot center grid estimation unit 131 and the actual center position of the parking spot.

This processing will be described with reference to FIG. 25. FIG. 25 illustrates the following figures:

(1) a parking spot center grid estimation example; and (2) a parking spot center relative position estimation example.

"(1) The parking spot center grid estimation example" indicates a spot center grid estimated in the processing of the spot center grid estimation unit 131 described above with reference to FIGS. 16 to 24.

The actual spot center is within this spot center grid, but does not necessarily coincide with the grid center, and is often located at a position shifted from the grid center as shown in "(2) the parking spot center relative position estimation example".

The actual spot center can be obtained by analyzing a peak position of the spot center identification heat map generated in the processing of the spot center grid estimation unit 131 described above with reference to FIGS. 16 to 24 on a pixel basis of an image, instead of a grid basis.

The spot center relative position estimation unit 132 analyzes the peak position of the spot center identification heat map on a pixel basis of the image instead of on a grid basis, and estimates an "actual parking spot center position" in the spot center grid as illustrated in FIG. 25 (2).

Moreover, as illustrated in FIG. 25 (2), a vector (offset) from a "center of the spot center grid" to the "actual parking spot center position" is calculated.

(C. Processing Executed by Spot Vertex Relative Position and Entrance Estimation First Algorithm Execution Unit and Spot Vertex Relative Position and Entrance Estimation Second Algorithm Execution Unit)

Next, a description is given to processing executed by the spot vertex relative position and entrance estimation first algorithm execution unit 133 and the spot vertex relative position and entrance estimation second algorithm execution unit 134 in the parking spot configuration estimation unit 123 of the parking spot analysis unit 120 illustrated in FIG. 15.

Figure 26:
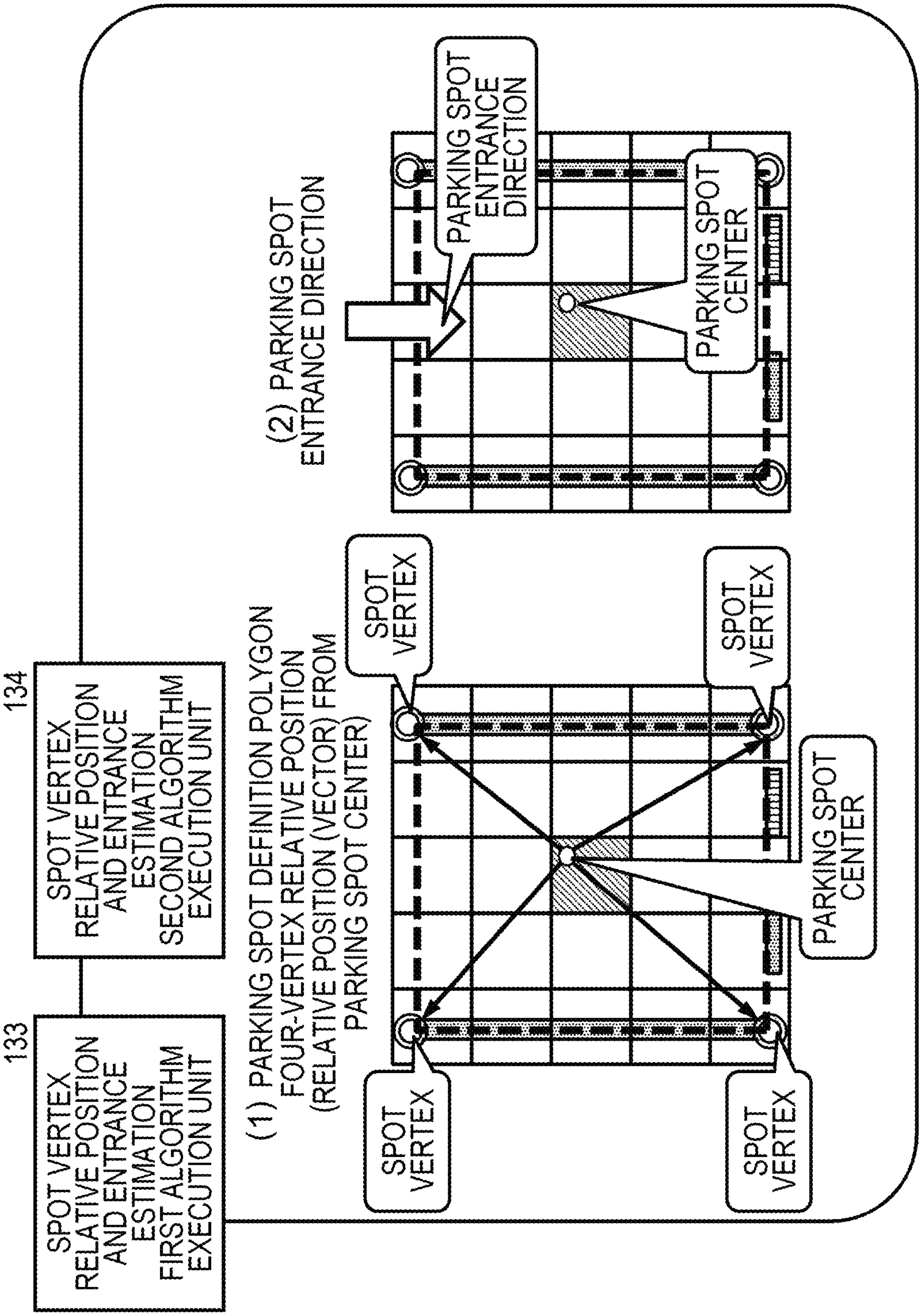
FIG. 26 is a diagram for explaining processing executed by a spot vertex relative position and entrance estimation first algorithm execution unit and a spot vertex relative position and entrance estimation second algorithm execution unit.

With reference to FIG. 26 and subsequent figures, a description is given to processing executed by the spot vertex relative position and entrance estimation first algorithm execution unit 133 and the spot vertex relative position and entrance estimation second algorithm execution unit 134.

First, with reference to FIG. 26, a description is given to an outline of the processing executed by the spot vertex relative position and entrance estimation first algorithm execution unit 133 and the spot vertex relative position and entrance estimation second algorithm execution unit 134.

The spot vertex relative position and entrance estimation first algorithm execution unit 133 and the spot vertex relative position and entrance estimation second algorithm execution unit 134 have the same processing purpose, and the purpose thereof is, as illustrated in FIG. 26, to estimate the following two pieces of parking spot configuration information.

(1) A parking spot definition polygon four-vertex relative position (2) A parking spot entrance direction "(1) The parking spot definition polygon four-vertex relative position" is a relative position (vector) of four vertexes of a polygon (rectangle) that defines a region of a parking spot from the actual spot center estimated by the spot center relative position estimation unit 132 described above with reference to FIG. 25.

"(2) The parking spot entrance direction" is an entrance direction in a case of entering the parking spot.

"(1) The parking spot definition polygon four-vertex relative position" can be estimated on the basis of "CenterNet" which is a learning model applied to the spot center grid estimation processing that is performed by the spot center grid estimation unit 131 and is described above with reference to FIGS. 18 to 24, and on the basis of a feature amount extracted by the feature amount extraction unit 121.

As described above, the "CenterNet" is a learning model that enables estimation of a region of the entire object by analyzing center positions of various objects and calculating an offset from the center position to an end point of the object.

By applying the "CenterNet", it is possible to calculate a spot center, and to estimate polygon vertexes of a parking spot, from a feature of the spot center and, for example, a feature amount detected by the feature amount detection unit 121, specifically, a white line that defines the parking lot, a vehicle stop block, a parked vehicle, and the like.

"(2) The parking spot entrance direction" is executed as processing of selecting two vertexes on the entrance side of the parking spot from the four polygon vertexes, after "(1) the parking spot definition polygon four-vertex relative position" is obtained.

As described above with reference to FIGS. 12 and 13, the learning model 180 used by the parking spot analysis unit 120 is a learning model generated by inputting, as teacher data, various parking spot images and annotations (metadata) corresponding to the images. As described with reference to FIG. 13, the annotation (metadata) corresponding to the image includes entrance-side vertex information of the parking spot definition polygon.

By inputting a parking spot image as a processing target or feature amount data acquired from the parking spot image to such a learning model for analysis, it is possible to estimate a polygon vertex on the entrance side of the parking spot as a processing target.

As described above, the spot vertex relative position and entrance estimation first algorithm execution unit 133 and the spot vertex relative position and entrance estimation second algorithm execution unit 134 have the same processing purpose, and estimates, as illustrated in FIG. 26, the following two pieces of parking spot configuration information.

(1) The parking spot definition polygon four-vertex relative position (2) The parking spot entrance direction A difference between the spot vertex relative position and entrance estimation first algorithm execution unit 133 and the spot vertex relative position and entrance estimation second algorithm execution unit 134 is an arrangement algorithm of vertexes of the parking spot definition polygon.

A difference between these two polygon vertex arrangement algorithms will be described with reference to FIGS. 27 and 28.

First, with reference to FIG. 27, the polygon vertex arrangement algorithm executed by the spot vertex relative position and entrance estimation first algorithm execution unit 133 will be described.

Figure 27:
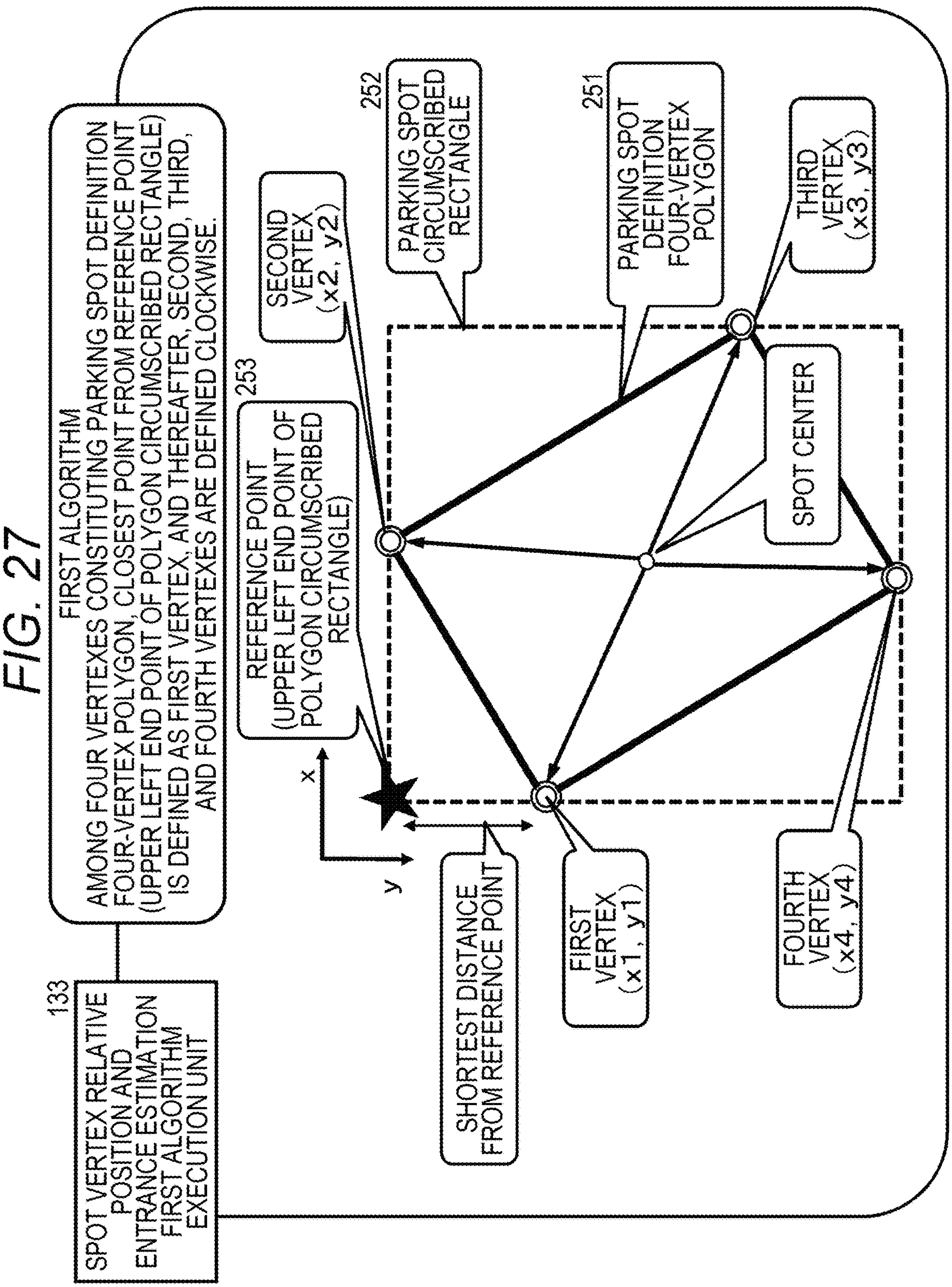
FIG. 27 is a diagram for explaining processing executed by the spot vertex relative position and entrance estimation first algorithm execution unit.

FIG. 27 illustrates a parking spot definition four-vertex polygon 251 having a rectangular shape. The parking spot definition four-vertex polygon 251 has four polygon vertexes.

These are a first vertex (x1, y1) to a fourth vertex (x4, y4) illustrated in FIG. 27.

The spot vertex relative position and entrance estimation first algorithm execution unit 133 performs processing of arranging the four vertexes, that is, the first vertex (x1, y1) to the fourth vertex (x4, y4) of the parking spot definition four-vertex polygon 251 in accordance with the first algorithm.

As illustrated in an upper part of FIG. 27, the first algorithm is the following vertex arrangement algorithm:

"among four vertexes constituting a parking spot definition four-vertex polygon, the closest point from a reference point (an upper left end point of a polygon circumscribed rectangle) is defined as a first vertex, and thereafter, a second, third, and fourth vertexes are defined clockwise".

A reference point 253 illustrated in FIG. 27 is an upper left end point of a circumscribed rectangle 252 of the parking spot definition four-vertex polygon 251. Note that the circumscribed rectangle 252 is a circumscribed rectangle configured by lines (=lines parallel to grid configuration lines) parallel to the x-axis and the y-axis (FIG. 16) of the parking lot image (top surface image) input to the parking spot analysis unit 120, that is, the parking lot image (top surface image) in which the grids are set described above with reference to FIG. 16.

In accordance with the following first algorithm, namely, the vertex arrangement algorithm of "among four vertexes constituting a parking spot definition four-vertex polygon, the closest point from a reference point (an upper left end point of a polygon circumscribed rectangle) is defined as a first vertex, and thereafter, a second, third, and fourth vertexes are defined clockwise", when the arrangement of the four vertexes, that is, the first vertex (x1, y1) to the fourth vertex (x4, y4) of the parking spot definition four-vertex polygon 251 is executed, an arrangement illustrated in FIG. 27 is obtained.

That is, a point at the upper left end closest to the reference point 253 is selected as the first vertex (x1, y1). Thereafter, the second vertex (x2, y2), the third vertex (x3, y3), and the fourth vertex (x4, y4) are sequentially selected clockwise.

As illustrated in FIG. 27, the spot vertex relative position and entrance estimation first algorithm execution unit 133 performs processing of arranging the four vertexes, that is, the first vertex (x1, y1) to the fourth vertex (x4, y4) of the parking spot definition four-vertex polygon 251 in accordance with the first algorithm.

Next, with reference to FIG. 28, the polygon vertex arrangement algorithm executed by the spot vertex relative position and entrance estimation second algorithm execution unit 134 will be described.

Figure 28:
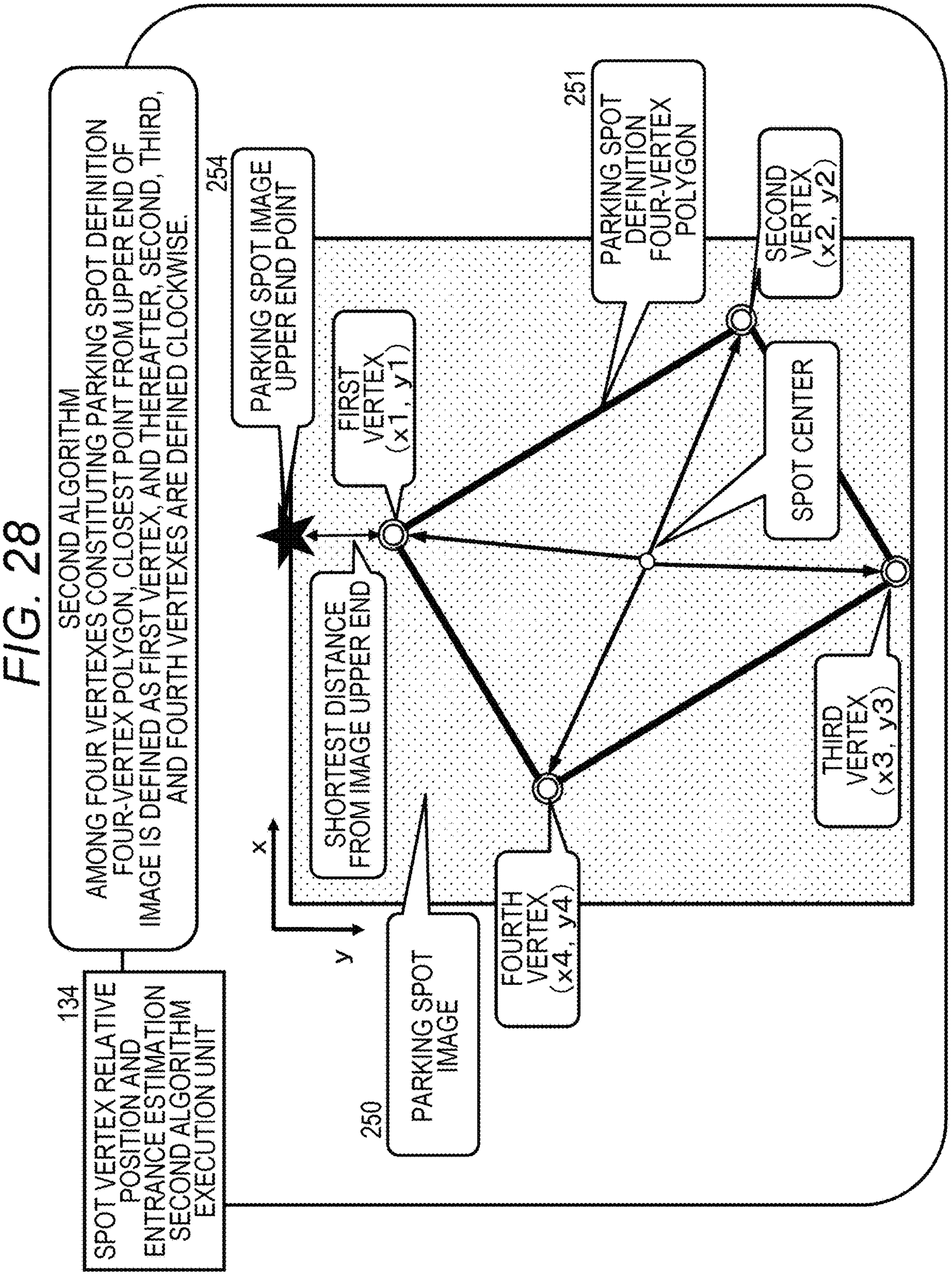
FIG. 28 is a diagram for explaining processing executed by the spot vertex relative position and entrance estimation second algorithm execution unit.

FIG. 28 illustrates the parking spot definition four-vertex polygon 251 having a rectangular shape. The parking spot definition four-vertex polygon 251 has four polygon vertexes.

These are a second vertex (x1, y1) to a fourth vertex (x4, y4) illustrated in FIG. 28.

The spot vertex relative position and entrance estimation second algorithm execution unit 134 performs processing of arranging the four vertexes, that is, the second vertex (x1, y1) to the fourth vertex (x4, y4) of the parking spot definition four-vertex polygon 251 in accordance with a second algorithm.

As illustrated in an upper part of FIG. 28, the second algorithm is the following vertex arrangement algorithm:

"among four vertexes constituting a parking spot definition four-vertex polygon, the closest point from an upper end of the image is defined as a first vertex, and thereafter, a second, third, and fourth vertexes are defined clockwise".

A parking spot image 250 illustrated in FIG. 28 is a parking lot image (top surface image) input to the parking spot analysis unit 120, that is, the parking lot image (top surface image) in which the grids are set described above with reference to FIG. 16.

In accordance with the second algorithm, namely, the following vertex arrangement algorithm:

"among four vertexes constituting a parking spot definition four-vertex polygon, the closest point from an upper end of the image is defined as a first vertex, and thereafter, a second, third, and fourth vertexes are defined clockwise", when the arrangement of the four vertexes, that is, the first vertex (x1, y1) to the fourth vertex (x4, y4) of the parking spot definition four-vertex polygon 251 is executed, an arrangement illustrated in FIG. 28 is obtained.

That is, a point at the upper right end closest to the upper end of the image is selected as the first vertex (x1, y1). Thereafter, the second vertex (x2, y2), the third vertex (x3, y3), and the fourth vertex (x4, y4) are sequentially selected clockwise.

As illustrated in FIG. 28, the spot vertex relative position and entrance estimation second algorithm execution unit 134 performs processing of arranging the four vertexes, that is, the first vertex (x1, y1) to the fourth vertex (x4, y4) of the parking spot definition four-vertex polygon 251 in accordance with the second algorithm.

In this way, in the spot vertex relative position and entrance estimation first algorithm execution unit 133 and the spot vertex relative position and entrance estimation second algorithm execution unit 134, an arrangement algorithm of four vertexes, that is, the first vertex (x1, y1) to the fourth vertex (x4, y4), of the parking spot definition four-vertex polygon 251 is different.

The reason why the two types of vertex arrangement algorithms are executed in parallel in this manner is that a vertex arrangement error may occur if only one algorithm is used.

A specific example in which a vertex arrangement error occurs will be described with reference to FIGS. 29 and 30.

Figure 29:
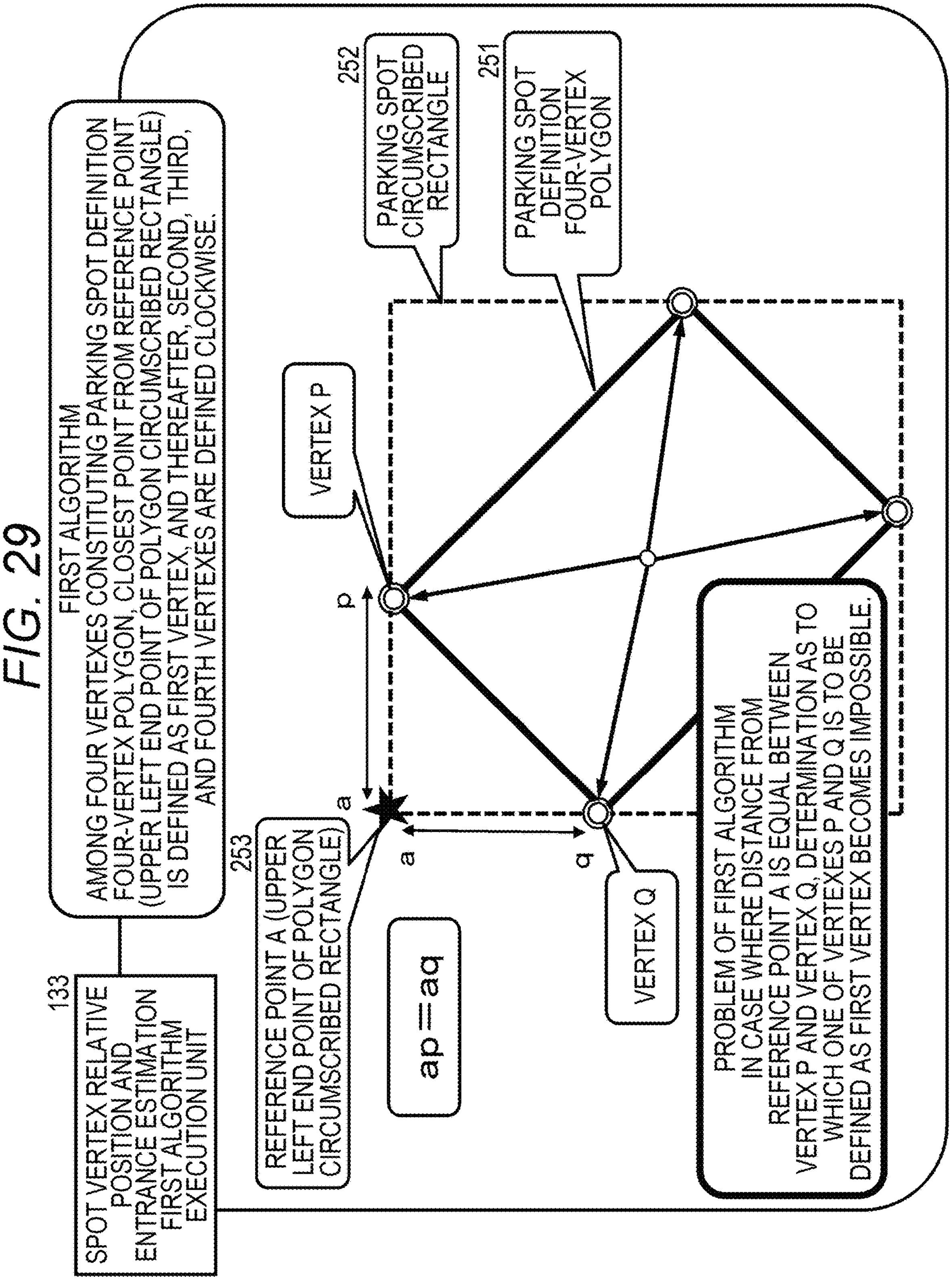
FIG. 29 is a diagram for explaining a problem of processing executed by the spot vertex relative position and entrance estimation first algorithm execution unit.

FIG. 29 is a diagram illustrating an occurrence case of a vertex arrangement error in vertex arrangement processing according to the first algorithm executed by the spot vertex relative position and entrance estimation first algorithm execution unit 133.

The first algorithm is a vertex arrangement algorithm of "among four vertexes constituting a parking spot definition four-vertex polygon, the closest point from a reference point (an upper left end point of a polygon circumscribed rectangle) is defined as a first vertex, and thereafter, a second, third, and fourth vertexes are defined clockwise".

The parking spot definition four-vertex polygon 251 illustrated in FIG. 29 is set to be inclined by 45 degrees with respect to the circumscribed rectangle 252.

In a case of such a setting, both two points of vertexes P and Q of the parking spot definition polygon 251 illustrated in FIG. 29 are closest points equidistant from the reference point (the upper left end point of the polygon circumscribed rectangle).

As a result, in a case of selecting the first vertex in accordance with the first algorithm described above, there is a possibility that both of the points P and Q are selected as the first vertex (x1, y1), and a failure of the algorithm occurs.

In such a case, the first algorithm cannot be used.

Next, with reference to FIG. 30, a description will be given of an occurrence case of a vertex arrangement error in the vertex arrangement processing according to the second algorithm executed by the spot vertex relative position and entrance estimation second algorithm execution unit 134.

The second algorithm is a vertex arrangement algorithm of "among four vertexes constituting a parking spot definition four-vertex polygon, the closest point from an upper end of the image is defined as a first vertex, and thereafter, a second, third, and fourth vertexes are defined clockwise".

Figure 30:
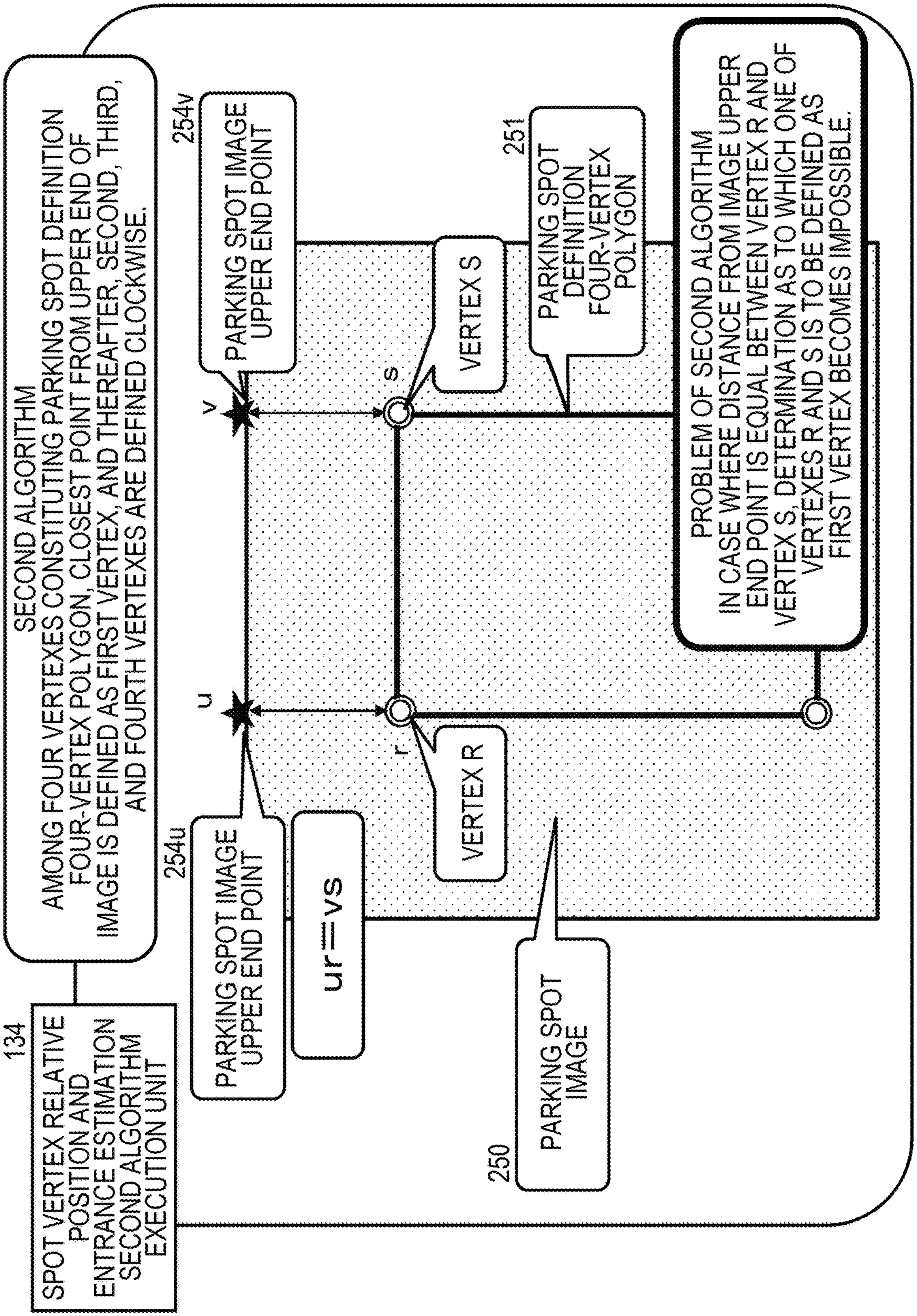
FIG. 30 is a diagram for explaining a problem of processing executed by the spot vertex relative position and entrance estimation second algorithm execution unit.

The parking spot definition four-vertex polygon 251 illustrated in FIG. 30 is set to have an inclination of 0 degrees with respect to the parking spot image 250.

In a case of such a setting, both two points of vertexes R and S of the parking spot definition polygon 251 illustrated in FIG. 30 are closest points equidistant from an upper end point of the parking spot image 250.

As a result, in a case of selecting the first vertex in accordance with the second algorithm described above, there is a possibility that both of the points R and S are selected as the first vertex (x1, y1), and a failure of the algorithm occurs.

In such a case, the second algorithm cannot be used.

In this way, in both the spot vertex relative position and entrance estimation first algorithm execution unit 133 and the spot vertex relative position and entrance estimation second algorithm execution unit 134, the vertex arrangement cannot be performed in a case where the arrangement of the parking spot definition four-vertex polygon 251 is a specific arrangement.

In order to solve this problem, the information processing device according to the present disclosure has a configuration provided with two processing units in the parking spot configuration estimation unit 123 of the parking spot analysis unit 120, that is, the spot vertex relative position and entrance estimation first algorithm execution unit 133 and the spot vertex relative position and entrance estimation second algorithm execution unit 134.

These two algorithm execution units execute the spot vertex relative position and entrance estimation processing in parallel.

Two "spot vertex relative position and entrance estimation results" as results of execution by these two algorithm execution units are output to the "spot vertex relative position and entrance estimation result selection unit 142" provided in the next estimation result analysis unit 124.

The "spot vertex relative position and entrance estimation result selection unit 142" of the estimation result analysis unit 124 selects one estimation result from the two estimation results input from the two algorithm execution units.

Figure 31:
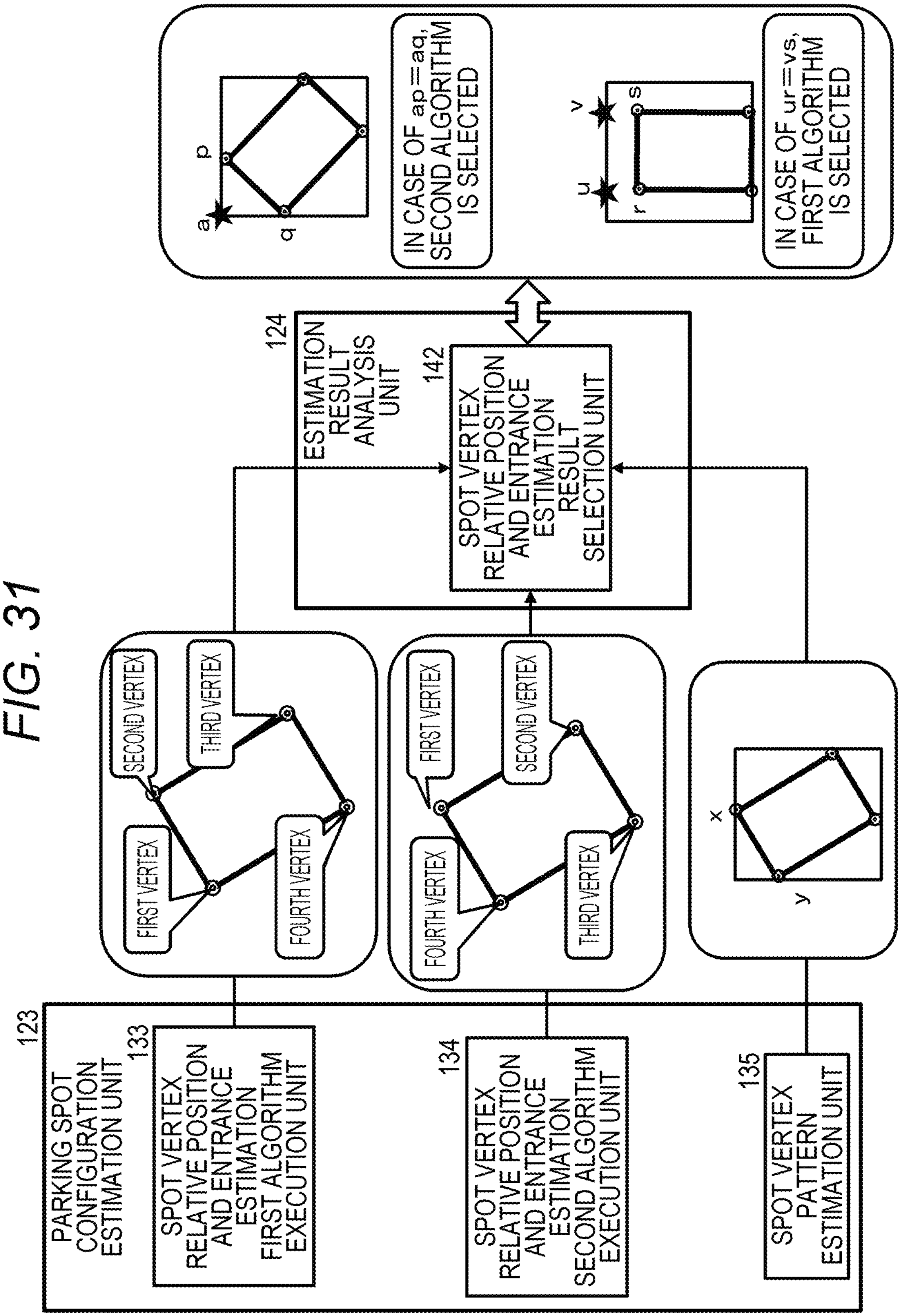
FIG. 31 is a diagram for explaining an example of estimation result selection processing executed by a "spot vertex relative position and entrance estimation result selection unit" of an estimation result analysis unit.

With reference to FIG. 31, a description is given to an estimation result selection processing example executed by the "spot vertex relative position and entrance estimation result selection unit 142" of the estimation result analysis unit 124.

As illustrated in FIG. 31, the spot vertex relative position and entrance estimation result selection unit 142 of the estimation result analysis unit 124 is input with spot vertex relative position and entrance estimation results according to individual algorithms individually from the spot vertex relative position and entrance estimation first algorithm execution unit 133 and the spot vertex relative position and entrance estimation second algorithm execution unit 134 in the previous stage.

Moreover, the spot vertex relative position and entrance estimation result selection unit 142 is input with an estimation result of a spot vertex pattern from the spot vertex pattern estimation unit 135 of the parking spot configuration estimation unit 123 in the previous stage.

The spot vertex pattern estimation unit 135 of the parking spot configuration estimation unit 123 performs processing of estimating an inclination, a shape, and the like of the parking spot definition four-vertex polygon. This estimation processing is executed using a learning model.

Specifically, an inclination of the parking spot definition four-vertex polygon, that is, an inclination with respect to an input image (top surface image) and an inclination angle with respect to a circumscribed rectangle are analyzed, and an analysis result is input to the spot vertex relative position and entrance estimation result selection unit 142 of the estimation result analysis unit 124.

Note that the estimation processing in the spot vertex pattern estimation unit 135 is not limited to that using the learning model, and may be executed on a rule basis. In a case where the estimation processing is executed on a rule basis, a result obtained by analyzing, on a rule basis, an inclination of the parking spot definition four-vertex polygon, that is, an inclination with respect to the input image (top surface image), and an inclination angle with respect to the circumscribed rectangle may be input to the spot vertex relative position and entrance estimation result selection unit 142 of the estimation result analysis unit 124.

On the basis of inclination information of the parking spot definition four-vertex polygon input from the spot vertex pattern estimation unit 135, the spot vertex relative position and entrance estimation result selection unit 142 of the estimation result analysis unit 124 determines which estimation result to select from among the estimation result of the spot vertex relative position and entrance estimation first algorithm execution unit 133 and the estimation result of the spot vertex relative position and entrance estimation second algorithm execution unit 134.

Specifically, for example, as described above with reference to FIG. 29, in a case where the parking spot definition four-vertex polygon 251 has an inclination of 45 degrees with respect to the parking lot circumscribed rectangle 252, the estimation result of the spot vertex relative position and entrance estimation second algorithm execution unit 134 is selected without selecting the estimation result of the spot vertex relative position and entrance estimation first algorithm execution unit 133.

Furthermore, for example, as described above with reference to FIG. 30, in a case where the parking spot definition four-vertex polygon 251 has an inclination of 0 degrees with respect to the input image (top surface image), the estimation result of the spot vertex relative position and entrance estimation first algorithm execution unit 133 is selected without selecting the estimation result of the spot vertex relative position and entrance estimation second algorithm execution unit 134.

In this way, in a case where there is a possibility that any of the algorithms will cause an error, without selecting the estimation result of the algorithm, processing of selecting an estimation result of another algorithm is performed.

By performing such processing, it becomes possible to select a correct estimation result of a spot vertex relative position and an entrance for all inclinations of the parking spot definition four-vertex polygon, and use the estimation result for the subsequent processing.

Next, with reference to FIGS. 32 and 33, processing executed by the parking spot state (vacant/occupied) determination unit 141 of the estimation result analysis unit 124 will be described.

The parking spot state (vacant/occupied) determination unit 141 of the estimation result analysis unit 124 determines whether the parking lot is in a vacant state where no parked vehicle is present or in an occupied state where a parked vehicle is present.

Figure 32:
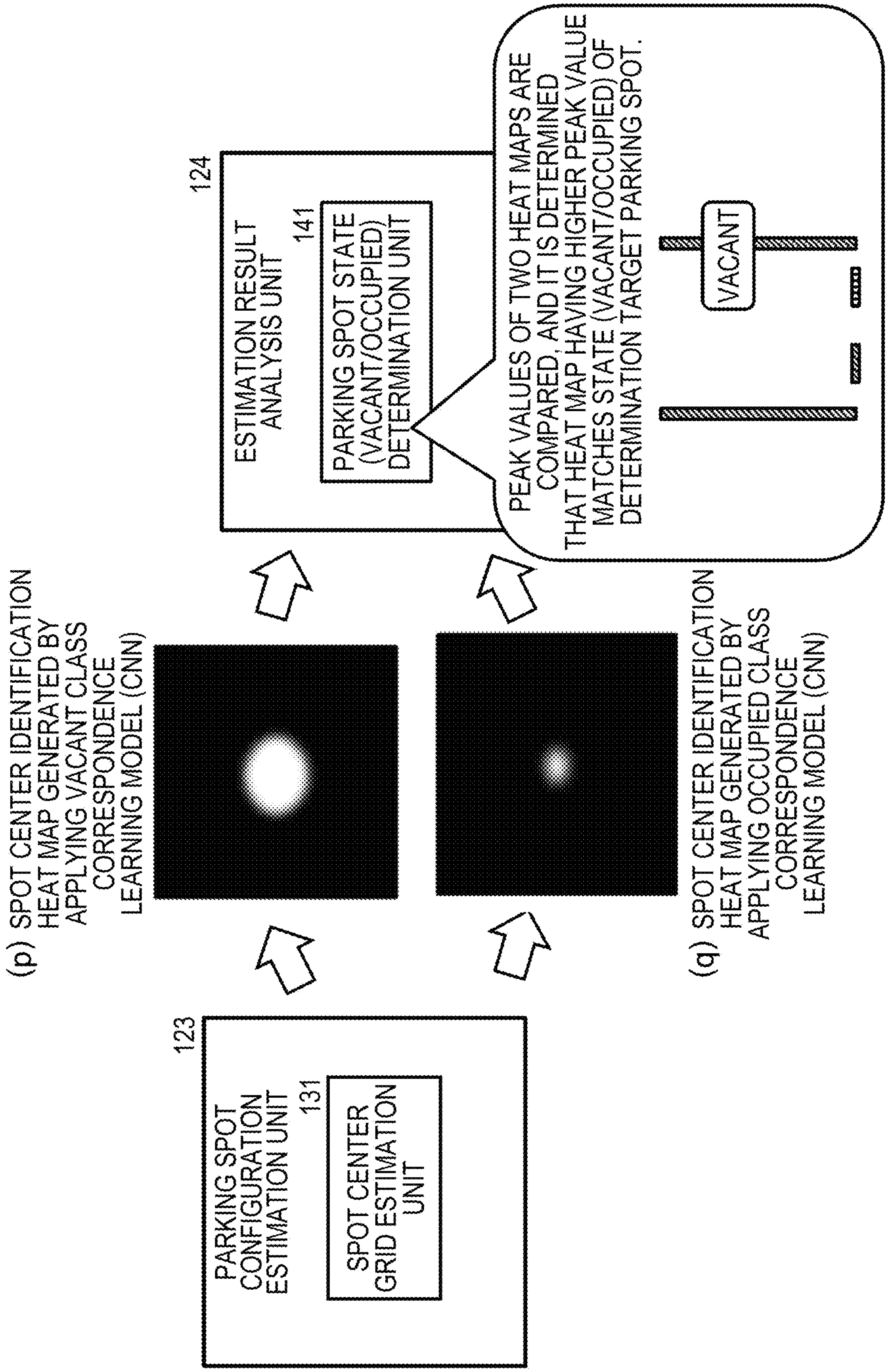
FIG. 32 is a diagram for explaining processing executed by a parking spot state (vacant/occupied) determination unit of the estimation result analysis unit.

As illustrated in FIG. 32, the parking spot state (vacant/occupied) determination unit 141 of the estimation result analysis unit 124 is input with two heat maps from the spot center grid estimation unit 131 of the parking spot configuration estimation unit 123 in the previous stage.

That is, the two heat maps are the following two spot center identification heat maps generated by the spot center grid estimation unit 131 of the parking spot configuration estimation unit 123.

(p) A spot center identification heat map generated by applying the vacant class correspondence learning model (CNN)

(q) A spot center identification heat map generated by applying the occupied class correspondence learning model (CNN)

These two heat maps are input from the spot center grid estimation unit 131 of the parking spot configuration estimation unit 123.

In the example illustrated in FIG. 32, among the two heat maps illustrated in the figure, a peak (output value) shown in a center portion of "(p) the spot center identification heat map generated by applying the vacant class correspondence learning model (CNN)" on the upper side is larger than a peak (output value) shown at a center portion of "(a) the spot center identification heat map generated by applying the occupied class correspondence learning model (CNN)" on the lower side.

This is due to similarity between a parking spot (object) as a spot center determination target in the spot center grid estimation unit 131 of the parking spot configuration estimation unit 123 and an object class of the used learning model (CNN) as described above.

That is, it means that the parking spot in the spot center estimation target image is a vacant parking spot.

In a case where the parking spot in the spot center estimation target image is a vacant parking spot, a peak (output value) of the heat map generated using the learning model (CNN) generated on the basis of images of vacant parking spots, namely, "(p) the spot center identification heat map generated by applying the vacant class correspondence learning model (CNN)" is larger than a peak (output value) of "(q) the spot center identification heat map generated by applying the occupied class correspondence learning model (CNN)".

The parking spot state (vacant/occupied) determination unit 141 determines that the learning model (CNN) on a side that has output the spot center identification heat map having a large peak is close to a state of the parking spot as a parking spot state (vacant/occupied) determination target.

For example, in the example illustrated in FIG. 32, the learning model (CNN) on the side that has output the spot center identification heat map having a large peak is the "vacant class correspondence learning model (CNN)".

In this case, the parking spot state (vacant/occupied) determination unit 141 determines that the determination target parking spot is a vacant parking spot in which no parked vehicle is present.

Figure 33:
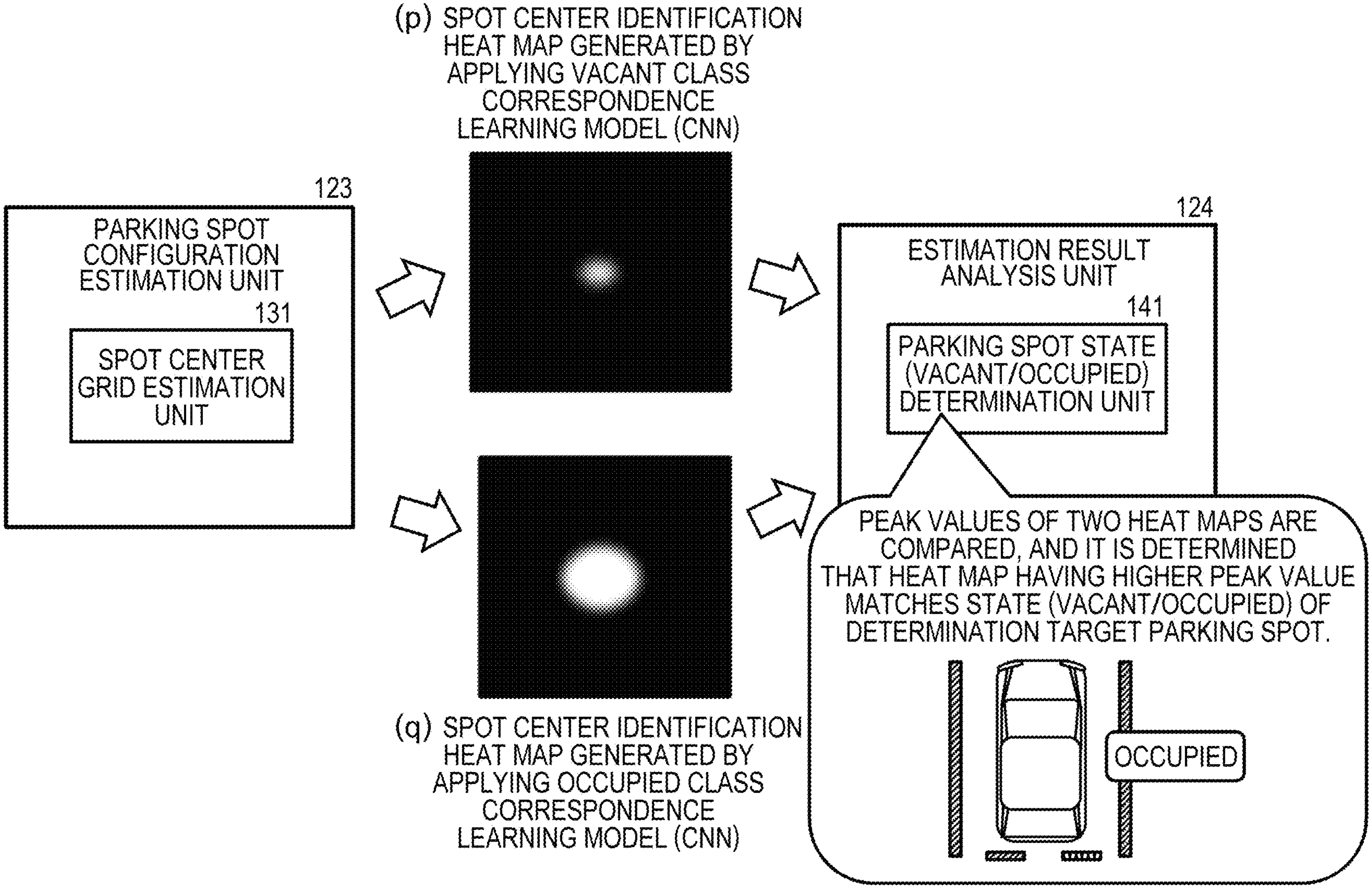
FIG. 33 is a diagram for explaining processing executed by the parking spot state (vacant/occupied) determination unit of the estimation result analysis unit.

FIG. 33 is a diagram for explaining a processing example in a case where the parking spot state (vacant/occupied) determination unit 141 determines that the determination target parking spot is an occupied parking spot in which a parked vehicle is present.

FIG. 33 also illustrates the following two spot center identification heat maps generated by the spot center grid estimation unit 131 of the parking spot configuration estimation unit 123.

(p) A spot center identification heat map generated by applying the vacant class correspondence learning model (CNN)

(q) A spot center identification heat map generated by applying the occupied class correspondence learning model (CNN)

These two heat maps are input from the spot center grid estimation unit 131 of the parking spot configuration estimation unit 123.

In the example illustrated in FIG. 33, in the two heat maps illustrated in the figure, a peak (output value) illustrated in a center portion of "(p) the spot center identification heat map generated by applying the vacant class correspondence learning model (CNN)" on the upper side is smaller than a peak (output value) shown at a center portion of "(q) the spot center identification heat map generated by applying the occupied class correspondence learning model (CNN)" on the lower side.

This is due to similarity between a parking spot (object) as a spot center determination target in the spot center grid estimation unit 131 of the parking spot configuration estimation unit 123 and an object class of the used learning model (CNN).

That is, it means that the parking spot in the spot center estimation target image is an occupied parking spot.

In a case where the parking spot in the spot center estimation target image is an occupied parking spot, a peak (output value) of the heat map generated using the learning model (CNN) generated on the basis of images of occupied parking spots, namely, "(q) the spot center identification heat map generated by applying the occupied class correspondence learning model (CNN)" is larger than a peak (output value) of "(p) the spot center identification heat map generated by applying the vacant class correspondence learning model (CNN)".

The parking spot state (vacant/occupied) determination unit 141 determines that the learning model (CNN) on a side that has output the spot center identification heat map having a large peak is close to a state of the parking spot as a parking spot state (vacant/occupied) determination target.

In the example illustrated in FIG. 33, the learning model (CNN) on the side that has output the spot center identification heat map having a large peak is the "occupied class correspondence learning model (CNN)".

In this case, the parking spot state (vacant/occupied) determination unit 141 determines that the determination target parking spot is an occupied parking spot in which parked vehicle is present.

Figure 34:
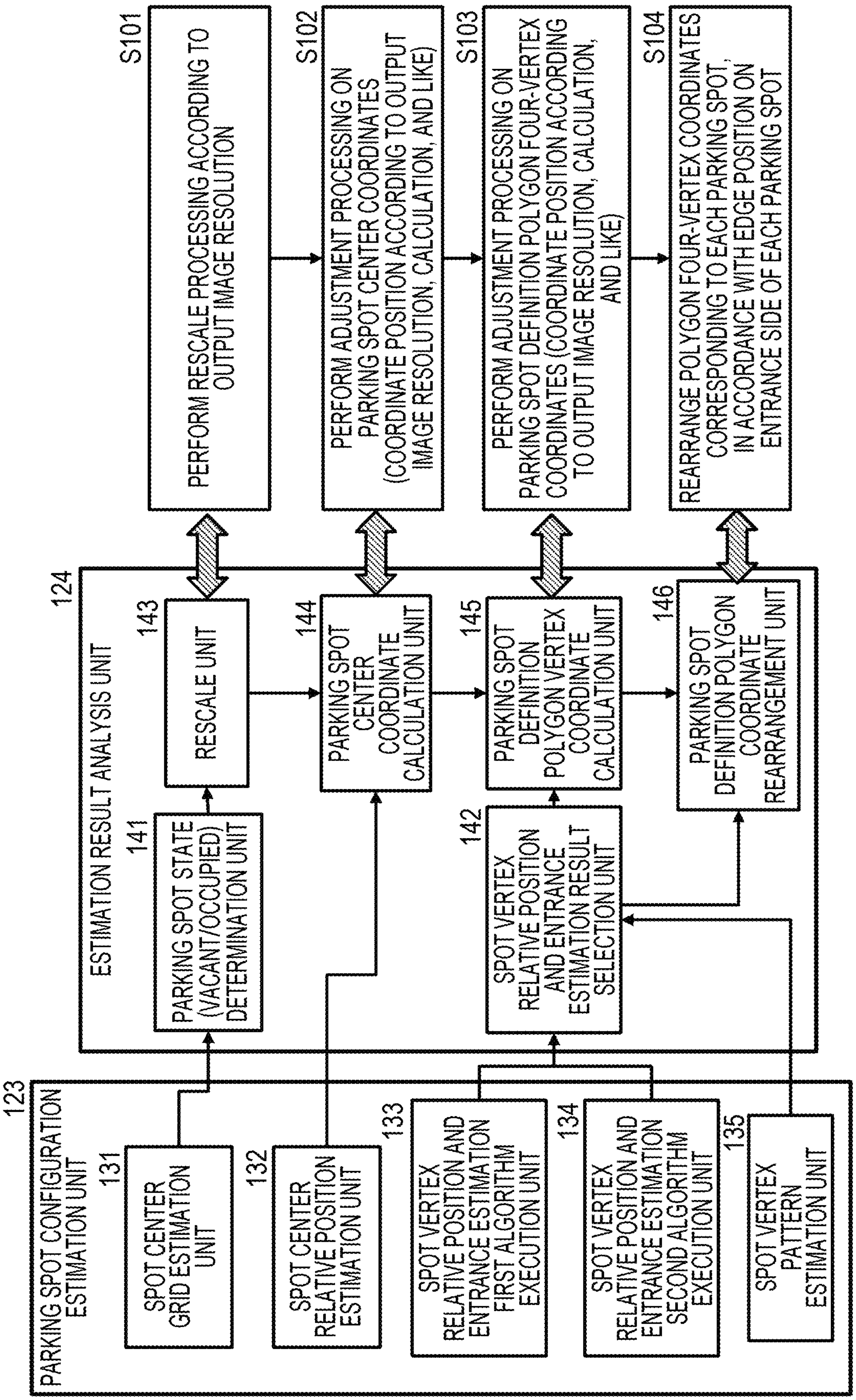
FIG. 34 is a diagram for explaining processing executed by a rescale unit to a parking spot definition polygon coordinate rearrangement unit of the estimation result analysis unit.

Next, with reference to FIG. 34, a description is given to processing executed by the rescale unit 143, the parking spot center coordinate calculation unit 144, the parking spot definition polygon vertex coordinate calculation unit 145, and the parking spot definition polygon coordinate rearrangement unit 146 of the estimation result analysis unit 124.

In FIG. 34, the processing executed by each of these processing units is illustrated as a flowchart on the right side of FIG. 34.

The processing executed by the rescale unit 143 is step S101. the processing executed by the parking spot center coordinate calculation unit 144 is step S102, the processing executed by the parking spot definition polygon vertex coordinate calculation unit 145 is step S103, and the processing executed by the parking spot definition polygon coordinate rearrangement unit 146 is step S104.

Hereinafter, the processing of each step is described sequentially.

(Step S101)

First, in step S101, the rescale unit 143 is input with an image used by the parking spot state (vacant/occupied) determination unit 141 for the parking spot state (vacant/occupied) determination processing, and executes rescale processing of matching the image with a resolution level of an original input image or a resolution level of an output image, that is, an output image to be output to the display unit of the vehicle 10.

For example, in a case where down-sampling is performed in the down-sampling unit 122 described above with reference to FIG. 15, processing of rescaling a down-sampled image to the resolution level of the original input image or the resolution level of the output image is performed.

(Step S102)

Next, in step S102, the parking spot center coordinate calculation unit 144 executes adjustment processing on the parking spot center coordinates. That is, a coordinate position of the parking spot center coordinates corresponding to the resolution of the rescaled output image is calculated.

The parking spot center coordinate calculation unit 144 is input with spot center relative position information from the spot center relative position estimation unit 132 of the parking spot configuration estimation unit 123 in the previous stage.

This is the processing described above with reference to FIG. 25, and the parking spot center coordinate calculation unit 144 calculates a vector (offset) from "the center of the spot center grid" to "the actual parking spot center position", and outputs the vector (offset) to the parking spot center coordinate calculation unit 144.

However, this vector (offset) is calculated on the basis of the down-sampled data. Therefore, in step S102, the parking spot center coordinate calculation unit 144 performs adjustment processing on the parking spot center coordinates, that is, calculates the coordinate position of the parking spot center coordinates according to the resolution of the rescaled output image.

(Step S103)

Next, in step S103, the parking spot definition polygon vertex calculation unit 145 executes adjustment processing on the parking spot definition polygon four-vertex coordinates. Specifically, the coordinate position, calculation, and the like according to the output image resolution are executed.

The parking spot definition polygon vertex calculation unit 145 is input with the spot vertex relative position and entrance estimation result from the spot vertex relative position and entrance estimation result selection unit 142 in the previous stage.

As described above, this is one error-free estimation result selected from the estimation results of the two algorithms estimated by the spot vertex relative position and entrance estimation first algorithm execution unit 133 and the spot vertex relative position and entrance estimation second algorithm execution unit 134 in the parking spot configuration estimation unit 123 in the previous stage.

However, since the spot vertex relative position, the entrance position, and the like included in the estimation result are also calculated on the basis of the down-sampled data, in step S103, the parking spot definition polygon vertex calculation unit 145 executes adjustment processing on the parking spot definition polygon four-vertex coordinates. Specifically, the coordinate position, calculation, and the like according to the output image resolution are executed.

(Step S104)

Finally, in step S104, the parking spot definition polygon coordinate rearrangement unit 146 executes processing of rearranging the polygon four-vertex coordinates corresponding to each parking spot, in accordance with an edge position on the entrance side of each parking spot.

The parking spot definition polygon coordinate rearrangement unit 146 is also input with the spot vertex relative position and entrance estimation result from the spot vertex relative position and entrance estimation result selection unit 142 in the previous stage.

That is, this is one error-free estimation result selected from the estimation results of the two algorithms estimated by the spot vertex relative position and entrance estimation first algorithm execution unit 133 and the spot vertex relative position and entrance estimation second algorithm execution unit 134 in the parking spot configuration estimation unit 123 in the previous stage.

Information to be input from the spot vertex relative position and entrance estimation result selection unit 142 in the previous stage includes four-vertex information of the parking spot definition polygon and two-vertex information on the entrance edge side.

However, an arrangement order of the arrangement of the polygon four vertexes, that is, the first vertex (x1, y1) to the fourth vertex (x4, y4), which are the four vertexes of the parking spot definition polygon described above with reference to FIGS. 27 to 30, differs according to the selected algorithm.

The parking spot definition polygon coordinate rearrangement unit 146 performs processing of rearranging these irregular vertex arrangement to align the entrance directions of the parking spots.

Figure 35:
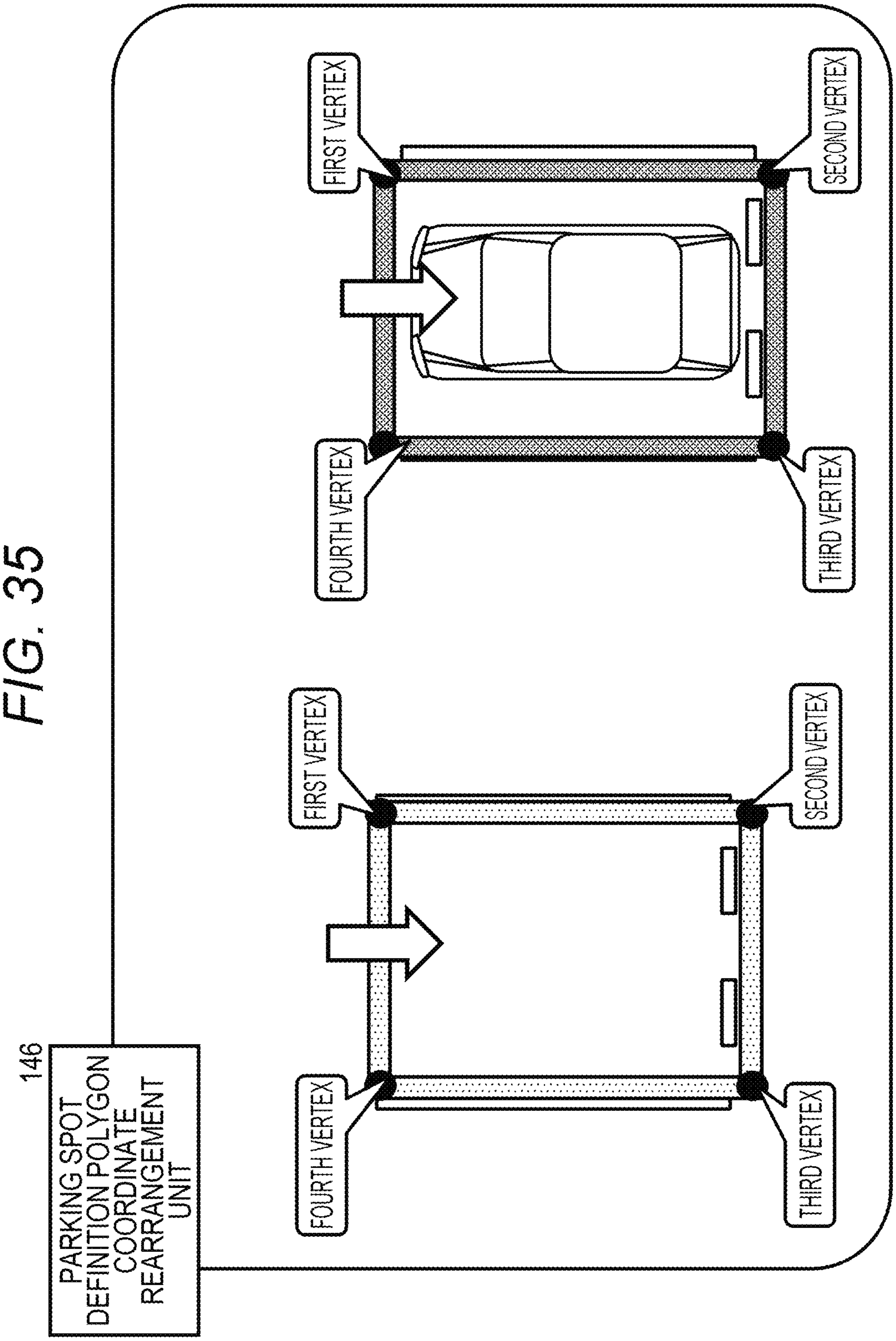
FIG. 35 is a diagram for explaining processing executed by the parking spot definition polygon coordinate rearrangement unit.

That is, for example, as illustrated in FIG. 35, the polygon four vertexes of all the parking spots are rearranged such that the right side of the entrance-side edge is the first vertex, and thereafter, the second, third, and fourth vertexes are sequentially arranged clockwise.

The parking spot definition polygon vertex arrangement data subjected to the rearrangement is input to a display control unit. For example, the display control unit can perform processing of displaying parking spot identification frames to be displayed with the first vertex and the fourth vertex arranged side by side on the entrance side, for all the adjacent parking spots.

Figure 36:
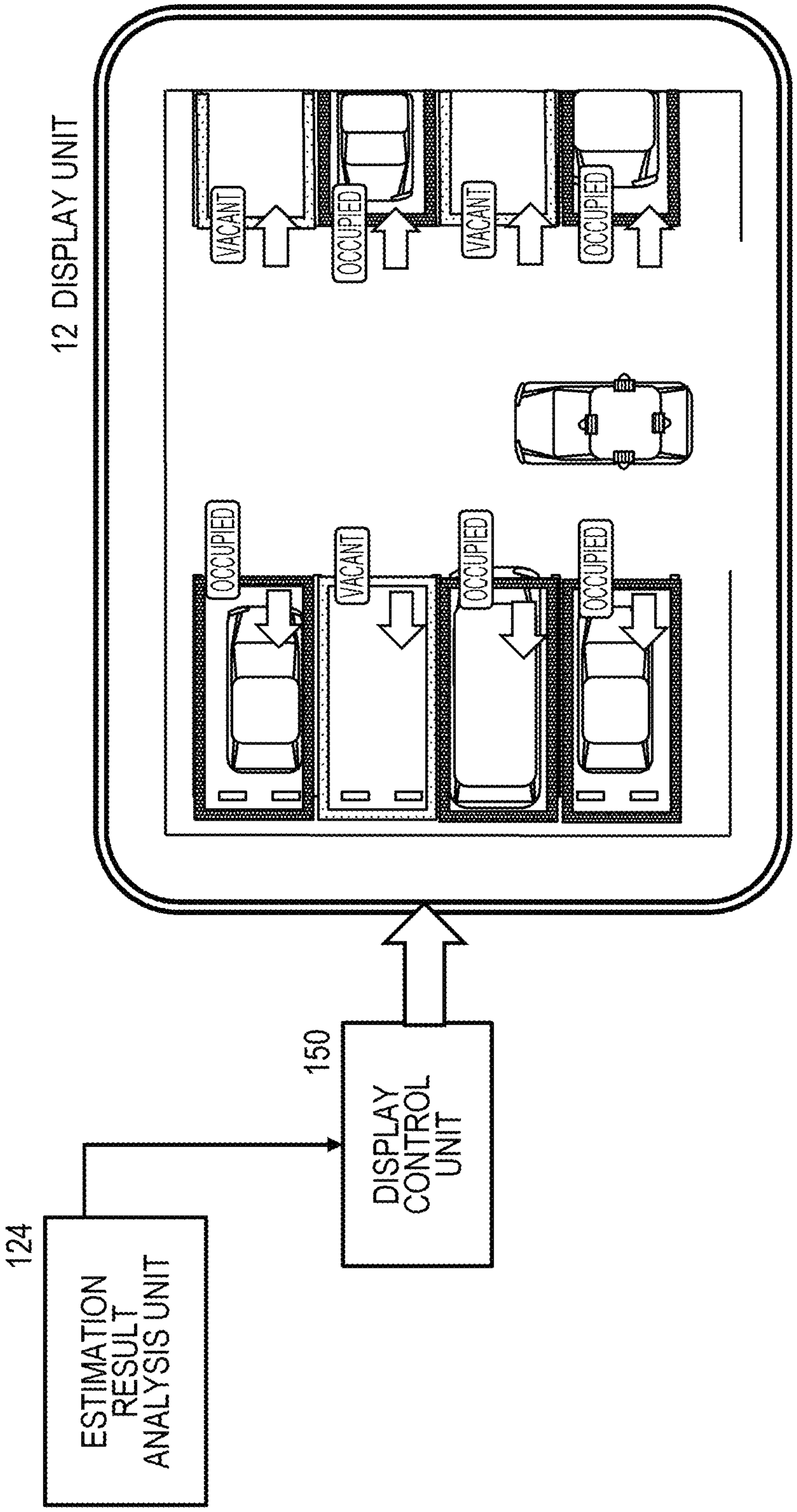
FIG. 36 is a diagram illustrating an example of display data displayed on the display unit by a display control unit.

FIG. 36 is a diagram illustrating an example of display data displayed on the display unit 12 by a display control unit 150.

As illustrated in FIG. 36, the following identification data is superimposed on a top surface image of a parking lot on the display unit 12. Namely, (1) the vacant parking spot identification frame;

(2) the occupied parking spot identification frame;

(3) the parking spot entrance direction identifier; and (4) the parking spot state (vacant/occupied) identification tag, these pieces of identification data are superimposed and displayed on the top surface image of the parking lot.

For example, in a case of a manual driving vehicle, the driver can reliably and easily determine a vacant or occupied state and an entrance direction of each parking frame, on the basis of the above-described identification data of (1) to (4) displayed on the display unit.

Furthermore, in a case of an automated driving vehicle, an image (top surface image) to which the identification data described above is added is input to the automated driving control unit. The automated driving control unit can reliably and easily determine a vacant or occupied state and an entrance direction of each parking frame on the basis of these pieces of identification data, and can perform automated parking processing accompanied by highly accurate position control for the vacant parking spot.

4. Regarding Other Embodiments

Next, other embodiments will be described.

In the above-described embodiment, the embodiment in which the image input to the parking spot analysis unit 120 is a top surface image has been described.

Namely, as described above with reference to FIG. 2, the vehicle 10 includes the following four cameras:

(a) the forward camera 11F that captures an image on the front side of the vehicle 10, (b) the backward camera 11B that captures an image on the rear side of the vehicle 10, (c) the leftward camera 11L that captures an image on the left side of the vehicle 10, and (d) the rightward camera 11R that captures an image on the right side of the vehicle 10.

The vehicle 10 is equipped with these four cameras, combines images captured by these four cameras to generate an image observed from above, that is, a top surface image (overhead view image), and inputs the composite image to the parking spot analysis unit 120 to execute the parking spot analysis processing.

However, the image input to and analyzed by the parking spot analysis unit 120 is not limited to such a top surface image.

Figure 37:
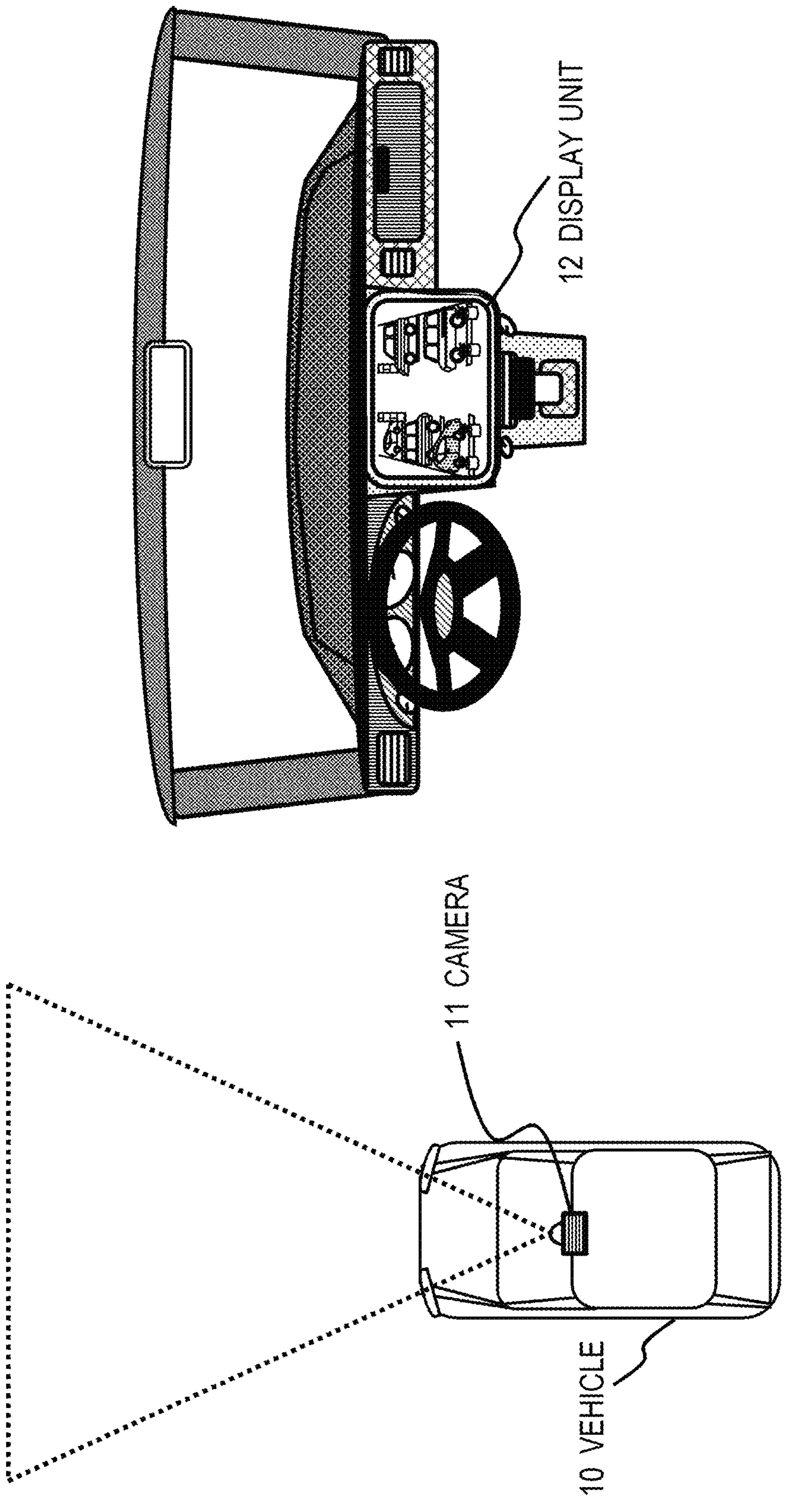
FIG. 37 is a view for explaining a configuration in which an image captured by one camera that captures an image in the front direction of the vehicle is input to the parking spot analysis unit, and the parking spot analysis processing is executed.

For example, as illustrated in FIG. 37, it is also possible adopt a configuration of inputting an image captured by one camera 11 that captures an image in the front direction of the vehicle 10 to the parking spot analysis unit 120, to execute the parking spot analysis processing.

However, in this case, the parking spot analysis unit 120 executes analysis processing using a learning model generated using an image captured by one camera 11 that captures an image in the front direction of the vehicle 10.

Figure 38:
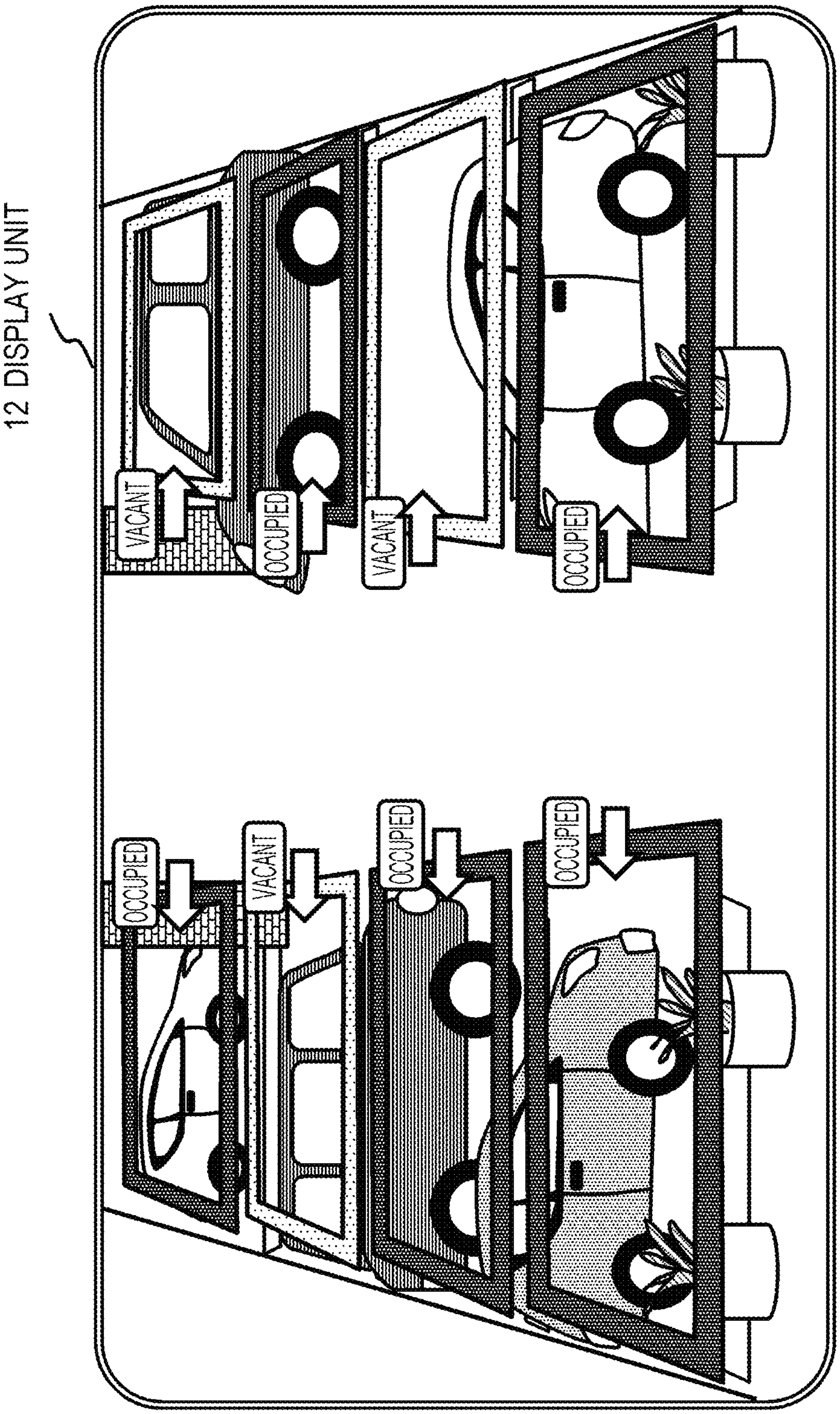
FIG. 38 is a view illustrating an example of display data displayed on the display unit.

Display data based on analysis data obtained by inputting an image captured by one camera 11 that captures an image in the front direction of the vehicle 10 to the parking spot analysis unit 120 and executing the parking spot analysis processing is to be display data as illustrated in FIG. 38, for example.

The display data of the display unit 12 illustrated in FIG. 38 is display data obtained by displaying the following identification data:

(1) the vacant parking spot identification frame;

(2) the occupied parking spot identification frame;

(3) the parking spot entrance direction identifier; and (4) the parking spot state (vacant/occupied) identification tag, on an image captured by one camera 11 that captures the front direction of the vehicle 10.

Note that the identification data described above, namely, (1) the vacant parking spot identification frame;

(2) the occupied parking spot identification frame;

(3) the parking spot entrance direction identifier; and (4) the parking spot state (vacant/occupied) identification tag, are identification data generated by the parking spot analysis unit 120.

The parking spot analysis unit 120 executes analysis processing using a learning model generated using an image captured in the vehicle front direction by one camera.

In this way, the information processing device according to the present disclosure can be used for the parking spot analysis processing using various images.

5. Regarding Configuration Example of Information Processing Device According to Present Disclosure Next, a configuration example of the information processing device according to the present disclosure will be described.

Figure 39:
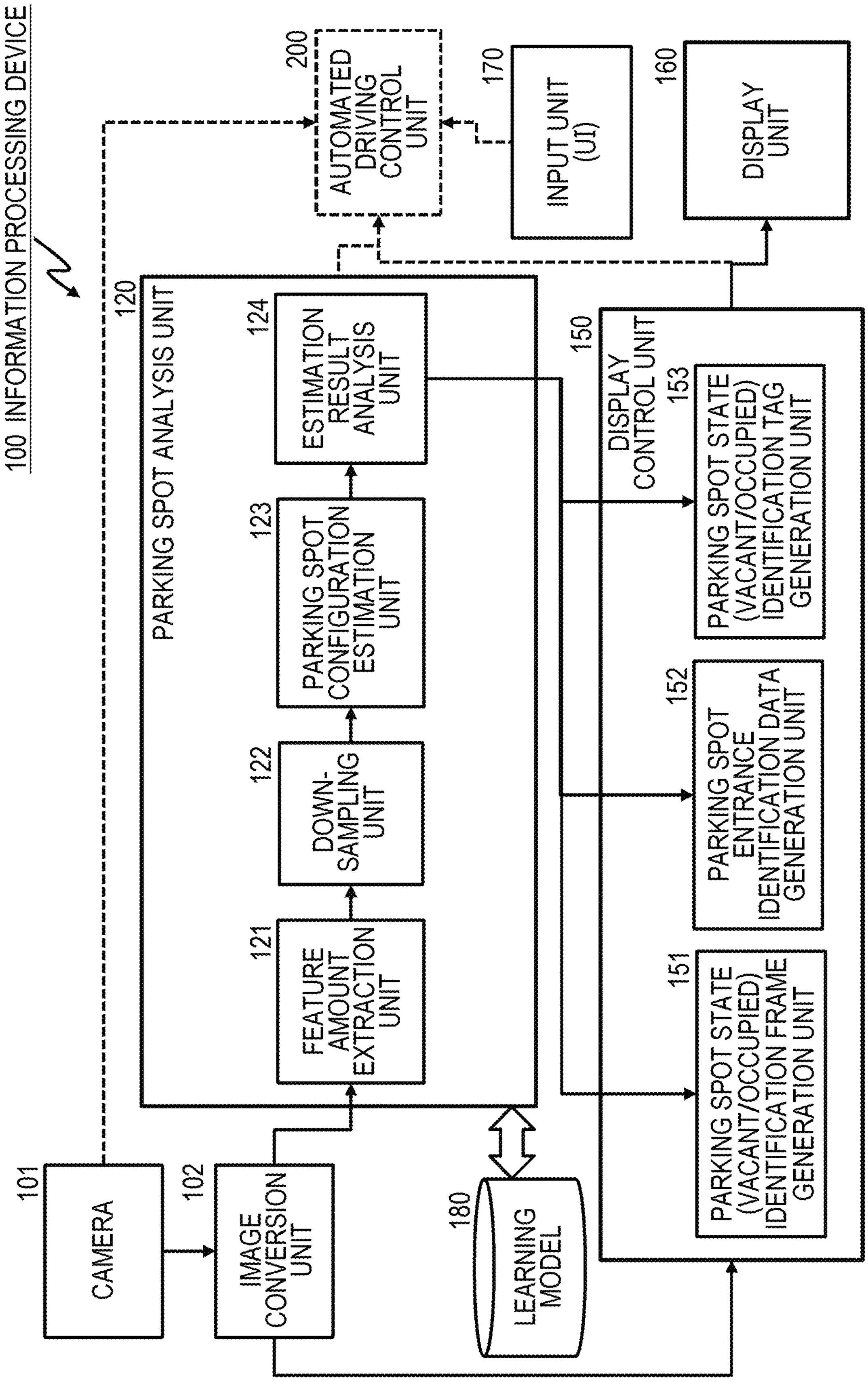
FIG. 39 is a diagram for explaining a configuration example of the information processing device according to the present disclosure.

FIG. 39 is a block diagram illustrating an example of the information processing device 100 according to the present disclosure to be mounted on the vehicle 10.

As illustrated in FIG. 39, the information processing device 100 includes a camera 101, an image conversion unit 102, the parking spot analysis unit 120, the display control unit 150, a display unit 160, an input unit (UI) 170, the learning model 180, and an automated driving control unit 200.

The parking spot analysis unit 120 includes the feature amount extraction unit 121, the down-sampling unit 122, the parking spot configuration estimation unit 123, and the estimation result analysis unit 124.

The display control unit 150 includes a parking spot state (vacant/occupied) identification frame generation unit 151, a parking spot entrance identification data generation unit 152, and a parking spot state (vacant/occupied) identification tag generation unit 153.

Note that the automated driving control unit 200 is not an essential configuration, and is a configuration included in a case where the vehicle is a vehicle that can perform automated driving.

The camera 101 includes, for example, multiple cameras that capture images in the front, rear, left, and right directions of the vehicle described with reference to FIG. 2, a camera that captures an image in the front direction of the vehicle described with reference to FIG. 37, or the like.

Note that, although not illustrated in FIG. 39, in a case of an automated driving vehicle, various sensors other than the camera are mounted. For example, in addition to the camera, sensors such as light detection and ranging (LiDAR) or a time of flight (ToF) sensor are used.

Note that the light detection and ranging (LiDAR) and the ToF sensor are, for example, a sensor that outputs light such as laser light, analyzes reflected light by an object, and measures a distance of a surrounding object.

As illustrated in the figure, an image captured by the camera 101 is input to the image conversion unit 102. For example, the image conversion unit 102 combines input images from multiple cameras that capture images in the vehicle front, rear, left, and right directions to generate a top surface image (overhead view image), and outputs the top surface image to the feature amount extraction unit 121 and the down-sampling unit 122 of the parking spot analysis unit 120.

Moreover, the top surface image (overhead view image) generated by the image conversion unit 102 is displayed on the display unit 1260 via the display control unit 150.

The parking spot analysis unit 120 includes the feature amount extraction unit 121, the down-sampling unit 122, the parking spot configuration estimation unit 123, and the estimation result analysis unit 124.

A configuration and processing of the parking spot analysis unit 120 are as described above with reference to FIG. 15 and subsequent figures.

The feature amount extraction unit 121 extracts a feature amount from a top surface image that is an input image.

The feature amount extraction unit 121 executes the feature amount extraction processing using the learning model 180 generated by the learning processing unit 80 described above with reference to FIG. 12.

The down-sampling unit 122 executes down-sampling processing on the feature amount data extracted from the input image (top surface image) by the feature amount extraction unit 121. Note that the down-sampling processing is performed to reduce a processing load in the parking spot configuration estimation unit 123, and is not essential.

The parking spot configuration estimation unit 123 is input with the input image (top surface image) and the feature amount data extracted from the image by the feature amount extraction unit 121, and executes analysis processing on a configuration, a state (vacant/occupied), and the like of the parking spot included in the input image.

The learning model 180 is also used in the parking spot analysis processing in the parking spot configuration estimation unit 123.

The learning model used by the parking spot configuration estimation unit 123 is, for example, learning models as follows:

(1) a learning model that is input with an image or an image feature amount and outputs state information (vacant/occupied) of a parking spot; and (2) a learning model that is input with an image or an image feature amount and outputs a configuration of a parking spot (a center, a parking spot definition rectangle (polygon) vertex position, a parking spot entrance direction, and the like).

As described above with reference to FIG. 15, the parking spot configuration estimation unit 123 includes the spot center grid estimation unit 131, the spot center relative position estimation unit 132, the spot vertex relative position and entrance estimation first algorithm execution unit 133, the spot vertex relative position and entrance estimation second algorithm execution unit 134, and the spot vertex pattern estimation unit 135.

The spot center grid estimation unit 131 estimates a spot center grid of each parking spot in the input image.

This processing is processing corresponding to the processing described above with reference to FIGS. 16 to 24.

That is, two learning models (CNN) are used. Namely, by inputting image data of a spot center estimation target parking spot or feature amount data on a grid basis acquired from the image data to two learning models (CNN), which are:

(m1) the CNN for vacant class correspondence spot center detection; and (m2) the CNN for occupied class correspondence spot center detection, the following two heat maps are generated.

Namely, two heat maps of:

(p) a spot center identification heat map generated by applying the vacant class correspondence learning model (CNN); and (q) a spot center identification heat map generated by applying the occupied class correspondence learning model (CNN)

are generated.

A spot center grid is estimated on the basis of peak positions of these heat maps.

The spot center relative position estimation unit 132 estimates an actual center position of the parking spot. Specifically, as described above with reference to FIG. 25, a relative position (vector) is calculated between a center of a spot center grid estimated by the spot center grid estimation unit 131 and the actual center position of the parking spot.

The spot vertex relative position and entrance estimation first algorithm execution unit 133 and the spot vertex relative position and entrance estimation second algorithm execution unit 134 select a relative position of parking spot definition polygon four vertexes and a parking spot entrance by using different algorithms.

Processing and an algorithm of these processing units are as described above with reference to FIGS. 26 to 31.

Note that the spot vertex pattern estimation unit 135 estimates an inclination, a shape, and the like of the parking spot definition four-vertex polygon. This estimation information is used to determine which of the two algorithms described above is to be selected.

As described above with reference to FIGS. 15 and 31 to 35, the estimation result analysis unit 120 illustrated in FIG. 39 includes the parking spot state (vacant/occupied) determination unit 141, the spot vertex relative position and entrance estimation result selection unit 142, the rescale unit 143, the parking spot center coordinate calculation unit 144, the parking spot definition polygon vertex coordinate calculation unit 145, and the parking spot definition polygon coordinate rearrangement unit 146.

The parking spot state (vacant/occupied) determination unit 141 determines a parking spot state, that is, whether the parking spot is a vacant spot without a parked vehicle or an occupied spot with a parked vehicle.

Specifically, as described above with reference to FIGS. 32 and 33, by comparing peak values of two spot center identification heat maps generated by the spot center grid estimation unit 131 of the parking spot configuration estimation unit 123 in the previous stage, the parking spot state (vacant/occupied) determination unit 141 determines that the learning model (CNN) on the side that has output a spot center identification heat map having a large peak is close to a state of a parking spot as a parking spot state (vacant/occupied) determination target, to determine the parking spot state (vacant/occupied).

The spot vertex relative position and entrance estimation result selection unit 142 selects one error-free estimation result from the spot vertex relative position and entrance estimation results according to individual algorithms and individually input from the spot vertex relative position and entrance estimation first algorithm execution unit 133 and the spot vertex relative position and entrance estimation second algorithm execution unit 134 in the previous stage.

This processing is the processing described above with reference to FIG. 31.

The rescale unit 143, the parking spot center coordinate calculation unit 144, the parking spot definition polygon vertex coordinate calculation unit 145, and the parking spot definition polygon coordinate rearrangement unit 146 execute the processing described above with reference to FIGS. 34 to 35.

The display control unit 150 is input with an analysis result of the parking spot analysis unit 120, and executes generation processing for data to be displayed on the display unit 160 by using the input analysis result.

The display control unit 150 includes the parking spot state (vacant/occupied) identification frame generation unit 151, the parking spot entrance identification data generation unit 152, and the parking spot state (vacant/occupied) identification tag generation unit 153.

The parking spot state (vacant/occupied) identification frame generation unit 151 generates different identification frames according to a state (vacant/occupied) of the parking spot.

For example, a blue frame is used for a vacant spot, a red frame is used for an occupied spot, and the like.

The parking spot entrance identification data generation unit 152 generates identification data that enables identification of an entrance of each parking spot. For example, the identification data is the arrow data described with reference to FIG. 6 or the identification data in which the parking spot vertex on the entrance side is white described with reference to FIG. 7.

The parking spot state (vacant/occupied) identification tag generation unit 153 generates the identification tag corresponding to the parking spot state (vacant/occupied) as described above with reference to FIG. 8, for example.

The identification data generated by the display control unit 150 is displayed on the display unit 160 superimposed on the top surface image generated by the image conversion unit 102.

For example, as described above with reference to FIG. 36, display data in which the following identification data, namely:

(1) the vacant parking spot identification frame;

(2) the occupied parking spot identification frame;

(3) the parking spot entrance direction identifier; and (4) the parking spot state (vacant/occupied) identification tag, are superimposed on the top surface image of the parking lot is displayed on the display unit 160.

The input unit (UI) 170 is a UI to be used for processing for inputting a parkable space search processing start instruction, processing for inputting target parking spot selection information, or the like, by a driver who is the user, for example. The input unit (UI) 170 may have a configuration using a touch panel formed on the display unit 160.

The input information of the input unit (UI) 170 is input to, for example, the automated driving control unit 200.

For example, the automated driving control unit 200 is input with analysis information of the parking spot analysis unit 120, display data generated by the display control unit 150, and the like, and executes automated driving processing toward a closest parking spot in a vacant state and automated parking processing.

Furthermore, for example, an automated parking processing for a parking spot designated according to designation information or the like of a target parking spot input from the input unit (UI) 170 is executed.

6. Regarding Hardware Configuration Example of Information Processing Device According to Present Disclosure Next, a hardware configuration example of the information processing device according to the present disclosure will be described with reference to FIG. 40.

Figure 40:
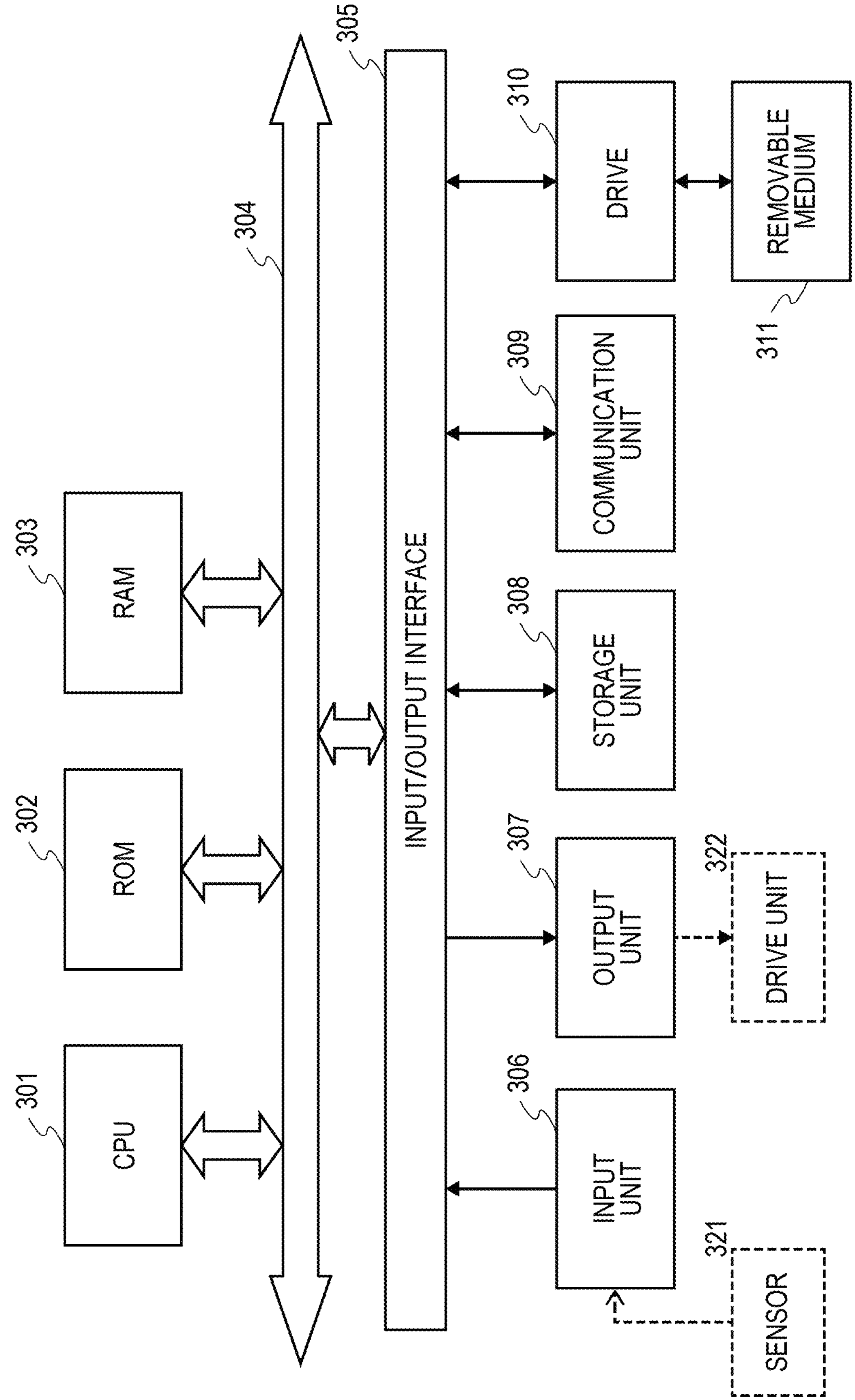
FIG. 40 is a diagram for explaining a hardware configuration example of the information processing device according to the present disclosure.

Note that the information processing device is mounted in the vehicle 10. The hardware configuration illustrated in FIG. 40 is a hardware configuration example of the information processing device in the vehicle 10.

The hardware configuration illustrated in FIG. 40 will be described.

A central processing unit (CPU) 301 functions as a data processing unit configured to execute various types of processing in accordance with a program stored in a read only memory (ROM) 302 or a storage unit 308. For example, the CPU 301 executes the processing according to the sequence described in the above embodiment. A random access memory (RAM) 303 stores programs, data, or the like to be performed by the CPU 301. The CPU 301, the ROM 302, and the RAM 303 are connected to each other by a bus 304.

The CPU 301 is connected to an input/output interface 305 via the bus 304, and to the input/output interface 305, an input unit 306 that includes various switches, a touch panel, a microphone, and a status data acquisition unit of a user input unit and various sensors 321 such as a camera and LiDAR, and an output unit 307 that includes a display, a speaker, or the like are connected.

Furthermore, the output unit 307 also outputs drive information for a drive unit 322 of the vehicle.

The CPU 301 inputs commands, status data, or the like input from the input unit 306, executes various types of processing, and outputs processing results to, for example, the output unit 307.

The storage unit 308 connected to the input/output interface 305 includes, for example, a hard disk, or the like and stores programs executed by the CPU 301 and various types of data. A communication unit 309 functions as a transmission/reception unit for data communication via a network such as the Internet or a local area network, and communicates with an external device.

Furthermore, in addition to the CPU, a graphics processing unit (GPU) may be provided as a dedicated processing unit for image information and the like input from the camera.

A drive 310 connected to the input/output interface 305 drives a removable medium 311 such as a magnetic disk, an optical disk, a magneto-optical disk, or a semiconductor memory such as a memory card, and records or reads data.

7. Regarding Configuration Example of Vehicle

Next, a configuration example of a vehicle on which the information processing device according to the present disclosure is mounted will be described.

Figure 41:
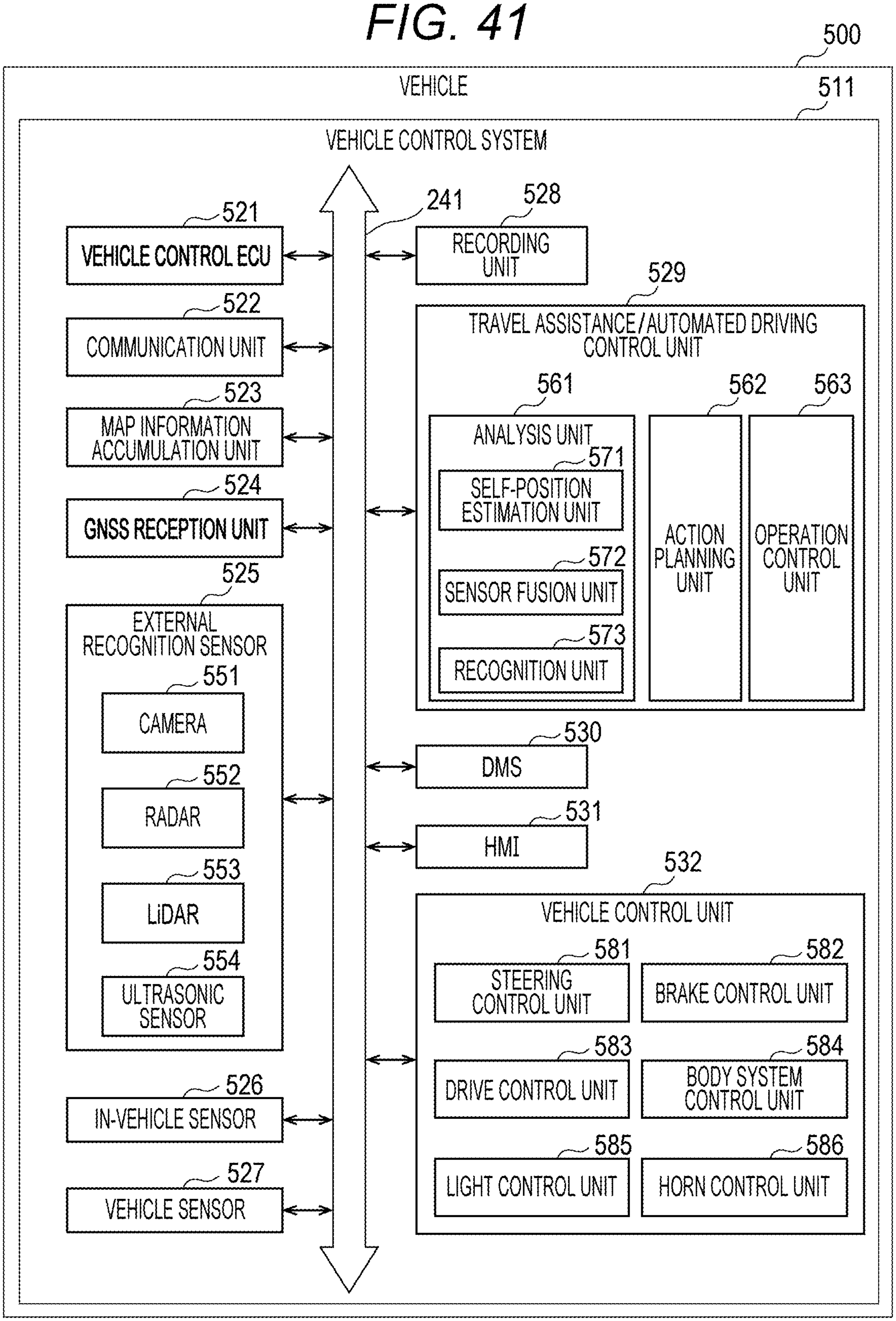
FIG. 41 is a diagram for explaining a configuration example of a vehicle mounting the information processing device according to the present disclosure.

FIG. 41 is a block diagram illustrating a configuration example of a vehicle control system 511 of a vehicle 500 (=vehicle 10) on which the information processing device according to the present disclosure is mounted.

The vehicle control system 511 is provided in the vehicle 500 and executes processing related to travel assistance and automated driving of the vehicle 500.

The vehicle control system 511 includes a vehicle control electronic control unit (ECU) 521, a communication unit 522, a map information accumulation unit 523, a global navigation satellite system (GNSS) reception unit 524, an external recognition sensor 525, an in-vehicle sensor 526, a vehicle sensor 527, a recording unit 528, a travel assistance/automated driving control unit 529, a driver monitoring system (DMS) 530, a human machine interface (HMI) 531, and a vehicle control unit 532.

The vehicle control electronic control unit (ECU) 521, the communication unit 522, the map information accumulation unit 523, a GNSS reception unit 524, the external recognition sensor 525, the in-vehicle sensor 526, the vehicle sensor 527, the recording unit 528, the travel assistance/automated driving control unit 529, the driver monitoring system (DMS) 530, the human machine interface (HMI) 531, and the vehicle control unit 532 are communicably connected to each other via a communication network 41. A communication network 241 includes, for example, an in-vehicle communication network, a bus, or the like that conforms to a digital bidirectional communication standard, such as a controller area network (CAN), a local interconnect network (LIN), a local area network (LAN), FlexRay (registered trademark), or Ethernet (registered trademark). The communication network 241 may be selectively used depending on the type of data to be communicated, and for example, the CAN is applied to data related to vehicle control, and the Ethernet is applied to large-capacity data. Note that units of the vehicle control system 511 may be directly connected to each other using wireless communication adapted to a relatively short-range communication, such as near field communication (NFC) or Bluetooth (registered trademark) without using the communication network 241, for example.

Note that, hereinafter, in a case where each unit of the vehicle control system 511 performs communication via the communication network 241, the description of the communication network 241 will be omitted. For example, in a case where the vehicle control electronic control unit (ECU) 521 and the communication unit 522 perform communication via the communication network 241, it is simply described that a processor and the communication unit 522 perform communication.

The vehicle control electronic control unit (ECU) 521 includes, for example, various processors such as a central processing unit (CPU) or a micro processing unit (MPU). The vehicle control electronic control unit (ECU) 521 controls the entire of partial function of the vehicle control system 511.

The communication unit 522 communicates with various devices inside and outside the vehicle, another vehicle, a server, a base station, and the like, and transmits and receives various types of data. At this time, the communication unit 522 can perform communication using a plurality of communication schemes.

Communication with the outside of the vehicle executable by the communication unit 522 will be schematically described. The communication unit 522 communicates with a server (hereinafter, referred to as an external server) or the like that exists on an external network via a base station or an access point by, for example, a wireless communication scheme such as fifth generation mobile communication system (5G), long term evolution (LTE), dedicated short range communications (DSRC), or the like. Examples of the external network with which the communication unit 522 performs communication include the Internet, a cloud network, a company-specific network, or the like. The communication method by which the communication unit 522 communicates with the external network is not particularly limited as long as it is a wireless communication method capable of performing digital bidirectional communication at a communication speed equal to or more than a predetermined speed and at a distance equal to or longer than a predetermined distance.

Furthermore, for example, the communication unit 522 can communicate with a terminal present in the vicinity of the own vehicle using a peer to peer (P2P) technology. The terminal present in the vicinity of the own vehicle is, for example, a terminal worn by a moving body moving at a relatively low speed such as a pedestrian or a bicycle, a terminal installed in a store or the like with a position fixed, or a machine type communication (MTC) terminal. Moreover, the communication unit 522 can also perform V2X communication. The V2X communication refers to, for example, communication between the own vehicle and another vehicle, such as vehicle to vehicle communication with another vehicle, vehicle to infrastructure communication with a roadside device or the like, vehicle to home communication, and vehicle to pedestrian communication with a terminal or the like carried by a pedestrian.

For example, the communication unit 522 can receive a program for updating software for controlling the operation of the vehicle control system 511 from the outside (Over The Air). The communication unit 522 can further receive map information, traffic information, the information regarding the surroundings of the vehicle 500, or the like from the outside. Furthermore, for example, the communication unit 522 can transmit information regarding the vehicle 500, information regarding the surroundings of the vehicle 500, or the like to the outside. Examples of the information regarding the vehicle 500 transmitted to the outside by the communication unit 522 include data indicating a state of the vehicle 500, a recognition result from a recognition unit 573, or the like. Moreover, for example, the communication unit 522 performs communication corresponding to a vehicle emergency call system such as an eCall.

Communication with the inside of the vehicle executable by the communication unit 522 will be schematically described. The communication unit 522 can communicate with each device in the vehicle using, for example, wireless communication. The communication unit 522 can perform wireless communication with the device in the vehicle by, for example, a communication scheme allowing digital bidirectional communication at a communication speed equal to or higher than a predetermined speed by wireless communication, such as wireless LAN, Bluetooth, NFC, or wireless USB (WUSB). The communication performed by the communication unit 522 is not limited to this, and the communication unit 522 can also communicate with each device in the vehicle using wired communication. For example, the communication unit 522 can communicate with each device in the vehicle by wired communication via a cable connected to a connection terminal (not illustrated). The communication unit 522 can communicate with each device in the vehicle by a communication scheme allowing digital bidirectional communication at a communication speed equal to or higher than a predetermined speed by wired communication, for example, a universal serial bus (USB), the high-definition multimedia interface (HDMI) (registered trademark), a mobile high-definition link (MHL), or the like.

Here, the device in the vehicle refers to, for example, a device that is not connected to the communication network 241 in the vehicle. As the device in the vehicle, for example, a mobile device or a wearable device carried by an occupant such as a driver, an information device brought into the vehicle and temporarily installed, or the like is assumed.

For example, the communication unit 522 receives an electromagnetic wave transmitted by a road traffic information communication system (vehicle information and communication system (VICS) (registered trademark)), such as a radio wave beacon, an optical beacon, or FM multiplex broadcasting.

The map information accumulation unit 523 accumulates one or both of a map acquired from the outside and a map created by the vehicle 500. For example, the map information accumulation unit 523 accumulates a three-dimensional high-precision map, a global map that is lower in precision than the high-precision map but covers a wider area, and the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 500 from the external server or the like. The point cloud map is a map including a point cloud (point cloud data). Here, the vector map indicates a map adapted to an advanced driver assistance system (ADAS) in which traffic information such as a lane and a signal position is associated with the point cloud map.

The point cloud map and the vector map may be provided from, for example, an external server or the like, or may be created by the vehicle 500 as a map for performing matching with a local map to be described later on the basis of a sensing result by a radar 552, a LiDAR 553, or the like, and may be accumulated in the map information accumulation unit 523.

Furthermore, in a case where the high-precision map is provided from the external server or the like, for example, map data of several hundred meters square regarding a planned path on which the vehicle 500 travels from now is acquired from the external server or the like in order to reduce the communication traffic.

The GNSS reception unit 524 receives a GNSS signal from a GNSS satellite and acquires position information of the vehicle 500. The received GNSS signal is supplied to the travel assistance/automated driving control unit 529. Note that the GNSS reception unit 524 may acquire the position information, for example, using a beacon, without limiting to the method using the GNSS signal.

The external recognition sensor 525 includes various sensors used to recognize a situation outside the vehicle 500, and supplies sensor data from each sensor to each unit of the vehicle control system 511. The type and number of sensors included in the external recognition sensor 525 may be determined as desired.

For example, the external recognition sensor 525 includes a camera 551, the radar 552, the light detection and ranging, laser imaging detection and ranging (LiDAR) 553, and an ultrasonic sensor 554. Without being limited to this, and the external recognition sensor 525 may include one or more types of sensors among the camera 551, the radar 552, the LiDAR 553, and the ultrasonic sensor 554. The numbers of the cameras 551, the radars 552, the LiDARs 553, and the ultrasonic sensors 554 are not particularly limited as long as the sensors can be provided in the vehicle 500. Furthermore, the external recognition sensor 525 may include sensors of other types, but not limited to sensors of the types described in this example. An example of a sensing region of each sensor included in the external recognition sensor 525 will be described later.

Note that the imaging method of the camera 551 is not particularly limited as long as it is an imaging method capable of distance measurement. For example, as the camera 551, cameras of various imaging methods such as a time of flight (ToF) camera, a stereo camera, a monocular camera, and an infrared camera can be applied as necessary. Without being limited to this, and the camera 551 may simply acquire a captured image regardless of distance measurement.

Furthermore, for example, the external recognition sensor 525 can include an environment sensor for detecting an environment for the vehicle 500. The environmental sensor is a sensor for detecting an environment such as weather, climate, and brightness and can include various sensors such as a raindrop sensor, a fog sensor, a sunshine sensor, a snow sensor, and an illuminance sensor, for example.

Moreover, for example, the external recognition sensor 525 includes a microphone used to detect a sound around the vehicle 500, a position of a sound source, or the like.

The in-vehicle sensor 526 includes various sensors for detecting information regarding the inside of the vehicle, and supplies sensor data from each sensor to each unit of the vehicle control system 511. The types and the number of various sensors included in the in-vehicle sensor 526 are not particularly limited as long as they can be practically installed in the vehicle 500.

For example, the in-vehicle sensor 526 can include one or more sensors of a camera, a radar, a seating sensor, a steering wheel sensor, a microphone, and a biological sensor. As the camera included in the in-vehicle sensor 526, for example, cameras of various imaging methods capable of measuring a distance, such as a ToF camera, a stereo camera, a monocular camera, and an infrared camera, can be used. Without being limited to this, the camera included in the in-vehicle sensor 526 may simply acquire a captured image regardless of distance measurement. The biological sensor included in the in-vehicle sensor 526 is provided in, for example, a seat, a steering wheel, or the like, and detects various types of biological information of the occupant such as the driver.

The vehicle sensor 527 includes various sensors for detecting the state of the vehicle 500, and supplies the sensor data from each sensor to each unit of the vehicle control system 511. The types and the number of various sensors included in the vehicle sensor 527 are not particularly limited as long as they can be practically installed in the vehicle 500.

For example, the vehicle sensor 527 includes a speed sensor, an acceleration sensor, an angular velocity sensor (gyro sensor), and an inertial measurement unit (IMU) in which these sensors are integrated. For example, the vehicle sensor 527 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 527 includes a rotation sensor that detects the number of rotations of an engine or a motor, an air pressure sensor that detects an air pressure of a tire, a slip rate sensor that detects a slip rate of the tire, and a wheel speed sensor that detects a rotation speed of a wheel. For example, the vehicle sensor 527 includes a battery sensor that detects a remaining amount and temperature of a battery, and an impact sensor that detects an external impact.

The recording unit 528 includes at least one of a non-volatile storage medium or a volatile storage medium, and stores data and a program. The recording unit 528 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as the storage medium. The recording unit 528 records various programs and data used by each unit of the vehicle control system 511. For example, the recording unit 528 includes an event data recorder (EDR) and a data storage system for automated driving (DSSAD), and records information of the vehicle 500 before and after an event such as an accident and biological information acquired by the in-vehicle sensor 526.

The travel assistance/automated driving control unit 529 controls travel assistance and automated driving of the vehicle 500. For example, the travel assistance/automated driving control unit 529 includes an analysis unit 561, an action planning unit 562, and an operation control unit 563.

The analysis unit 561 executes analysis processing on the vehicle 500 and a situation around the vehicle 500. The analysis unit 561 includes a self-position estimation unit 571, a sensor fusion unit 572, and the recognition unit 573.

The self-position estimation unit 571 estimates a self-position of the vehicle 500, on the basis of the sensor data from the external recognition sensor 525 and the high-precision map accumulated in the map information accumulation unit 523. For example, the self-position estimation unit 571 generates a local map on the basis of the sensor data from the external recognition sensor 525 and performs matching the local map with the high-precision map so as to estimate the self-position of the vehicle 500. The position of the vehicle 500 is based on, for example, a center of a rear wheel pair axle.

The local map is, for example, a three-dimensional high-precision map created using a technology such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 500 is divided into grids (lattices) with a predetermined size, and an occupancy state of an object is represented on a grid basis. The occupancy state of the object is represented by, for example, presence or absence or an existence probability of the object. The local map is also used for detection processing and recognition processing on the situation outside the vehicle 500 by the recognition unit 573, for example.

Note that the self-position estimation unit 571 may estimate the self-position of the vehicle 500 on the basis of the GNSS signal and the sensor data from the vehicle sensor 527.

The sensor fusion unit 572 executes sensor fusion processing for combining a plurality of different types of sensor data (for example, image data supplied from the camera 551 and sensor data supplied from the radar 552), to acquire new information. Methods for combining different types of sensor data include integration, fusion, correspondence, or the like.

The recognition unit 573 executes the detection processing for detecting a situation outside the vehicle 500 and the recognition processing for recognizing a situation outside the vehicle 500.

For example, the recognition unit 573 executes the detection processing and the recognition processing on the situation outside the vehicle 500, on the basis of the information from the external recognition sensor 525, the information from the self-position estimation unit 571, the information from the sensor fusion unit 572, or the like.

Specifically, for example, the recognition unit 573 executes the detection processing, the recognition processing, or the like on the object around the vehicle 500. The object detection processing is, for example, processing for detecting presence or absence, size, shape, position, motion, or the like of an object. The object recognition processing is, for example, processing for recognizing an attribute such as a type of an object or identifying a specific object. The detection processing and the recognition processing, however, are not necessarily clearly separated and may overlap.

For example, the recognition unit 573 detects an object around the vehicle 500 by performing clustering to classify a point cloud based on the sensor data by the LiDAR 553, the radar 552, or the like for each cluster of a point cloud. As a result, the presence or absence, size, shape, and position of the object around the vehicle 500 are detected.

For example, the recognition unit 573 detects a motion of the object around the vehicle 500 by performing tracking for following a motion of the cluster of the point cloud classified by clustering. As a result, a speed and a traveling direction (movement vector) of the object around the vehicle 500 are detected.

For example, the recognition unit 573 detects or recognizes a vehicle, a person, a bicycle, an obstacle, a structure, a road, a traffic light, a traffic sign, a road sign, and the like with respect to the image data supplied from the camera 551. Furthermore, the type of the object around the vehicle 500 may be recognized by executing recognition processing such as semantic segmentation.

For example, the recognition unit 573 can execute processing for recognizing traffic rules around the vehicle 500 on the basis of the map accumulated in the map information accumulation unit 523, the estimation result of the self-position by the self-position estimation unit 571, and the recognition result of the object around the vehicle 500 by the recognition unit 573. Through this processing, the recognition unit 573 can recognize a position and state of a signal, content of traffic signs and road signs, content of traffic regulations, travelable lanes, and the like.

For example, the recognition unit 573 can execute the recognition processing on a surrounding environment of the vehicle 500. As the surrounding environment to be recognized by the recognition unit 573, a weather, a temperature, a humidity, brightness, a road surface condition, or the like are assumed.

The action planning unit 562 creates an action plan for the vehicle 500. For example, the action planning unit 562 creates the action plan by executing processing of path planning and path following.

Note that the route planning (global path planning) is processing of planning a rough route from a start to a goal. This path planning is called track planning, and also includes processing of track generation (local path planning) that allows safe and smooth traveling near the vehicle 500, in consideration of motion characteristics of the vehicle 500 in the path planned by the path planning. The path planning may be distinguished from long-term path planning, and startup generation from short-term path planning or local path planning. A safety-first path represents a concept similar to the startup generation, the short-term path planning, or the local path planning.

The path following is processing for planning an operation for safely and accurately traveling on the path planned by the path planning within a planned time. For example, the action planning unit 562 can calculate a target speed and a target angular velocity of the vehicle 500, on the basis of a result of the path following processing.

The operation control unit 563 controls the operation of the vehicle 500 in order to achieve the action plan created by the action planning unit 562.

For example, the operation control unit 563 controls a steering control unit 581, a brake control unit 582, and a drive control unit 583 included in the vehicle control unit 532 to be described later, to control acceleration/deceleration and the direction so that the vehicle 500 travels on a track calculated by the track planning. For example, the operation control unit 563 performs cooperative control for the purpose of implementing functions of the ADAS such as collision avoidance or impact mitigation, follow-up traveling, vehicle speed maintaining traveling, collision warning of the own vehicle, or lane deviation warning of the own vehicle. For example, the operation control unit 563 performs cooperative control for the purpose of automated driving or the like in which a vehicle autonomously travels without depending on an operation of a driver.

The DMS 530 executes authentication processing on the driver, recognition processing on a state of the driver, or the like, on the basis of the sensor data from the in-vehicle sensor 526, the input data input to the HMI 531 to be described later, or the like. In this case, as the state of the driver to be recognized by the DMS 530, for example, a physical condition, an alertness, a concentration degree, a fatigue degree, a line-of-sight direction, a degree of drunkenness, a driving operation, a posture, or the like are assumed.

Note that the DMS 530 may execute processing for authenticating an occupant other than the driver, and processing for recognizing a state of the occupant. Furthermore, for example, the DMS 530 may execute processing for recognizing a situation in the vehicle, on the basis of the sensor data from the in-vehicle sensor 526. As the situation in the vehicle to be recognized, for example, a temperature, a humidity, brightness, odor, or the like are assumed.

The HMI 531 receives inputs of various types of data, instructions, or the like, and presents various types of data to the driver or the like.

The input of data by the HMI 531 will be schematically described. The HMI 531 includes an input device for a person to input data. The HMI 531 generates an input signal on the basis of the data, the instruction, or the like input with the input device, and supplies the input signal to each unit of the vehicle control system 511. The HMI 531 includes, for example, an operator such as a touch panel, a button, a switch, or a lever as the input device. Without being limited to this, the HMI 531 may further include an input device capable of inputting information by a method such as voice or gesture other than a manual operation. Moreover, the HMI 531 may use, for example, a remote control device using infrared rays or radio waves, or an external connection device such as a mobile device or a wearable device corresponding to the operation of the vehicle control system 511, as the input device.

Presentation of data by the HMI 531 will be schematically described. The HMI 531 generates visual information, auditory information, and haptic information regarding an occupant or outside of a vehicle. Furthermore, the HMI 531 performs output control for controlling output, output content, an output timing, an output method, or the like of each piece of generated information. The HMI 531 generates and outputs, for example, information indicated by an image or light of an operation screen, a state display of the vehicle 500, a warning display, a monitor image indicating a situation around the vehicle 500, or the like, as the visual information. Furthermore, the HMI 531 generates and outputs information indicated by sounds such as voice guidance, a warning sound, or a warning message, for example, as the auditory information. Moreover, the HMI 531 generates and outputs, for example, information given to a tactile sense of an occupant by force, vibration, motion, or the like as the haptic information.

As an output device with which the HMI 531 outputs the visual information, for example, a display device that presents the visual information by displaying an image by itself or a projector device that presents the visual information by projecting an image can be applied. Note that the display device may be a device that displays the visual information in the field of view of the occupant, such as a head-up display, a transmissive display, or a wearable device having an augmented reality (AR) function, for example, in addition to a display device having an ordinary display. Furthermore, the HMI 531 can use a display device included in a navigation device, an instrument panel, a camera monitoring system (CMS), an electronic mirror, a lamp, or the like provided in the vehicle 500, as the output device that outputs the visual information.

As an output device with which the HMI 531 outputs the auditory information, for example, an audio speaker, a headphone, or an earphone can be applied.

As an output device with which the HMI 531 outputs the haptic information, for example, a haptic element using a haptic technology can be applied. The haptic element is provided, for example, in a portion to be touched by the occupant of the vehicle 500, such as a steering wheel or a seat.

The vehicle control unit 532 controls each unit of the vehicle 500. The vehicle control unit 532 includes the steering control unit 581, the brake control unit 582, the drive control unit 583, a body system control unit 584, a light control unit 585, and a horn control unit 586.

The steering control unit 581 performs detection, control, or the like of a state of a steering system of the vehicle 500. The steering system includes, for example, a steering mechanism including a steering wheel or the like, an electric power steering, or the like. The steering control unit 581 includes, for example, a control unit such as an ECU that controls the steering system, an actuator that drives the steering system, or the like.

The brake control unit 582 performs detection, control, or the like of a state of a brake system of the vehicle 500. The brake system includes, for example, a brake mechanism including a brake pedal or the like, an antilock brake system (ABS), a regenerative brake mechanism, or the like. The brake control unit 582 includes, for example, a control unit such as an ECU that controls the brake system, or the like.

The drive control unit 583 performs detection, control, or the like of a state of a drive system of the vehicle 500. The drive system includes, for example, an accelerator pedal, a driving force generation device for generating a driving force such as an internal combustion engine or a driving motor, a driving force transmission mechanism for transmitting the driving force to wheels, or the like. The drive control unit 583 includes, for example, a control unit such as an ECU that controls the drive system, or the like.

The body system control unit 584 performs detection, control, or the like of a state of a body system of the vehicle 500. The body system includes, for example, a keyless entry system, a smart key system, a power window device, a power seat, an air conditioner, an airbag, a seat belt, a shift lever, or the like. The body system control unit 584 includes, for example, a control unit such as an ECU that controls the body system, or the like.

The light control unit 585 performs detection, control, or the like of states of various lights of the vehicle 500. As the lights to be controlled, for example, a headlight, a backlight, a fog light, a turn signal, a brake light, a projection light, a bumper indicator, or the like can be considered. The light control unit 585 includes a control unit such as an ECU that performs light control, or the like.

The horn control unit 586 performs detection, control, or the like of a state of a car horn of the vehicle 500. The horn control unit 586 includes, for example, a control unit such as an ECU that controls the car horn, or the like.

Figure 42:
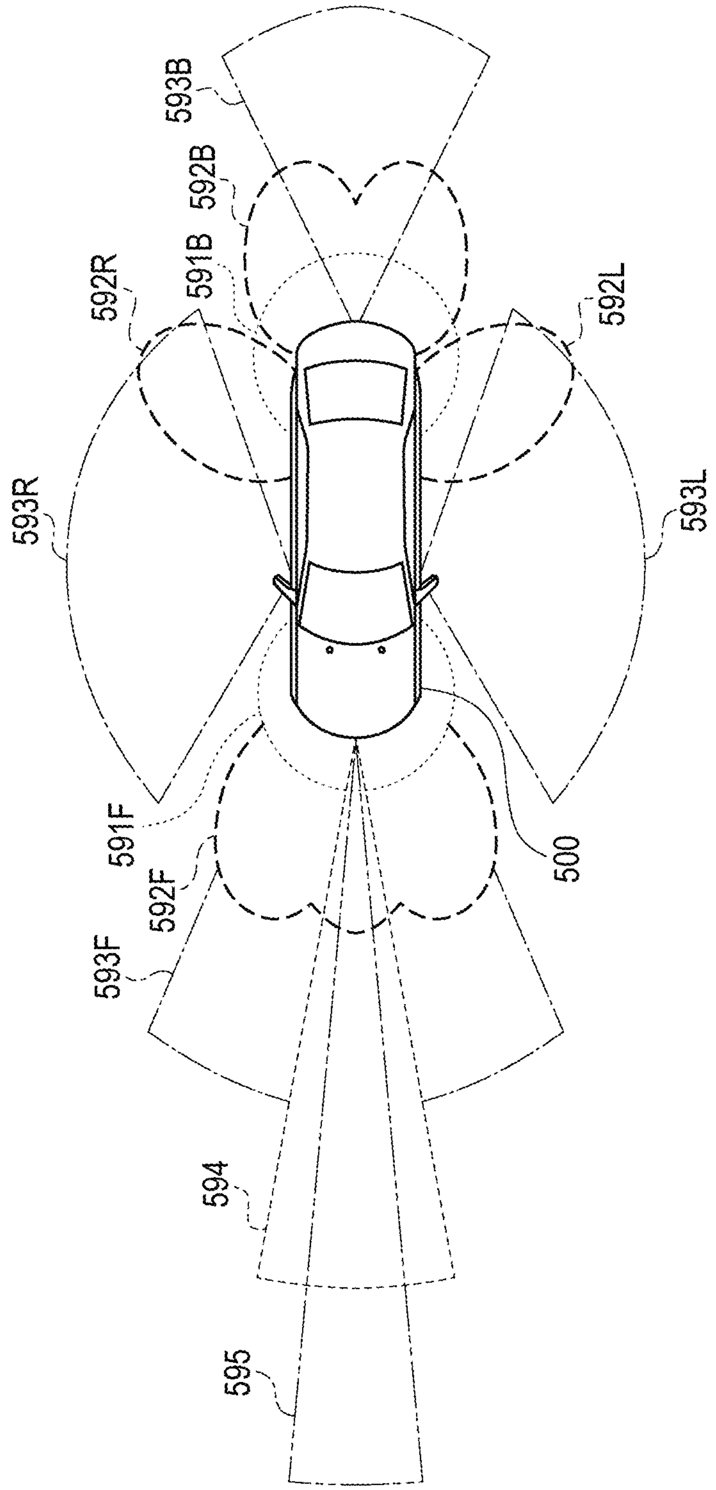
FIG. 42 is a diagram for explaining a configuration example of a sensor of the vehicle mounting the information processing device according to the present disclosure.

FIG. 42 is a diagram illustrating an example of a sensing region by the camera 551, the radar 552, the LiDAR 553, the ultrasonic sensor 554, or the like of the external recognition sensor 525 in FIG. 41. Note that FIG. 42 schematically illustrates the vehicle 500 as viewed from above, where a left end side is the front end (front) side of the vehicle 500 and a right end side is the rear end (rear) side of the vehicle 500.

Sensing regions 591F and 591B illustrate examples of the sensing region of the ultrasonic sensor 554. The sensing region 591F covers a region around the front end of the vehicle 500 by the plurality of ultrasonic sensors 554. The sensing region 591B covers a region around the rear end of the vehicle 500 by the plurality of ultrasonic sensors 554.

Sensing results in the sensing regions 591F and 591B are used, for example, for parking assistance of the vehicle 500 or the like.

Sensing regions 592F to 592B illustrate examples of the sensing region of the radar 552 for short distance or medium distance. The sensing region 592F covers a position farther than the sensing region 591F, on the front side of the vehicle 500.

The sensing region 592B covers a position farther than the sensing region 591B, on the rear side of the vehicle 500. The sensing region 592L covers a region around the rear side of a left side surface of the vehicle 500. The sensing region 592R covers a region around the rear side of a right side surface of the vehicle 500.

A sensing result in the sensing region 592F is used for, for example, detection of a vehicle, a pedestrian, or the like existing on the front side of the vehicle 500, or the like. A sensing result in the sensing region 592B is used for, for example, a function for preventing a collision of the rear side of the vehicle 500, or the like. The sensing results in the sensing regions 592L and 592R are used for, for example, detection of an object in a blind spot on the sides of the vehicle 500, or the like.

Sensing regions 593F to 593B illustrate examples of the sensing regions by the camera 551. The sensing region 593F covers a position farther than the sensing region 592F, on the front side of the vehicle 500. The sensing region 593B covers a position farther than the sensing region 592B, on the rear side of the vehicle 500. The sensing region 593L covers a region around the left side surface of the vehicle 500. The sensing region 593R covers a region around the right side surface of the vehicle 500.

A sensing result in the sensing region 593F can be used for, for example, recognition of a traffic light or a traffic sign, a lane departure prevention assist system, and an automated headlight control system. A sensing result in the sensing region 593B can be used for, for example, parking assistance, a surround view system, or the like. Sensing results in the sensing regions 593L and 593R can be used for, for example, a surround view system.

A sensing region 594 illustrates an example of the sensing region of the LiDAR 553. The sensing region 594 covers a position farther than the sensing region 593F, on the front side of the vehicle 500. On the other hand, the sensing region 594 has a narrower range in a left-right direction than the sensing region 593F.

A sensing result in the sensing region 594 is used for, for example, detection of an object such as a neighboring vehicle.

A sensing region 595 illustrates an example of the sensing region of the long-distance radar 552.

The sensing region 595 covers a position farther than the sensing region 594, on the front side of the vehicle 500. On the other hand, the sensing region 595 has a narrower range in the left-right direction than the sensing region 594.

A sensing result in the sensing region 595 is used, for example, for adaptive cruise control (ACC), emergency braking, collision avoidance, or the like.

Note that the respective sensing regions of the individual sensors: the camera 551; the radar 552; the LiDAR 553; and the ultrasonic sensor 554, included in the external recognition sensor 525 may have various configurations other than those in FIG. 42. Specifically, the ultrasonic sensor 554 may also perform sensing on the sides of the vehicle 500, or the LiDAR 553 may perform sensing on the rear side of the vehicle 500. Furthermore, an installation position of each sensor is not limited to each example described above. Furthermore, the number of sensors of each sensor may be one or more.

8. Conclusion of Configuration of Present Disclosure

Hereinabove, the embodiments according to the present disclosure have been described in detail with reference to the specific embodiments. However, it is obvious that those skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be considered.

Note that the technology disclosed herein can have the following configurations.

(1) An information processing device including:

a parking spot analysis unit configured to execute analysis processing on a parking spot included in an image, in which the parking spot analysis unit estimates a parking spot definition rectangle indicating a parking spot region in the image, by using a learning model generated in advance.

(2) The information processing device according to (1), in which the parking spot analysis unit estimates an entrance direction of a parking spot in the image by using the learning model.

(3) The information processing device according to (1) or (2), in which the parking spot analysis unit estimates whether a parking spot in the image is a vacant parking spot in which no parked vehicle is present or an occupied parking spot in which a parked vehicle is present, by using the learning model.

(4) The information processing device according to any one of (1) to (3), in which the parking spot analysis unit estimates a spot center that is a center position of a parking spot in the image by using the learning model.

(5) The information processing device according to (4), in which the parking spot analysis unit estimates the spot center by using CenterNet as the learning model.

(6) The information processing device according to (4) or (5), in which the parking spot analysis unit generates a spot center identification heat map for estimating a spot center that is a center position of a parking spot in the image by using the learning model, and estimates the spot center by using the generated spot center identification heat map.

(7) The information processing device according to any one of (1) to (6), in which the parking spot analysis unit includes:

a parking spot configuration estimation unit configured to generate two types of heat maps that are a vacant class correspondence learning model application spot center identification heat map generated using a learning model generated on the basis of an image of a vacant parking spot, and an occupied class correspondence learning model application spot center identification heat map generated using a learning model generated on the basis of an image of an occupied parking spot; and an estimation result analysis unit configured to determine whether a parking spot in the image is a vacant parking spot in which no parked vehicle is present or an occupied parking spot in which a parked vehicle is present, on the basis of processing of comparing peak values of the two types of heat maps generated by the parking spot configuration estimation unit.

(8) The information processing device according to (7), in which the estimation result analysis unit determines that a parking spot in the image is a vacant parking spot in a case where a peak value of the vacant class correspondence learning model application spot center identification heat map is larger than a peak value of the occupied class correspondence learning model application spot center identification heat map, and determines that a parking spot in the image is an occupied parking spot in a case where a peak value of the occupied class correspondence learning model application spot center identification heat map is larger than a peak value of the vacant class correspondence learning model application spot center identification heat map.

(9) The information processing device according to any one of (1) to (8), in which the parking spot analysis unit includes:

a spot center grid estimation unit configured to estimate a spot center on a grid basis by using the learning model, the spot center being a center position of a parking spot in the image.

(10) The information processing device according to (9), in which the parking spot analysis unit includes:

a spot center relative position estimation unit configured to estimate a relative position between a grid center position of a spot center grid estimated by the spot center grid estimation unit and an actual spot center of the parking spot.

(11) The information processing device according to (10), in which the parking spot analysis unit includes:

a spot vertex relative position estimation unit configured to estimate a relative position between an actual spot center of a parking spot estimated by the spot center relative position calculation unit and a vertex of the parking spot definition rectangle.

(12) The information processing device according to (11), in which the spot vertex relative position estimation unit includes:

a spot vertex relative position estimation first algorithm execution unit and a spot vertex relative position estimation second algorithm execution unit each configured to arrange vertexes of the parking spot definition rectangle in accordance with different algorithms.

(13) The information processing device according to (12), in which the parking spot analysis unit includes a selection unit configured to select one piece of vertex arrangement data from among:

vertex arrangement data of the parking spot definition rectangle generated by the spot vertex relative position estimation first algorithm execution unit; and vertex arrangement data of the parking spot definition rectangle generated by the spot vertex relative position estimation second algorithm execution unit.

(14) The information processing device according to (13), in which in a case where an inclination of the parking spot definition rectangle with respect to the image is an inclination with which a vertex arrangement error is caused by the spot vertex relative position estimation first algorithm execution unit, the selection unit selects vertex arrangement data of the parking spot definition rectangle generated by the spot vertex relative position estimation second algorithm execution unit, and in a case where an inclination of the parking spot definition rectangle with respect to the image is an inclination with which a vertex arrangement error is caused by the spot vertex relative position estimation second algorithm execution unit, the selection unit selects vertex arrangement data of the parking spot definition rectangle generated by the spot vertex relative position estimation first algorithm execution unit.

(15) The information processing device according to any one of (1) to (14), in which the image is a top surface image corresponding to an image observed from above a vehicle, the top surface image being generated by combining images captured by four cameras that individually capture images in four directions of front, rear, left, and right, the four cameras being mounted on the vehicle.

(16) The information processing device according to any one of (1) to (15), in which the information processing device further includes:

a display control unit configured to generate display data for a display unit, and the display control unit generates display data in which identification data analyzed by the parking spot analysis unit is superimposed on the image, and outputs the display data to the display unit.

(17) The information processing device according to (16), in which the display control unit generates display data in which at least one piece of identification data is superimposed on a parking lot image, and outputs the display data to the display unit, the identification data including:

(a) a vacant parking spot identification frame;

(b) an occupied parking spot identification frame;

(c) a parking spot entrance direction identifier; and (d) a parking spot state (vacant/occupied) identification tag.

(18) The information processing device according to any one of (1) to (17), in which the information processing device further includes:

an automated driving control unit, and the automated driving control unit is input with analysis information generated by the parking spot analysis unit, to execute automated parking processing.

(19) An information processing method executed in an information processing device, in which the information processing device includes a parking spot analysis unit configured to execute analysis processing on a parking spot included in an image, and the parking spot analysis unit estimates a parking spot definition rectangle indicating a parking spot region in the image, by using a learning model generated in advance.

(20) A program for causing an information processing device to execute information processing, in which the information processing device includes a parking spot analysis unit configured to execute analysis processing on a parking spot included in an image, and the program causes the parking spot analysis unit to estimate a parking spot definition rectangle indicating a parking spot region in the image, by using a learning model generated in advance.

Furthermore, a series of processes described herein can be executed by hardware, software, or a configuration obtained by combining hardware and software. In a case of processing by software is executed, a program in which a processing sequence is recorded can be installed and performed in a memory in a computer incorporated in dedicated hardware, or the program can be installed and performed in a general-purpose computer capable of executing various types of processing. For example, the program can be recorded in advance in a recording medium. In addition to being installed in a computer from the recording medium, a program can be received via a network such as a local area network (LAN) or the Internet and installed in a recording medium such as an internal hard disk or the like.

Note that the various processes described herein may be executed not only in a chronological order in accordance with the description, but may also be executed in parallel or individually depending on processing capability of a device configured to execute the processing or depending on the necessity. Furthermore, a system herein described is a logical set configuration of a plurality of devices, there is a case where devices of each configuration are housed in the same housing. However, the system is not limited to a system in which devices of each configuration are in the same housing.

INDUSTRIAL APPLICABILITY

As described above, according to the configuration of one embodiment of the present disclosure, a configuration of estimating a parking spot definition rectangle (polygon), a parking spot entrance direction, and a vacancy state of a parking spot by applying a learning model is realized.

Specifically, for example, a top surface image generated by combining individual images captured by front, rear, left, and right cameras mounted on a vehicle is analyzed, and analysis processing is performed on a parking spot in the image. The parking spot analysis unit uses a learning model to estimate a vertex of a parking spot definition rectangle (polygon) indicating a parking spot region in the image and an entrance direction of the parking spot. Furthermore, estimation is performed as to whether the parking spot is a vacant parking spot or an occupied parking spot in which a parked vehicle is present. The parking spot analysis unit uses CenterNet as a learning model to execute, for example, estimation processing on a spot center and a vertex of a parking spot definition rectangle (polygon).

With this configuration, a configuration is realized in which a learning model is applied to estimate a parking spot definition rectangle (polygon), a parking spot entrance direction, and a vacancy state of a parking spot.

REFERENCE SIGNS LIST

10 Vehicle
11 Camera
12 Display unit
20 Parking lot
80 Learning processing unit
100 Information processing device
101 Camera
102 Image conversion unit
120 Parking spot analysis unit
121 Feature amount extraction unit
122 Down-sampling unit
123 Parking spot configuration estimation unit
124 Estimation result analysis unit
131 Spot center grid estimation unit
132 Spot center relative position estimation unit
133 Spot vertex relative position and entrance estimation first algorithm execution unit
134 Spot vertex relative position and entrance estimation second algorithm execution unit
135 Spot vertex pattern estimation unit
141 Parking spot state (vacant/occupied) determination unit
142 Spot vertex relative position and entrance estimation result selection unit
143 Rescale unit
144 Parking spot center coordinate calculation unit
145 Parking spot definition polygon vertex coordinate calculation unit
146 Parking spot definition polygon coordinate rearrangement unit
150 Display control unit
151 Parking spot state (vacant/occupied) identification frame generation unit
152 Parking spot entrance identification data generation unit
153 Parking spot state (vacant/occupied) identification tag generation unit
160 Display unit
170 Input unit (UI)
180 Learning model
200 Automated driving control unit
301 CPU
302 ROM
303 RAM
304 Bus
305 Input/output interface
306 Input unit
307 Output unit
308 Storage unit
309 Communication unit
310 Drive
311 Removable medium
321 Sensor
322 Drive unit

The invention claimed is:

1. An information processing device, comprising:

a parking spot analysis unit configured to estimate a parking spot definition rectangle by using a trained learning model, wherein the parking spot definition rectangle indicates a parking spot region in a parking lot image, the trained learning model comprises a first learning model trained on images of vacant parking spots, and a second learning model trained on images of occupied parking spots, and the parking spot analysis unit includes:

a parking spot configuration estimation unit configured to:

generate a vacant class correspondence learning model application spot center identification heat map by using the first learning model; and generate an occupied class correspondence learning model application spot center identification heat map by using the second learning model, and an estimation result analysis unit configured to:

compare a peak value of the vacant class correspondence learning model application spot center identification heat map with a peak value of the occupied class correspondence learning model application spot center identification heat map; and determine, based on a result of the comparison, a parking spot in the parking lot image is one of: a vacant parking spot in which a parked vehicle is absent, or an occupied parking spot in which the parked vehicle is present.

2. The information processing device according to claim 1, wherein the parking spot analysis unit is further configured to estimate an entrance direction of the parking spot in the parking lot image by using the trained learning model.

3. The information processing device according to claim 1, wherein the parking spot analysis unit is further configured to estimate, by using the trained learning model, a spot center that is a center position of the parking spot in the parking lot image.

4. The information processing device according to claim 3, wherein the parking spot analysis unit is further configured to estimate the spot center by using CenterNet as the trained learning model.

5. The information processing device according to claim 3, wherein the parking spot analysis unit is further configured to estimate the spot center based on a peak position of at least one of the vacant class correspondence learning model application spot center identification heat map or the occupied class correspondence learning model application spot center identification heat map.

6. The information processing device according to claim 1, wherein the estimation result analysis unit is further configured to:

determine that the parking spot in the parking lot image is the vacant parking spot based on the peak value of the vacant class correspondence learning model application spot center identification heat map being larger than the peak value of the occupied class correspondence learning model application spot center identification heat map; and determine that the parking spot in the parking lot image is the occupied parking spot based on the peak value of the occupied class correspondence learning model application spot center identification heat map being larger than the peak value of the vacant class correspondence learning model application spot center identification heat map.

7. The information processing device according to claim 1, wherein the parking spot analysis unit further includes a spot center grid estimation unit configured to estimate a spot center on a grid basis by using the trained learning model, and the spot center is a center position of the parking spot in the parking lot image.

8. The information processing device according to claim 7, wherein the parking spot analysis unit further includes a spot center relative position estimation unit configured to estimate a relative position between a grid center position of a spot center grid estimated by the spot center grid estimation unit and an actual spot center of the parking spot.

9. The information processing device according to claim 8, wherein the parking spot analysis unit further includes a spot vertex relative position estimation unit configured to estimate a relative position between the actual spot center of the parking spot estimated by the spot center relative position estimation unit and a vertex of the parking spot definition rectangle.

10. The information processing device according to claim 9, wherein the spot vertex relative position estimation unit includes:

a spot vertex relative position estimation first algorithm execution unit configured to arrange vertices of the parking spot definition rectangle based on a first algorithm; and a spot vertex relative position estimation second algorithm execution unit configured to arrange the vertices of the parking spot definition rectangle based on a second algorithm different from the first algorithm.

11. The information processing device according to claim 10, wherein the spot vertex relative position estimation first algorithm execution unit is further configured to generate first vertex arrangement data of the parking spot definition rectangle, the spot vertex relative position estimation second algorithm execution unit is further configured to generate second vertex arrangement data of the parking spot definition rectangle, and the parking spot analysis unit further includes a selection unit configured to select one piece of vertex arrangement data from among:

the first vertex arrangement data of the parking spot definition rectangle; and the second vertex arrangement data of the parking spot definition rectangle.

12. The information processing device according to claim 11, wherein the selection unit is further configured to:

in a case where an inclination of the parking spot definition rectangle with respect to the parking lot image is a first inclination with which a vertex arrangement error is caused by the spot vertex relative position estimation first algorithm execution unit, select the second vertex arrangement data of the parking spot definition rectangle generated by the spot vertex relative position estimation second algorithm execution unit; and in a case where the inclination of the parking spot definition rectangle with respect to the parking lot image is a second inclination with which a vertex arrangement error is caused by the spot vertex relative position estimation second algorithm execution unit, select the first vertex arrangement data of the parking spot definition rectangle generated by the spot vertex relative position estimation first algorithm execution unit.

13. The information processing device according to claim 1, wherein the parking lot image is a top surface image corresponding to an image observed from above a vehicle, the top surface image is generated by combining images captured by four cameras mounted on the vehicle, and each camera of the four cameras is configured to capture the images in a respective one of a front direction, a rear direction, a left direction, and a right direction.

14. The information processing device according to claim 1, wherein the parking spot analysis unit is further configured to analyze identification data, the information processing device further includes a display control unit configured to:

generate display data for a display unit of a vehicle; and output the display data to the display unit of the vehicle, and in the display data, the identification data is superimposed on the parking lot image.

15. The information processing device according to claim 14, wherein the display control unit is further configured to generate the display data in which at least one piece of the identification data is superimposed on the parking lot image, and the identification data includes: a vacant parking spot identification frame, an occupied parking spot identification frame, a parking spot entrance direction identifier, and a parking spot vacancy state identification tag.

16. The information processing device according to claim 1, wherein the parking spot analysis unit is further configured to generate analysis information, and the information processing device further includes an automated driving control unit configured to:

receive, as input, the analysis information; and execute an automated parking process based on the analysis information.

17. An information processing method, comprising:

in an information processing device:

estimating, by a parking spot analysis unit of the information processing device, using a trained learning model, a parking spot definition rectangle indicating a parking spot region in a parking lot image, wherein the trained learning model comprises a first learning model trained on images of vacant parking spots and a second learning model trained on images of occupied parking spots;

generating, by a parking spot configuration estimation unit of the parking spot analysis unit, using the first learning model, a vacant class correspondence learning model application spot center identification heat map;

generating, by the parking spot configuration estimation unit, using the second learning model, an occupied class correspondence learning model application spot center identification heat map;

comparing, by an estimation result analysis unit of the parking spot analysis unit, a peak value of the vacant class correspondence learning model application spot center identification heat map with a peak value of the occupied class correspondence learning model application spot center identification heat map; and determining, by the estimation result analysis unit, a parking spot in the parking lot image is one of:

a vacant parking spot in which a parked vehicle is absent, or an occupied parking spot in which the parked vehicle is present, wherein the determination is based on a result of the comparison.

18. A non-transitory computer readable medium having stored thereon computer-executable instructions, which when executed by a computer, cause the computer to execute operations, the operations comprising:

estimating, by using a trained learning model comprising a first learning model trained on images of vacant parking spots and a second learning model trained on images of occupied parking spots, a parking spot definition rectangle indicating a parking spot region in a parking lot image;

generating a vacant class correspondence learning model application spot center identification heat map by using the first learning model;

generating an occupied class correspondence learning model application spot center identification heat map by using the second learning model;

comparing a peak value of the vacant class correspondence learning mode application spot center identification heat map with a peak value of the occupied class correspondence learning model application spot center identification heat map; and determining, based on a result of the comparison, a parking spot in the parking lot image is one of:

a vacant parking spot in which a parked vehicle is absent, or an occupied parking spot in which a parked vehicle is present.

* * * * *